US00RE46973E

(19) United States
(12) Reissued Patent
Mohan et al.

(10) Patent Number: US RE46,973 E
(45) Date of Reissued Patent: Jul. 31, 2018

(54) METHOD, SYSTEM, AND COMPUTER PROGRAM PRODUCT FOR CONCEPT-BASED MULTI-DIMENSIONAL ANALYSIS OF UNSTRUCTURED INFORMATION

(71) Applicant: uReveal, Inc., Jacksonville, FL (US)

(72) Inventors: Rengaswamy Mohan, Jacksonville, FL (US); Usha Mohan, Jacksonville, FL (US); David D. Sha, Jacksonville, FL (US)

(73) Assignee: uReveal, Inc., Jacksonville, FL (US)

(21) Appl. No.: 15/097,698

(22) Filed: Apr. 13, 2016

Related U.S. Patent Documents

Reissue of:
(64) Patent No.: 7,194,483
Issued: Mar. 20, 2007
Appl. No.: 10/393,677
Filed: Mar. 19, 2003

U.S. Applications:
(63) Continuation-in-part of application No. 10/087,053, filed on Mar. 1, 2002, now Pat. No. 6,970,881.

(60) Provisional application No. 60/366,045, filed on Mar. 19, 2002, provisional application No. 60/302,971, filed on May 7, 2001.

(51) Int. Cl.
*G06F 17/30* (2006.01)

(52) U.S. Cl.
CPC .... *G06F 17/3061* (2013.01); *G06F 17/30592* (2013.01); *Y10S 707/956* (2013.01); *Y10S 707/99942* (2013.01); *Y10S 707/99943* (2013.01); *Y10S 707/99944* (2013.01); *Y10S 707/99945* (2013.01)

(58) Field of Classification Search
CPC ..... G06F 17/30592; G06F 17/3061; Y10S 707/956; Y10S 707/99943; Y10S 707/99944; Y10S 707/99945
USPC ..... 707/600
See application file for complete search history.

(56) References Cited

U.S. PATENT DOCUMENTS 4,839,853 A * 6/1989 Deerwester et al. ..... 707/5
5,278,980 A 1/1994 Pedersen et al.
(Continued)

FOREIGN PATENT DOCUMENTS

GB 2399666 A 9/2004
WO WO-9918825 A1 4/1999
(Continued)

OTHER PUBLICATIONS

Nasukawa, T. and T. Nagano, "Text Analysis and knowledge mining system", IBM Systems Journal, vol. 40, No. 4, 2001, p. 967-984.*
(Continued)

*Primary Examiner* — Rachna Desai
(74) *Attorney, Agent, or Firm* — Venable LLP; Michael A. Sartori

(57) ABSTRACT

A method, operating model, system, data structure, computer program and computer program product for analyzing and categorizing and exploring or querying unstructured information and for tracking trends and exceptions. Method for analytical processing of unstructured objects in a dimensional space. Method for tracking trends in concepts. Method for tracking exceptions in concepts. Tools and interface for displaying concepts, query results, tracked trends and exceptions.

56 Claims, 16 Drawing Sheets

(56) References Cited

U.S. PATENT DOCUMENTS 5,295,256 A 3/1994 Bapat
5,418,951 A 5/1995 Damashek
5,488,725 A 1/1996 Turtle et al.
5,519,865 A 5/1996 Kondo et al.
5,555,408 A 9/1996 Fujisawa et al.
5,592,667 A 1/1997 Bugajski
5,619,709 A 4/1997 Caid et al.
5,634,051 A 5/1997 Thomson
5,727,950 A 3/1998 Cook et al.
5,761,496 A 6/1998 Hattori
5,768,578 A 6/1998 Kirk et al.
5,794,178 A 8/1998 Caid et al.
5,819,260 A 10/1998 Lu et al.
5,832,182 A 11/1998 Zhang et al.
5,832,470 A 11/1998 Morita et al.
5,867,799 A 2/1999 Lang et al.
5,884,305 A 3/1999 Kleinberg et al.
5,920,864 A 7/1999 Zhao
5,924,090 A 7/1999 Krellenstein
5,926,811 A 7/1999 Miller et al.
5,933,822 A 8/1999 Braden-Harder et al.
5,953,726 A 9/1999 Carter et al.
5,963,940 A 10/1999 Liddy et al.
5,983,214 A 11/1999 Lang et al.
5,987,446 A 11/1999 Corey et al.
5,987,447 A 11/1999 Chang et al.
6,006,221 A 12/1999 Liddy et al.
6,026,388 A 2/2000 Liddy et al.
6,028,605 A 2/2000 Conrad et al.
6,029,161 A 2/2000 Lang et al.
6,038,561 A 3/2000 Snyder et al.
6,055,526 A 4/2000 Ambroziak
6,078,924 A 6/2000 Ainsbury et al.
6,101,491 A 8/2000 Woods
6,101,492 A 8/2000 Jacquemin et al.
6,101,515 A 8/2000 Wical et al.
6,122,628 A 9/2000 Castelli et al.
6,182,063 B1 1/2001 Woods
6,189,002 B1 2/2001 Roitblat
6,192,364 B1 * 2/2001 Baclawski ..... G06F 17/3033
6,195,657 B1 2/2001 Rucker et al.
6,199,034 B1 3/2001 Wical
6,199,067 B1 3/2001 Geller
6,233,575 B1 5/2001 Agrawal et al.
6,236,987 B1 5/2001 Horowitz et al.
6,240,407 B1 * 5/2001 Chang ..... G06F 17/30911 707/711
6,256,633 B1 7/2001 Dharap
6,263,335 B1 7/2001 Paik et al.
6,289,382 B1 9/2001 Bowman-Amuah
6,300,957 B1 10/2001 Rao et al.
6,308,175 B1 10/2001 Lang et al.
6,314,420 B1 11/2001 Lang et al.
6,321,228 B1 11/2001 Crandall et al.
6,327,593 B1 12/2001 Gioffon
6,330,563 B1 12/2001 Heckerman et al.
6,366,908 B1 4/2002 Chong et al.
6,377,259 B1 4/2002 Tenev et al.
6,385,600 B1 5/2002 McGuinness et al.
6,385,602 B1 5/2002 Tso et al.
6,411,924 B1 6/2002 de Hita et al.
6,424,973 B1 7/2002 Baclawski
6,442,545 B1 8/2002 Feldman et al.
6,453,312 B1 9/2002 Goiffon et al.
6,453,339 B1 9/2002 Schultz et al.
6,477,524 B1 11/2002 Taskiran et al.
6,492,989 B1 12/2002 Wilkinson
6,496,818 B1 12/2002 Ponte
6,502,045 B1 12/2002 Biagiotti
6,510,406 B1 * 1/2003 Marchisio ..... 704/9
6,513,036 B2 1/2003 Fruensgaard et al.
6,523,028 B1 2/2003 DiDomizio et al.
6,532,469 B1 3/2003 Feldman et al.
6,539,376 B1 3/2003 Sundaresan et al.
6,564,210 B1 5/2003 Korda et al.
6,567,797 B1 * 5/2003 Schuetze et al. ..... 707/2
6,567,804 B1 5/2003 Ramasamy et al.
6,581,068 B1 6/2003 Bensoussan et al.
6,606,620 B1 * 8/2003 Sundaresan ..... G06F 17/3061
6,606,659 B1 8/2003 Hegli et al.
6,611,825 B1 8/2003 Billheimer et al.
6,615,199 B1 * 9/2003 Bowman-Amuah ..... 706/50
6,615,253 B1 * 9/2003 Bowman-Amuah ..... 709/219
6,628,312 B1 9/2003 Rao et al.
6,629,095 B1 9/2003 Wagstaff et al.
6,629,097 B1 * 9/2003 Keith ..... 707/5
6,633,868 B1 10/2003 Min et al.
6,636,242 B2 * 10/2003 Bowman-Amuah ..... 715/764
6,636,848 B1 10/2003 Aridor et al.
6,640,238 B1 * 10/2003 Bowman-Amuah ..... 709/201
6,640,244 B1 * 10/2003 Bowman-Amuah ..... 709/207
6,640,249 B1 * 10/2003 Bowman-Amuah ..... 709/228
6,643,661 B2 11/2003 Polizzi et al.
6,651,058 B1 11/2003 Sundaresan et al.
6,654,761 B2 11/2003 Tenev et al.
6,665,662 B1 12/2003 Kirkwood et al.
6,675,159 B1 1/2004 Lin et al.
6,678,700 B1 * 1/2004 Moore et al. ..... 707/200
6,684,207 B1 1/2004 Greenfield et al.
6,701,305 B1 * 3/2004 Holt et al. ..... 706/45
6,711,585 B1 3/2004 Copperman et al.
6,715,145 B1 * 3/2004 Bowman-Amuah ..... 718/101
6,728,707 B1 4/2004 Wakefield et al.
6,732,097 B1 5/2004 Wakefield et al.
6,732,098 B1 5/2004 Wakefield et al.
6,738,765 B1 5/2004 Wakefield et al.
6,741,988 B1 5/2004 Wakefield et al.
6,742,015 B1 * 5/2004 Bowman-Amuah ..... 718/101
6,766,316 B2 7/2004 Caudill et al.
6,778,979 B2 8/2004 Grefenstette et al.
6,778,995 B1 * 8/2004 Gallivan ..... G06F 17/3071 707/739
6,810,394 B2 10/2004 Coutts et al.
6,839,699 B2 1/2005 Chan
6,842,906 B1 * 1/2005 Bowman-Amuah ..... 719/330
6,862,713 B1 3/2005 Kraft et al.
6,892,189 B2 5/2005 Quass et al.
6,895,406 B2 5/2005 Fables et al.
6,901,555 B2 5/2005 Hida et al.
6,928,398 B1 8/2005 Fang et al.
6,941,321 B2 9/2005 Schuetze et al.
6,944,626 B2 9/2005 Cameron et al.
6,961,731 B2 11/2005 Holbrook
6,970,860 B1 11/2005 Liu et al.
6,970,881 B1 * 11/2005 Mohan et al. ..... 707/102
6,976,016 B2 12/2005 Chang et al.
6,976,017 B1 12/2005 Getchius
6,978,274 B1 * 12/2005 Gallivan ..... G06F 17/30616
7,007,034 B1 2/2006 Hartman, Jr. et al.
7,010,752 B2 * 3/2006 Ly ..... 715/769
7,019,744 B2 * 3/2006 Anderson ..... 345/424
7,023,453 B2 4/2006 Wilkinson
7,194,460 B2 3/2007 Komamura
7,194,483 B1 3/2007 Mohan et al.
7,272,594 B1 * 9/2007 Lynch ..... G06F 17/2211
7,349,895 B2 3/2008 Liu et al.
7,505,989 B2 3/2009 Gardner et al.
7,533,344 B1 5/2009 Motoyama et al.
7,536,413 B1 5/2009 Mohan et al.
7,627,588 B1 12/2009 Mohan et al.
7,650,405 B2 1/2010 Hood et al.
7,676,485 B2 3/2010 Elfayoumy et al.
7,788,251 B2 8/2010 Carlson et al.
7,788,367 B2 8/2010 Motoyama et al.
7,831,559 B1 11/2010 Mohan et al.
7,890,514 B1 2/2011 Mohan et al.
8,589,413 B1 11/2013 Mohan et al.
2001/0011266 A1 8/2001 Baba
2002/0007373 A1 1/2002 Blair et al.
2002/0016800 A1 2/2002 Spivak et al.
2002/0069203 A1 6/2002 Dar et al.
2002/0091696 A1 7/2002 Craft et al.

(56) References Cited

U.S. PATENT DOCUMENTS

| | | | |
|---|---|---|---|
| 2002/0107844 | A1 | 8/2002 | Cha et al. |
| 2002/0120609 | A1 | 8/2002 | Lang et al. |
| 2002/0129015 | A1 | 9/2002 | Caudill et al. |
| 2003/0014403 | A1 | 1/2003 | Chandrasekar et al. |
| 2003/0018659 | A1 | 1/2003 | Fuks et al. |
| 2003/0041056 | A1 | 2/2003 | Bossemeyer et al. |
| 2003/0069882 | A1 | 4/2003 | Nieswand et al. |
| 2003/0074177 | A1 | 4/2003 | Bowen |
| 2003/0149586 | A1 | 8/2003 | Chen et al. |
| 2003/0163454 | A1 | 8/2003 | Jacobsen et al. |
| 2003/0187632 | A1 | 10/2003 | Menich |
| 2004/0002959 | A1 | 1/2004 | Alpert et al. |
| 2004/0019588 | A1 | 1/2004 | Doganata et al. |
| 2004/0049478 | A1 | 3/2004 | Jasper et al. |
| 2004/0083206 | A1 | 4/2004 | Wu et al. |
| 2004/0167870 | A1 | 8/2004 | Wakefield et al. |
| 2004/0167883 | A1 | 8/2004 | Wakefield et al. |
| 2004/0167884 | A1 | 8/2004 | Wakefield et al. |
| 2004/0167885 | A1 | 8/2004 | Wakefield et al. |
| 2004/0167886 | A1 | 8/2004 | Wakefield et al. |
| 2004/0167887 | A1 | 8/2004 | Wakefield et al. |
| 2004/0167907 | A1 | 8/2004 | Wakefield et al. |
| 2004/0167908 | A1 | 8/2004 | Wakefield et al. |
| 2004/0167909 | A1 | 8/2004 | Wakefield et al. |
| 2004/0167910 | A1 | 8/2004 | Wakefield et al. |
| 2004/0167911 | A1 | 8/2004 | Wakefield et al. |
| 2004/0199498 | A1 | 10/2004 | Kapur et al. |
| 2004/0215634 | A1 | 10/2004 | Wakefield et al. |
| 2004/0254916 | A1 | 12/2004 | Dettinger et al. |
| 2005/0021290 | A1 | 1/2005 | Velipasaoglu et al. |
| 2005/0021357 | A1 | 1/2005 | Schuetze et al. |
| 2005/0021512 | A1 | 1/2005 | Koenig |
| 2005/0060340 | A1 | 3/2005 | Sommerfield et al. |
| 2005/0065957 | A1 | 3/2005 | Jones |
| 2005/0065967 | A1 | 3/2005 | Schuetze et al. |
| 2005/0091197 | A1 | 4/2005 | Dettinger et al. |
| 2005/0091198 | A1 | 4/2005 | Dettinger et al. |
| 2005/0108256 | A1 | 5/2005 | Wakefield et al. |
| 2005/0149496 | A1 | 7/2005 | Mukherjee et al. |
| 2005/0154692 | A1 | 7/2005 | Jacobsen et al. |
| 2005/0154711 | A1 | 7/2005 | McConnell |
| 2005/0160080 | A1 | 7/2005 | Dawson |
| 2005/0160082 | A1 | 7/2005 | Dawson |
| 2005/0160107 | A1 | 7/2005 | Liang |
| 2005/0166152 | A1 | 7/2005 | Hida et al. |
| 2005/0192824 | A1 | 9/2005 | Schuetze et al. |
| 2005/0192926 | A1 | 9/2005 | Liu et al. |
| 2005/0193055 | A1 | 9/2005 | Angel et al. |
| 2005/0234879 | A1 | 10/2005 | Zeng et al. |
| 2005/0246320 | A1 | 11/2005 | Benysh et al. |
| 2005/0278323 | A1 | 12/2005 | Horvitz et al. |
| 2006/0015486 | A1 | 1/2006 | Nomiyama et al. |
| 2006/0047649 | A1 | 3/2006 | Liang |
| 2006/0074836 | A1 | 4/2006 | Gardner et al. |
| 2006/0100854 | A1 | 5/2006 | Ance et al. |
| 2006/0106793 | A1 | 5/2006 | Liang |
| 2006/0161423 | A1 | 7/2006 | Scott et al. |
| 2007/0033221 | A1 | 2/2007 | Copperman et al. |
| 2007/0113292 | A1 | 5/2007 | Kao et al. |
| 2007/0192272 | A1 | 8/2007 | Elfayoumy et al. |
| 2008/0065603 | A1 | 3/2008 | Carlson et al. |
| 2008/0288431 | A1 | 11/2008 | Colson et al. |

FOREIGN PATENT DOCUMENTS

| | | | |
|---|---|---|---|
| WO | WO-00063841 | A1 | 10/2000 |
| WO | WO-0122280 | A2 | 3/2001 |
| WO | WO-0239254 | A1 | 5/2002 |
| WO | WO-03040892 | A2 | 5/2003 |
| WO | WO-2004053645 | A2 | 6/2004 |
| WO | WO-2005069881 | A2 | 8/2005 |
| WO | WO-2007047252 | A2 | 4/2007 |

OTHER PUBLICATIONS

Ankerst, et al., "DataJewel" Tightly Integrating Visualization with Temporal Data Mining, ICDM Workshop on Visual Data Mining, Melbourne, FL, p. 19, Nov. 19-23, 2003.

Arents et al., "Concept-Based Retrieval of Hypermedia Information: From Term Indexing to Semantic Hyperindexing," Information Processing &Management, vol. 29, No. 3, pp. 373-386, May-Jun. 1993.

Belew, R., "A Connectionist Approach to Conceptual Information Retrieval," ICAIL, May 27-29, 1987.

Bhatia et al., "Conceptual Clustering in Information Retrieval," Systems, Man, and Cybernetics, Part B, IEEE Transactions, v. 28, issue 3, pp. 427-436.

Boeing Frontiers, "Text Mining, for Golden Results," Jul. 2005, p. 50.

Botev et al. "Context-sensitive keyword search and ranking for XML" Eighth International Workshop on the Web and Databases, Jun. 16-17, 2005.

Chinese Office Action for Application No. 200680045412.0 dated Jul. 8, 2010.

Chinese Office Action, CN 200680045412.0 dated Feb. 5, 2010.

Cross, Fuzzy semantic distance measures between ontological concepts, IEEE, vol. 2, Jun. 27-30, 2004, pp. 635-640.

Crouch, C. et al., Experiments in automatic statistical thesaurus construction, Proceedings of the Fifteenth Annual International ACM SIGIR Conference on Research and development in Information Retrieval, pp. 77-88, Jun. 21-24, 1992.

Deerwester et al., "Indexing by latent semantic analysis," Journal of the Society for Information Science, vol. 41, No. 6, 391-407, Sep. 1990.

Dumais et al., "Inductive Learning Algorithms and Representations for Text Categorization", Proceedings of the seventh international conference on information and knowledge management, pp. 148-155, ACM Press, 1998.

Dumais et al "Optimizing Search by Showing results in Context," SIGCHI '01, Mar. 31-Apr. 5, 2001.

European Examination Report for Application No. 06816600.8, dated Nov. 15, 2011.

European Search Report issued in EP Application No. 06816600.8, dated Jun. 15, 2009, 6 pgs.

Fagan, J. L., "Automatic Phrase Indexing for Document Retrieval," Proc. of the Tenth Annual International ACM SIGIR Conference on Research and Development in Information Retrieval, pp. 91-101, Jun. 3-5, 1987.

Feldman, "Tutorial 4, Mining Unstructured Data", KDD Tutorial Notes, pp. 182-236, 1999.

Finkelstein et al., "Placing search in context: The concept revisited," Tenth International Conference on World Wide Web, pp. 406-414, May 1-5, 2001.

Fishwick et al., Ontologies for modeling and simulation: issues and approaches, Dec. 5-8, 2004, IEEE, vol. 1, 6 pages.

Giger, H. P., "Concept Based Retrieval in Classical IR Systems," Proceedings of the Eleventh Annual International ACM SIGIR Conference on Research and Development in Information Retrieval, May 1998, pp. 275-289.

Grotevant, S.M. and Foth, D., The Power of Multidimensional Analysis (OLAP) in Higher Education Enterprise Reporting Strategies, presented at CUMREC 1999, printed Feb. 27, 2006 from http://www.educause.edu/ir/library/html/cmr9917/cmr9917.html, 8pages.

International Search Report and Written Opinion, PCT/US10/30801, filed Apr. 13, 2010, ISR/WO dated Jun. 10, 2010.

International Search Report for International Application No. PCT/US06/39511, dated Apr. 25, 2007, 3 pages.

Jain et al., Data Clustering: A Review, ACM Computing Surveys, vol. 31, No. 3, Sep. 1999.

(56) References Cited

OTHER PUBLICATIONS

Jang, H. W.Park, S.Y., "Keyfact Concept for an Information Retrieval System," Proc. of Natural Language Processing Pacific Rim Symposium, pp. 510-513, Dec. 4-7, 1995.
Japanese Office Action for Application No. 2008-535618, dated Jan. 19, 2012.
Jun, M.S. & Park, S. Y. "Keyfact-Based Information Retrival System", International Symposium on Digital Library, pp. 521-554 (1997).
Kolda et al., A Semidiscrete Matrix Decomposition for Latent Semantic Indexing in Information Retrieval, ACM Transactions on Information Systems (TOIS), vol. 16, Issue 4, pp. 322-346, Oct. 1998.
Lawrence, S., "Context in Web Search," Bulletin of the Technical Committee on Data Engineering, IEEE Computer Society, vol. 23, No. 3, pp. 25-32, Sep. 2000.
Leake et al. "Exploiting rich context: An incremental approach to context-based web search," Proceedings of Fifth International and Interdisciplinary Conference on Modeling and Using Context, Paris, France, vol. 3554, pp. 254-267, Jul. 5-8, 2005.
Leake et al., "Towards context-based search engine selection," Sixth International Conference on Intelligent User Interfaces, Santa Fe, New Mexico, pp. 109-112, Jan. 14-17, 2001.
Notice of Allowance, U.S. Appl. No. 10/087,053, filed Mar. 1, 2002, dated Mar. 28, 2005.
Notice of Allowance, U.S. Appl. No. 10/393,677, filed Mar. 19, 2003, dated Dec. 29, 2006.
Notice of Allowance, U.S. Appl. No. 10/677,492, filed Oct. 3, 2003, dated Jul. 10, 2009.
Notice of Allowance, U.S. Appl. No. 11/275,048, filed Dec. 5, 2008, dated Apr. 27, 2010.
Notice of Allowance, U.S. Appl. No. 11/275,050, filed Dec. 5, 2005, dated Dec. 2, 2008.
Notice of Allowance, U.S. Appl. No. 11/548,456, filed Oct. 11, 2006, dated Apr. 1, 2010.
Notice of Allowance, U.S. Appl. No. 11/656,017, filed Jan. 22, 2007, dated Oct. 5, 2009.
Notice of Allowance issued in U.S. Appl. No. 10/695,426, dated Jun. 11, 2013.
Notice of Allowance issued in U.S. Appl. No. 11/275,046, dated Oct. 6, 2010.
Notice of Allowance issued in U.S. Appl. No. 10/393,677, dated Jul. 13, 2006.
Notice of Allowance issued in U.S. Appl. No. 10/087,053, dated May 12, 2005.
Office Action U.S. Appl. No. 11/275,050, filed Dec. 5, 2005, Office Action dated Jul. 29, 2008.
Office Action U.S. Appl. No. 11/656,017, filed Jan. 22, 2007, Office Action dated Jan. 26, 2009.
Office Action, U.S. Appl. No. 10/087,053, filed Mar. 1, 2002, Office Action dated Aug. 20, 2004.
Office Action, U.S. Appl. No. 10/393,677, filed Mar. 19, 2003, Office Action dated Dec. 7, 2005.
Office Action, U.S. Appl. No. 10/677,492, filed Oct. 3, 2003, Office Action dated Apr. 21, 2008.
Office Action, U.S. Appl. No. 10/677,492, filed Oct. 3, 2003, Office Action dated Aug. 27, 2007.
Office Action, U.S. Appl. No. 10/677,492, filed Oct. 3, 2003, Office Action dated Dec. 23, 2008.
Office Action, U.S. Appl. No. 10/677,492, filed Oct. 3, 2003, Office Action dated Feb. 27, 2007.
Office Action, U.S. Appl. No. 10/677,492, filed Oct. 3, 2003, Office Action dated May 2, 2006.
Office Action, U.S. Appl. No. 10/695,426, filed Oct. 3, 2003, Office Action dated Nov. 9, 2009.
Office Action, U.S. Appl. No. 10/695,426, filed Oct. 3, 2003, Office Action dated Aug. 23, 2007.
Office Action, U.S. Appl. No. 10/695,426, filed Oct. 3, 2003, Office Action dated Jun. 17, 2008.
Office Action, U.S. Appl. No. 10/695,426, filed Oct. 3, 2003, Office Action dated Mar. 5, 2009.
Office Action, U.S. Appl. No. 11/275,046, filed Dec. 5, 2005, Office Action dated Jul. 25, 2008.
Office Action, U.S. Appl. No. 11/275,046, filed Dec. 5, 2005, Office Action dated Mar. 18, 2009.
Office Action, U.S. Appl. No. 11/275,046, filed Dec. 5, 2005, Office Action dated Oct. 13, 2009.
Office Action, U.S. Appl. No. 11/275,046, filed Dec. 5, 2005, Office Action dated Oct. 31, 2007.
Office Action, U.S. Appl. No. 11/275,048, filed Dec. 5, 2005, Office Action dated Aug. 29, 2008.
Office Action, U.S. Appl. No. 11/275,048, filed Dec. 5, 2005, Office Action dated Dec. 11, 2007.
Office Action, U.S. Appl. No. 11/275,048, filed Dec. 5, 2005, Office Action dated Jun. 11, 2009.
Office Action, U.S. Appl. No. 11/275,050, filed Dec. 5, 2005, Office Action dated Nov. 14, 2007.
Office Action issued in U.S. Appl. No. 10/695,426, dated Jun. 15, 2012.
Office Action issued in U.S. Appl. No. 10/695,426, dated Nov. 22, 2011.
Office Action issued in U.S. Appl. No. 10/695,426, dated May 13, 2011.
Office Action issued in U.S. Appl. No. 10/695,426, dated Nov. 1, 2010.
PCT/US06/39511, filed Oct. 11, 2006, Written Opinion dated Apr. 25, 2007.
Salton, G. et al., "A Vector Space Model for Automatic Indexing," Communications of the ACM, Nov. 1975, pp. 613-620, vol. 18, No. 11.
Singh et al., Generating association Rules From Semi-Structured Documents Using an Extended Concept Hierarchy, Proceedings of the sixth international conference on information and knowledge Management, pp. 193-200, Nov. 10-14, 1997.
U.S. Appl. No. 10/695,426, filed Oct. 3, 2003, Office Action dated May 24, 2010.
U.S. Appl. No. 11/275,046, filed Dec. 5, 2005, Office Action dated Apr. 23, 2010.
U.S. Appl. No. 11/275,048, filed Dec. 5, 2005, Office Action dated Jan. 7, 2010.
U.S. Appl. No. 11/548,456, filed Oct. 11, 2006, Office Action dated Apr. 14, 2009.
U.S. Appl. No. 11/548,456, filed Oct. 11, 2006, Office Action dated Aug. 20, 2008.
U.S. Appl. No. 11/548,456, filed Oct. 11, 2006, Office Action dated Oct. 13, 2009.
U.S. Appl. No. 11/656,017, filed Jan. 22, 2007, Office Action dated Jul. 8, 2009.
U.S. Appl. No. 12/423,024, filed Apr. 14, 2009, Office Action dated Mar. 9, 2011.
U.S. Appl. No. 12/423,024, filed Apr. 14, 2009, Office Action dated Oct. 18, 2011.
H.C. Arents et al., "Concept-Based Retrieval of Hypermedia Information: From Term Indexing to Semantic Hyperindexing," Information processing & Management vol. 29, No. 3, pp. 373-386, 1993.
Belew, Richard, "A Connectionist Approach to Conceptual Information Retrieval," ICAIL '87, pp. 116-126 (1987).
Kritzestein, B., "Starlight: Knowledge Management on a Whole New Plane," Chemical and Biological Defense Info Analysis Center Newsletter, vol. 5, No. 4, Fall 2004 pp. 10-12.
"Text mining, for golden results," Boeing Frontiers, Jul. 2005, p. 50.
U.S. Appl. No. 09/393,677, filed Sep. 10, 1999, Motoyama et al.
U.S. Appl. No. 10/684,434, filed Oct. 15, 2003, Motoyama et al.
Codd, E.F. et al., *Providing OLAP to User-Analysts: An IT Mandate*, Hyperion Solutions Corporation, CA, 1993, pp. 1-20.
Haveliwala, T.H., "Topic-Sensitive PageRank: A Context-Sensitive Ranking Algorithm for Web Search," IEEE, Jul. 15, 2002, 22 pages.
Deerwester, S. et al., "Indexing by Latent Semantic Analysis," *Journal of the American Society for Information Science*, vol. 41, No. 3, pp. 391-407, Sep. 1990.

(56) References Cited

OTHER PUBLICATIONS

Nigam, K. et al., "Learning to Classify Text from Labeled and Unlabeled Documents," *Proceedings of the 15th National Conference of the American Association for Artificial Intelligence*, pp. 792-799, Jul. 1998.
Yang, Y., "An Evaluation of Statistical Approaches to Text Categorization," *Information Retrieval*, vol. 1, Issue 1-2, pp. 69-90, 1999.

* cited by examiner

FIG. 13
Analysis View cross reference Exhibit

| Keywords / Files&Links | Business | education | high-tech | laser | Search engines | surgery |
|---|---|---|---|---|---|---|
| / Innovation/ 1996 /Innovation 111196.txt | 14 | 10 | 0 | 0 | 0 | 1 |
| / Innovation/ 1996 /Innovation 72296.txt | 8 | 0 | 2 | 4 | 0 | 0 |
| / Innovation/ 1996 /Innovation 91696.txt | 12 | 1 | 0 | 1 | 0 | 0 |
| / Innovation/ 1996 /Innovation 923.txt | 16 | 1 | 0 | 0 | 0 | 0 |
| / Innovation/ 1996 /INNOVATION, 18 November, 1996.txt | 20 | 0 | 1 | 1 | 0 | 0 |
| / Innovation/ 1996 /INNOVATION, 2 December, 1996.txt | 10 | 1 | 2 | 0 | 0 | 0 |
| / Innovation/ 1996 /INNOVATION, 4 November.txt | 22 | 0 | 1 | 0 | 0 | 0 |
| / Innovation/ 1996 /INNOVATION, 9 December, 1996.txt | 10 | 1 | 1 | 0 | 0 | 0 |
| / Innovation/ 1996 /INNOVATION, August 12, 1996.txt | 6 | 2 | 1 | 0 | 0 | 0 |
| / Innovation/ 1996 /INNOVATION, August 19, 1996.txt | 7 | 0 | 1 | 0 | 0 | 0 |
| / Innovation/ 1996 /INNOVATION, August 26, 1996.txt | 24 | 0 | 1 | 0 | 0 | 1 |
| / Innovation/ 1996 /INNOVATION, October 14.txt | 12 | 0 | 1 | 0 | 0 | 1 |
| / Innovation/ 1996 /INNOVATION, October 14-2.txt | 12 | 0 | 1 | 0 | 0 | 1 |
| / Innovation/ 1996 /INNOVATION, October 7.txt | 13 | 3 | 4 | 1 | 0 | 0 |
| / Innovation/ 1996 /INNOVATION, Sept 9, 1996.txt | 16 | 1 | 0 | 1 | 0 | 0 |
| / Innovation/ 1996 /INNOVATION, Septem 30.txt | 10 | 4 | 0 | 0 | 0 | 0 |
| / Innovation/ 1996 /INNOVATION, 1 April 1996.txt | 12 | 1 | 1 | 7 | 0 | 0 |
| / Innovation/ 1996 /INNOVATION, 13 May 1996.txt | 14 | 0 | 0 | 0 | 0 | 0 |
| / Innovation/ 1996 /INNOVATION, 15 April 1996.txt | 6 | 1 | 2 | 3 | 0 | 0 |
| / Innovation/ 1996 /INNOVATION, 17 June 1996.txt | 13 | 0 | 3 | 0 | 0 | 0 |
| / Innovation/ 1996 /INNOVATION, 18 March 1996.txt | 14 | 0 | 0 | 0 | 0 | 0 |
| / Innovation/ 1996 /INNOVATION, 19 February 1996.txt | 14 | 0 | 1 | 0 | 1 | 0 |
| / Innovation/ 1996 /INNOVATION, 20 May 1996.txt | 18 | 0 | 0 | 0 | 0 | 0 |
| / Innovation/ 1996 /INNOVATION, 22 April 1996.txt | 13 | 0 | 1 | 0 | 0 | 0 |
| / Innovation/ 1996 /INNOVATION, 25 March 1996.txt | 10 | 1 | 0 | 0 | 0 | 0 |
| / Innovation/ 1996 /INNOVATION, 27 May 1996.txt | 20 | 0 | 1 | 1 | 0 | 0 |
| / Innovation/ 1996 /INNOVATION, 29 April 1996.txt | 14 | 4 | 3 | 0 | 0 | 0 |
| / Innovation/ 1996 /INNOVATION, 3 June 1996.txt | 17 | 10 | 0 | 0 | 0 | 0 |
| / Innovation/ 1996 /INNOVATION, 4896.txt | 12 | 0 | 3 | 0 | 0 | 0 |
| / Innovation/ 1996 /INNOVATION, 6 May 1996.txt | 12 | 0 | 0 | 0 | 0 | 0 |
| / Innovation/ 1996 /Innovation, 9296.txt | 11 | 1 | 0 | 0 | 0 | 0 |
| / Innovation/ 1996 /INNOVATION, June 10, 1996.txt | 14 | 0 | 0 | 0 | 1 | 2 |

FIG. 15

| | business | education | high-tech | laser | search engines | surgery |
|---|---|---|---|---|---|---|
| Total score for 1996 | 426 | 42 | 31 | 19 | 2 | 6 |
| Total number of documents | 32 | | | | | |
| Normalization number | 100 | | | | | |
| *Total normalized score for 1996* | *1331* | *131* | *97* | *59* | *6* | *19* |
| Total score for 1998 | 446 | 33 | 30 | 9 | 1 | 4 |
| Total number of documents | 32 | | | | | |
| Normalization number | 100 | | | | | |
| *Total normalized score for 1998* | *1394* | *103* | *94* | *28* | *3* | *13* |
| Total score for 1999 | 929 | 43 | 23 | 21 | 2 | 4 |
| Total number of documents | 52 | | | | | |
| Normalization number | 100 | | | | | |
| *Total normalized score for 1999* | *1787* | *83* | *44* | *40* | *4* | *8* |
| Total score for 2000 | 187 | 5 | 6 | 3 | 0 | 2 |
| Total number of documents | 7 | | | | | |
| Normalization number | 100 | | | | | |
| *Total normalized score for 2000* | *2671* | *71* | *86* | *43* | *0* | *29* |

METHOD, SYSTEM, AND COMPUTER PROGRAM PRODUCT FOR CONCEPT-BASED MULTI-DIMENSIONAL ANALYSIS OF UNSTRUCTURED INFORMATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED [APPLICATION] *APPLICATIONS*

[Benefit of priority under 35 U.S.C. §119(e) and/or 35 U.S.C. §120 is claimed to U.S. Provisional Patent Application Ser. No. 60/302,971, entitled SYSTEM FOR AND METHOD OF INTELLIGENT CATEGORIZATION OF INFORMATION, filed May 7, 2001, which application is a related application and is hereby incorporated by reference.]

[Benefit of priority under 35 U.S.C. §119(e) and/or 35 U.S.C. §120 is claimed to United States Utility patent application Ser. No. 10/087,053, entitled CONCEPT-BASED METHOD AND SYSTEM FOR DYNAMICALLY ANALYZING UNSTRUCTURED INFORMATION, filed Mar. 1, 2002, which application is a related application and is hereby incorporated by reference.]

[Benefit of priority under 35 U.S.C. §119(e) and/or 35 U.S.C. §120 is claimed to U.S. Provisional Patent Application Ser. No. 60/366,045, entitled CONCEPT-BASED METHOD AND SYSTEM FOR DYNAMICALLY ANALYZING UNSTRUCTURED INFORMATION, filed Mar. 19, 2002, which application is a related application and is hereby incorporated by reference.]

*This application claims the benefit of U.S. Provisional Application No. 60/366,045, filed Mar. 19, 2002, and this application is a continuation-in-part application of U.S. patent application Ser. No. 10/087,053, filed Mar. 1, 2002, now U.S. Pat. No. 6,970,881, which claims the benefit of U.S. Provisional Application No. 60/302,971, filed May 7, 2001. All of the above referenced applications are herein incorporated by reference.*

FIELD OF THE INVENTION

This invention pertains generally to a system, method, and computer program product for information analysis, discovery, classification and retrieval; and more particularly to a system, method, and computer program product for classifying, gathering, classifying, categorizing, and analyzing unstructured information and for tracking trends and exceptions in unstructured information objects.

BACKGROUND

Structured data or objects generally refers to data existing in an organized form, such as a relational database, that can be accessed and analyzed by conventional techniques (i.e. Standard Query Language, SQL). By contrast, so-called unstructured data or objects refer to objects in a textual format (i.e. faxes, e-mails, documents, voice converted to text, or a collection of these formats) that do not necessarily share a common organization. Unstructured information often remains hidden and un-leveraged by an organization primarily because it is hard to access the right information at the right time or to integrate, analyze, or compare multiple items of information as a result of their unstructured nature. There exists a need for a system and method to provide structure for unstructured information such that the unstructured objects can be accessed with powerful conventional tools (such as, for example, SQL, or other information query and/or analysis tools) and analyzed for hidden trends and patterns across a corpus of unstructured objects.

Conventional systems and methods for accessing unstructured objects have focused on tactical searches, that seek to match keywords, an approach that has several shortcomings. For example, as illustrated in FIG. 1, a tactical search engine 110 accepts search text 100. For purposes of illustration, suppose information about insects is desired and the user-entered search text 100 is 'bug'. The search engine scans available unstructured objects 115, including individual objects 120, 130, 140, 150, and 160. In this example, one unstructured object concerns the Volkswagen bug 120, one is about insects at night 130, one is about creepy-crawlies 140, one is about software bugs 150, and one is about garden bugs 160. The tactical search engine 110 performs keyword matching, looking for the search text 100 to appear in at least one of the unstructured objects 115. In this 'bug' example, only those objects about the Volkswagen bug 120, software bugs 150, and garden bugs 160 actually contain the word 'bug' and will be returned 170. The objects about insects at night 130, and creepy-crawlies 140 may have been relevant to the search but unfortunately were not identified by the conventional tactical search engine.

One conventional method of addressing this problem allows a user to enter detailed searches utilizing phrases or Boolean logic, but successful detailed tactical searches can be extremely difficult to formulate. The user must be sophisticated enough to express their search criteria in terms of Boolean logic. Furthermore, the user needs to know precisely what he or she is searching for, in the exact language that they expect to find it. Thus, there is a need for a search mechanism to more easily locate documents or other objects of interest, preferably searching with the user's own vocabulary. Further, such mechanism should desirably enable automatically searching related words and phrases, without knowledge of advanced searching techniques.

In another conventional method, the search is done based on meaning, where each of the words or phrases typed is semantically analyzed, as if second guessing the user (for example, Use of the term Juvenile picks up teenager). This increases the result set though, making analysis of search results even more important. Also this technique is inadequate and quite inaccurate when the user is looking for a concept like "definition of terrorism" or "definition of knowledge management", where the "concept" of the phrase is more important than the meaning of the individual words in the search term.

Even when tactical searches succeed in searching or finding information, the problem of analyzing unstructured information still remains. Analyzing unstructured information goes beyond the ability to locate information of interest. Analysis of unstructured information would allow a user to identify trends in unstructured objects as well as quickly identify the meaning of an unstructured object, without first having to read or review the entire document. Thus, there further exists a need to provide a system and methodology for analyzing unstructured information. In one situation, this need extends to system and method for tracking and optionally reporting the changing presence of words or phrases in a set of documents over time.

Prior art classification systems exist that can organize unstructured objects in a hierarchical manner. However, utilizing these classification systems to locate an object of interest requires knowing what the high-level of interest would be, and following one path of inquiry often precludes looking at other options. Thus, there is also a need for a system and method that can recognize relevant relationships between words and concepts, and can categorize an object under more than one high-level interest. Such a system and method should desirably scan objects for words or phrases and determine the presence of certain patterns that suggest the meaning, or theme, of a document, allowing for more accurate classification and retrieval.

Some prior art technologies store data and information utilizing proprietary methods and/or data structures, which prevents widespread or open access or analysis by keeping objects in a native non-standard proprietary format. Thus, there is a need to store information about unstructured objects in an open architecture and preferably in a readily accessible standard storage format, one embodiment being a relational database of which many types are known. Storage in a relational database keeps the information readily available for analysis by common tools. Where access protection is desired various known security measures may be employed as are known in the art.

The focus of many currently available prior art technologies has been to help find the one document or a known piece of information of interest from a huge source of unstructured data. However, there remains a need to analyze this untapped and largely ignored collection of unstructured data to find new trends, patterns and relationships to create actionable intelligence. This need requires the ability to look at the unstructured data in many possible ways and view points, drill down and look at details of various levels of summarizations and enable visualization of unstructured data in many ways. In short, there remains a need for a theme or concept-based method and system to analyze, categorize and query unstructured information. The present invention provides such a high precision system and method.

SUMMARY

The present invention provides a system, method and computer program and computer program product for categorizing and analyzing unstructured information. The present invention includes a analysis and categorization engine that scans available unstructured objects. The analysis and categorization engine generates structured information in the form of relational database tables, and can accept user-specific input to personalize this process further. Once these relational database data structures have been generated, conventional techniques (such as SQL) can therefore be utilized on the structured information to access the unstructured objects.

The analysis and categorization engine preferably builds a set of categories into which it will classify the unstructured objects. By scanning the categories or further training, the analysis and categorization engine captures a list of relevant concepts, where preferably each relevant concept comprises at least one word. Utilizing language relationships, thesaurus, other industry/language thesaurus and/or dictionary-lookup, the analysis and categorization engine expands the concepts into concept groupings. Each concept grouping preferably comprises at least one word and is named by a representative seed concept of at least one word. The concept groupings may be further augmented by user input and modification, allowing the analysis and categorization engine to capture language relationships and usage unique to individual users.

The analysis and categorization engine can bubble up or otherwise identify ideas and concepts embedded in a given set of unstructured data objects and present them in a structured or organized form, such as for example like a "table of contents for a magazine". One difference being that in this case, the table of contents provides a dynamically organized collection of concepts embedded in the objects. The collection can be dynamically sorted in multiple ways for the user to access the right set of concepts and view their distribution in the targeted objects.

The analysis and categorization engine receives and filters unstructured objects, and indexes objects utilizing the concept groupings and a variation of the term frequency-inverse document frequency (Tf-Idf) technique. Indexing results in a representation of the object as a selection of weighted concepts. The analysis and categorization engine preferably generates a Gaussian distribution curve for the object to assign probabilities to concepts within the object. Concepts having probabilities within a certain range are selected as key concepts to represent the theme, or meaning, of an object. By setting the range, it possible to dramatically increase precision and recall for objects classification. The analysis and categorization engine utilizes the key concepts and their probabilities to determine an object's score for each category, and associates an object with every category achieving a specified score.

Output generated by the analysis and categorization engine such as concept groupings, object scores, and the users to whom they pertain may be stored in an open architecture format, such as a relational database table. Such storage enables conventional analysis techniques to be employed over unstructured data.

Aspects of the invention also provide an object concept based search engine. The search engine accepts search text, analyzes the text for concepts and retrieves objects represented by those concepts. User preferences are learned by the search engine through passing previously unknown concepts extracted from the query text to the analysis and categorization engine. The analysis and categorization engine incorporates the new concepts into the concept groupings and updates its object scoring based on the new concept groupings.

A novel graphical user interface is also optionally but advantageously provided to assist the user in viewing, organizing, and analyzing unstructured objects, and performing the object concept search and subsequent analysis. The structured information generated by the analysis and categorization engine facilitates integrated views of unstructured objects by concept as well as analysis—for example, capturing trends over time.

Other features and advantages of the invention will appear from the following description in which the preferred embodiments have been set forth in detail, in conjunction with the accompanying drawings.

BRIEF DESCRIPTION OF THE DRAWINGS

FIG. 13 illustrates an embodiment of an exemplary analysis view display screen image.

FIG. 15 illustrates an embodiment of another data structure and analysis tool.

DETAILED DESCRIPTION OF EMBODIMENTS

Exemplary embodiments are described with reference to specific structural and methodological embodiments and configurations. Those workers having ordinary skill in the art in light of the description provided here will appreciate that various changes and modifications can be made while remaining within the scope of the claims. For example, the categorization process is presented in a preferred order utilizing preferred (Gaussian) statistics; however, ordering the steps differently or utilizing a different statistical methodology could achieve the same or analogous end. Examples of relational database tables are given, but those skilled in the art will appreciate that these tables could be structured differently and remain within the scope of the claims. Other variations, changes, and/or modifications may be made without departing from the scope of the invention.

The inventive system, method, data structure, and computer program software and computer program software product have particular applicability to information and intelligence gathering and analysis. Such information and intelligence identification, gathering, and analysis may be applied in economic, financial, technological, sociological, informatics, educational and learning, and security contexts, as well as in many other disciplines.

Figure 1:
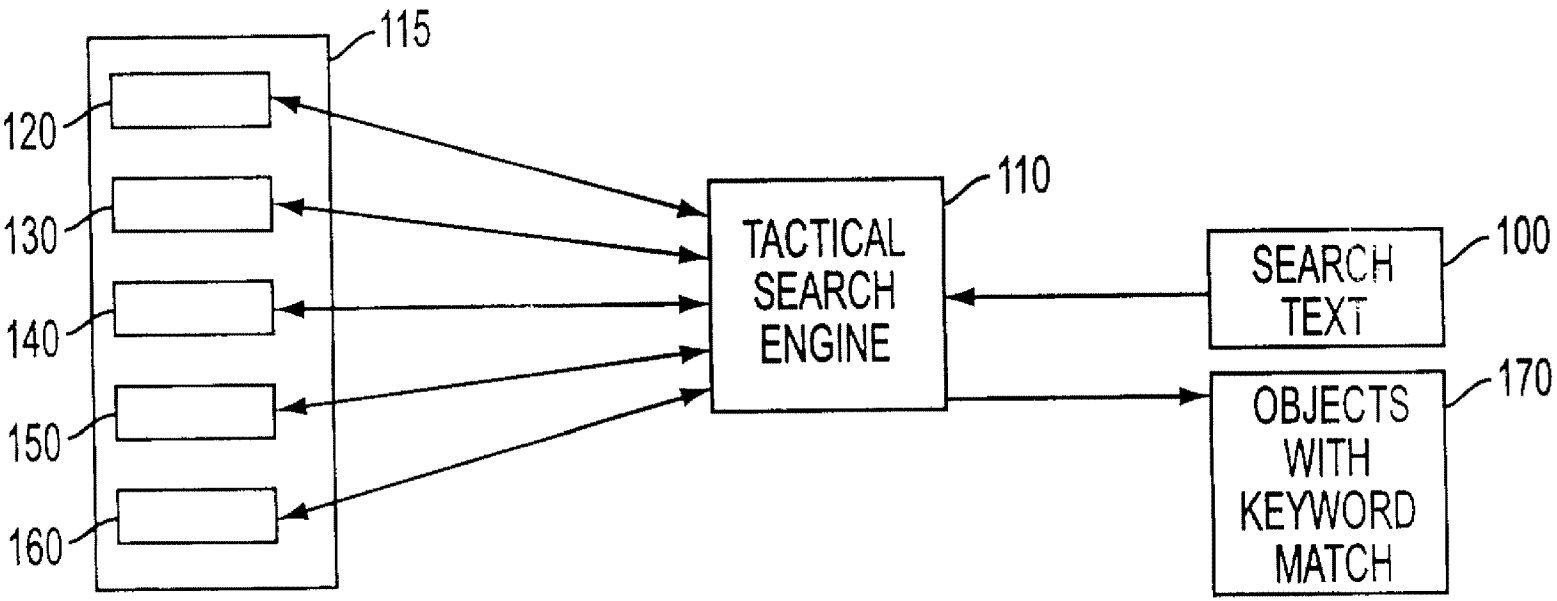
FIG. 1 (PRIOR ART)
FIG. 1 illustrates a conventional tactical search engine, and the manner in which a tactical search is performed.
Figure 2:
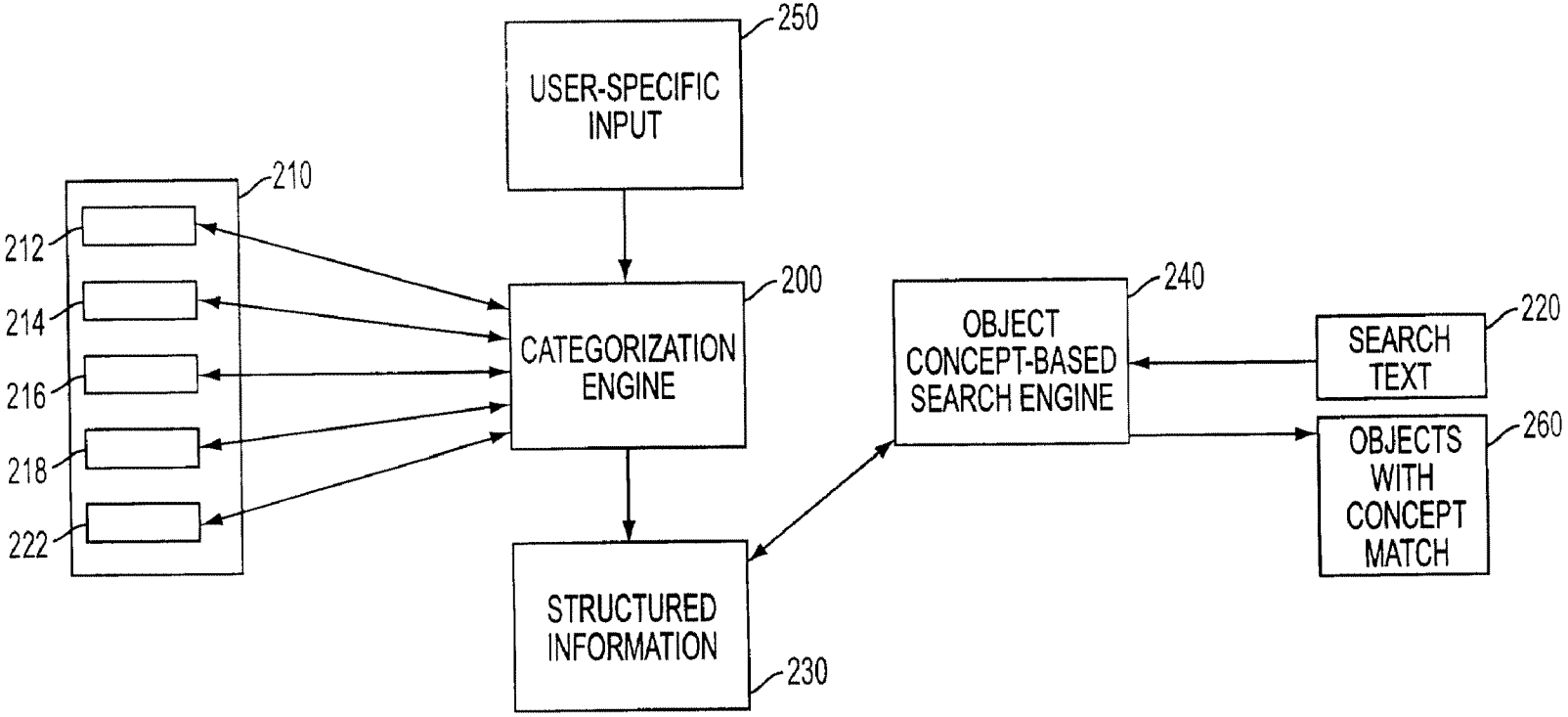
FIG. 2 is an outline of the structure of a system to categorize and analyze unstructured information, according to an embodiment of the present invention.

With reference to FIG. 2, there is illustrated an outline of the organization of an embodiment of the present system to categorize, search, and deduce the theme, or meaning, of unstructured information. A analysis and categorization engine 200 accesses unstructured objects 210, including individual unstructured objects 212, 214, 216, 218, and 222. The analysis and categorization engine 200 also accepts user-specific input 250 and can include search text 220. Based on the unstructured objects 210, the user input 250 and search text 220, the analysis and categorization engine 200 generates structured information 230. Conventional analysis tools can be employed to access or analyze the unstructured objects 210 through this structured information 230. One embodiment of the present invention provides an object concept-based search engine 240. The search engine 240 accepts search text 220 and utilizes the structured information 230 generated by the analysis and categorization engine 200 to return unstructured objects having a concept match 260. Unlike the conventional approach of FIG. 1, the approach illustrated in the FIG. 2 embodiment includes a search capability but returns objects with a concept, not keyword, match and advantageously returns relevant unstructured objects having a conceptual match to the search text even if the text of the returned object does not contain any of the search words. This is different from extracting objects having the concept of what was typed in which is interpolating the typed in text, generating conceptually matching words or phrases and looking for presence or absence of them in the targeted object space. It is further noted that their may optionally be a connection between search text 220 and analysis and categorization engine 200 as any search criteria may further refine the engine's understanding of the user.

Figure 3:
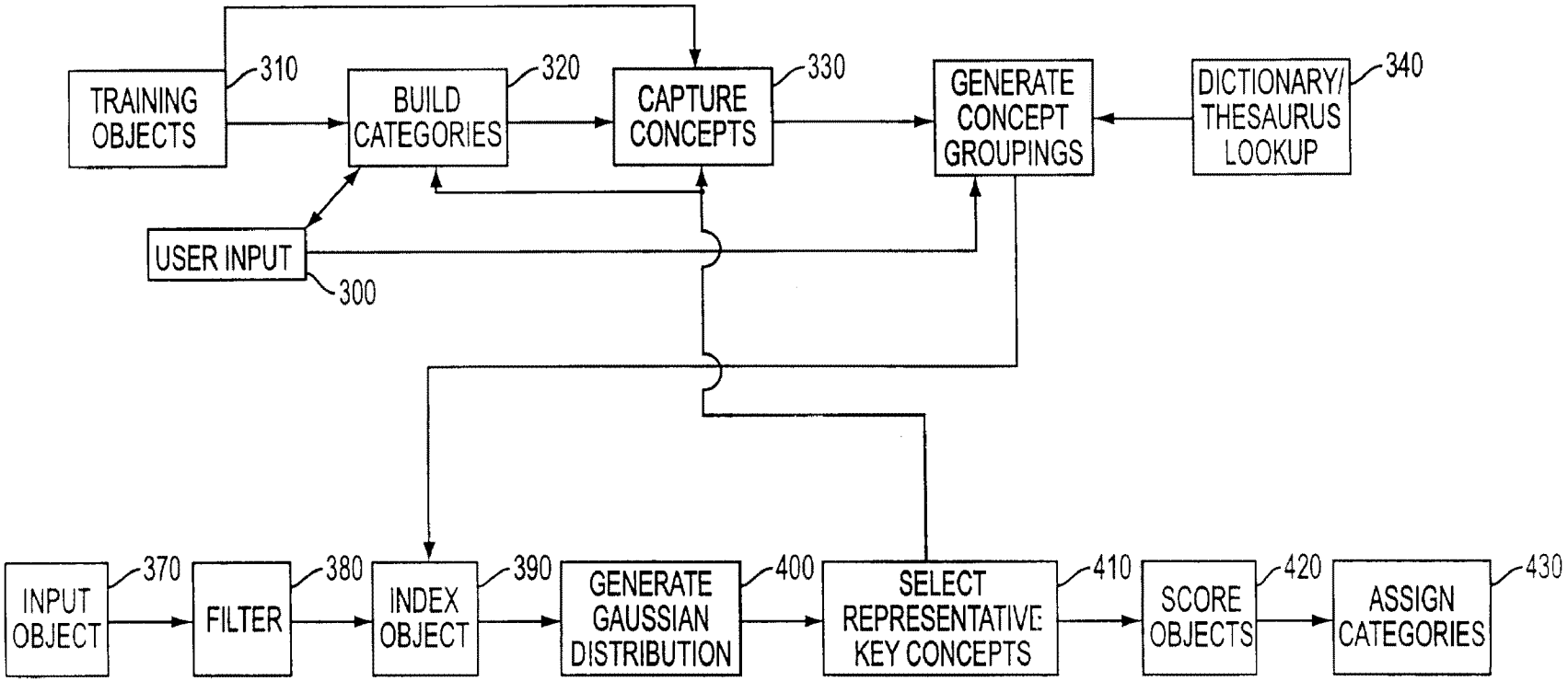
FIG. 3 is an outline of the procedure performed by the analysis and categorization engine, according to an embodiment of the present invention.

An embodiment of the analysis and categorization engine 200 operates as outlined in FIG. 3 to generate or otherwise determine structured information from or about unstructured objects. This generation or determination is described in greater detail hereinafter. Briefly, the analysis and categorization engine 200 generates, determines, or builds categories (step 320) and assigns unstructured objects 210 to categories (step 430). A 'category' as used herein denotes a set of words or phrases that become related to one another when they are grouped or otherwise identified as forming or belonging to a category.

User input 300 and/or training objects 310 are utilized by the analysis and categorization engine to build (step 320) categories. The analysis and categorization engine 200 uses the built categories to capture concepts (step 330). A 'concept' as used herein denotes a word or phrase. With further user input 300 and a dictionary or thesaurus look-up (step 340), the analysis and categorization engine generates concept groupings (step 360). A 'concept grouping' as used herein denotes a group of concepts related in one or more predefined ways—such as synonyms or meaning words and phrases discovered in a dictionary look-up or set up by the user using a concept customization interface. Each concept grouping is headed, or named, by one concept—referred to herein as a seed concept.

The analysis and categorization engine 200 accepts an unstructured object as input (step 370), filters the object (step 380) and utilizes the concept groupings to index the object (step 390). Indexing, as generally known in information retrieval, refers to representing an object as a function of the parameters that will be utilized to search, analyze, or retrieve the object. In a preferred embodiment of the present invention, the indexing step 390 comprises generating a vector representation of the object, having a number of dimensions where each dimension has a weight. Each dimension corresponds to a seed concept, and the weight given to each seed concept depends in part on the frequency of occurrence of that concept within the object.

The index is utilized by the analysis and categorization engine 200 to generate a Gaussian distribution (step 400) of weights for each object and select a set of concepts to represent each object (step 410), herein referred to as key concepts. The objects are scored (step 420) and assigned to categories (step 430). Recall as described relative to FIG. 2 that the analysis and categorization engine stores the information it extracts in a structured open architecture format 230 for use by available structured analysis tools and the provided interface.

Embodiments of the present invention illustrating a more detailed description of the steps outlined in FIG. 3 is given below. Throughout the steps taken by the analysis and categorization engine, as outlined in FIG. 3, output or information generated or determined by the analysis and categorization engine is stored as structured information 230 in an open architecture format. In the embodiments below, specific examples of exemplary relational database tables containing preferred output of the analysis and categorization engine are described. It is to be understood that a variety of information output from any stage of the analysis and categorization engine's procedure may be stored, or may not be stored, while remaining within the scope of the present invention.

With reference to FIG. 3, one or more unstructured objects are input (step 370) and optionally but advantageously filtered (step 380), to remove first predetermined undesired information and/or to extract only other second predetermined information. In one embodiment, the filtering involves removing one or more of formatting characters, special characters and encoding of information. Other or different characters or information may also be removed when present. It is noted that for certain image files (for example, JPEG, GIF, TIFF, or BMP file types) or other file or information items that do not necessarily provide a title, there may not be a concept that is extracted from such no-existent title. The output of the filtering process (step 380) is a filtered object—preferably extracted text along with properties of the unstructured object, such as created date, size, title, description, and modified date. Filters are widely available and known in the art for most object formats. It is noted that for certain image files (for example, JPEG, GIF, TIFF, or BMP file types) or other file or information items that do not necessarily provide a title, there may not be a concept that is extracted from such no-existent title.

Advantageously, each object is available for access using the Universal Naming Convention (UNC) or via some other procedure for providing a unique (globally or locally unique) identifier or ID. The UNC is a way to identify a shared file in a computer without having to specify (or know) the storage device it is on. In the Microsoft Windows operating system, the naming format is \\servername\sharename\path\filename. Analogous naming formats are known for other operating systems. Each unstructured object is stored on one or more computer storage media accessible to the analysis and categorization engine through the UNC. A pointer 30 to the object's physical storage location is generated, for example, by the engine as an integer between −2,147,483,648 to 2,147,483,647. Other methods of generating a physical pointer may be utilized. The pointer 30 is advantageous in that an object can be viewed or analyzed by more than one user without the need to physically copy the object and consume additional space on the computer storage media. Object properties may also be stored in a relational database table. Object properties may include, for example, a string of text representing an object description 34 such as a name or file type, an object created date 36 comprising a numeric string representing the day, month, and year the object was created, and an object modified date 38 comprising a numeric string representing the day, month, and year the object was last modified. A variety of object properties could be stored utilizing a variety of storing methodologies or naming protocols.

In one exemplary object relational database table, shown here as Table 1, the global object IDs 30 and object properties, such as object description 34, object created date 36, object modified date 38, and the object size 40 in bytes [are stored as structured information 230 in an open architecture format, a relational database table. Other object properties, attributes, and the like may also be stored in the object relational database table and tracked,

TABLE 1

| Global Object ID (30) | Object description (34) | Object created date (36) | Object modified date (38) | Object size (units) (40) |
|---|---|---|---|---|
| 500 | INNOVATION Dec 16.txt | Dec. 15, 1996 | Dec. 16, 1996 | 50000 |
| 501 | INNOVATION May 16.txt | May 15, 1996 | Dec. 1, 1996 | 250000 |
| . . . | . . . | . . . | . . . | . . . |

Figure 4:
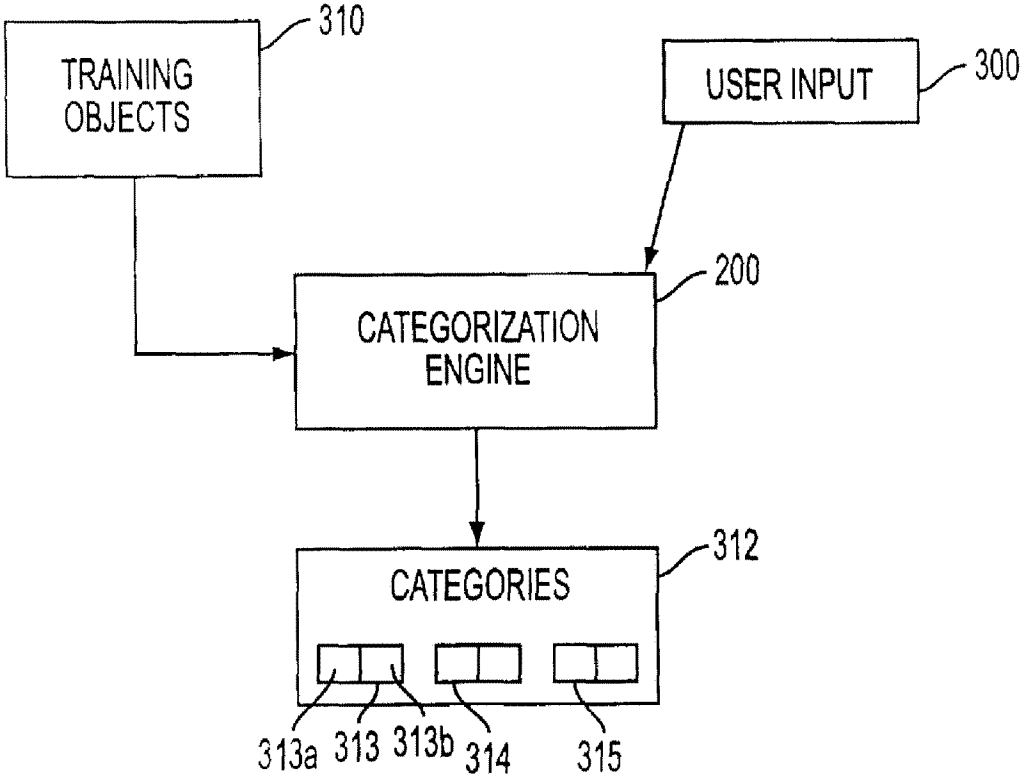
FIG. 4 illustrates the formation of categories according to an embodiment of the present invention.

As illustrated in the embodiment of FIG. 4, categories 312, including individual categories 313, 314, and 315 are built (step 320 of FIG. 3) by the analysis and categorization engine 200 after scanning a set of training objects 310, or in concert with user input 300, or by a combination of these two approaches. One exemplary structure for forming a category is to provide or otherwise generate a category name 313a and a category description 313b that together define the category 313. A description is a set of words that are in some way related to the category name, and defines the category further. Categories may be specific to a user, or groups of users, and may be built through user input or by automatically training the analysis and categorization engine 200 on a set of objects, or through a combination of these two techniques. Three exemplary embodiments of category building techniques are described immediately below.

In a first exemplary embodiment, (1) a user 300 inputs both category name 313a and description 313b. In this case, the user provides the category name or other category identification and a description of the category, where these are desirably provided in natural language. A natural language description is, generally, a descriptive sentence or paragraph further refining what the category name is meant to signify for the user. One illustrative example is:

Category name: Golf

User-generated category description: Game played with drivers or woods and irons. TPC, U.S. Open, British Open, Australian Open and the Masters at Augusta are the events I like the most.

In a second exemplary embodiment, (2) user 300 inputs category name 313a and the analysis and categorization engine 200 generates the corresponding category description 313b. In this case, the user provides the name of the category and a number of training objects 310 forming or belonging to the category. The analysis and categorization engine 200 scans the training objects 310 to generate a set of descriptive words and/or phrases to use as the category description 313b. One illustrative example is:

Category name: Golf

The user uploads a number of documents or information items (or identifies references to documents or other information), such as, for example, web sites on Golf game, U.S. open, British open, Australian open and TPC tour; books, periodicals, or publications; or other sources of information which would provide descriptive input for a golf category.

Analysis and categorization engine-generated category description: Golf, woods, irons, U.S., British, Australian, shots, game, putt, open, TPC, tour, player, handicap, par, lead.

The manner in which the analysis and categorization engine generates the category description from the uploaded or otherwise identified documents or information items are described in further detail hereinafter.

As described in greater detail elsewhere in this specification, once the object has been converted into a relevant reduced dimensionality vector, where the primary dimensions of the vector space are seed concepts occurring in that document, the analysis and categorization engine 200 selects a set of these dimensions, or seed concepts, that are or correspond to key concepts that are most representative of the object (FIG. 3, step 410).

After step 410 (See FIG. 3), the representative key concepts for objects under a category are known. As referenced in Table 5, each object and key concept combination has a probability 68 associated with it. The goal is to find out the representative concepts for the category itself by training the system and algorithm or method. This is primarily influenced by two factors. The overall probability 68 contributed by the key concept to the category under which this object belongs (for example, as determined by score ratio R2) and number of objects under a category a given concept occurs (for example, as determined by the object ratio R1). Thus we calculate two ratios for every key concept identified under the category as follows:

1. Object ratio (R1) is total number of objects a key concept occurs under a category over total number of objects under a category.
2. Score ratio (R2) is the total of the probability 68 of the key concept under the category over total of all the probabilities of all the key concepts under the category.

From these two ratios, the composite ratio of key concepts under a given category may be determined. This composite ratio R3 is R1*R2. If this composite ratio R3 falls within the high-bound 29 or low-bound 27 criteria, then this key concept becomes a concept defining the category as well. It should be noted that this training can occur at any time based on user input and can be controlled by the user through an interface.

In a third exemplary embodiment, (3) the analysis and categorization engine 200 creates both category name and description. The user 300 provides training objects 310 pertaining to Golf, such as, for example, U.S. open, British open, Australian open and TPC tour. The system, specifically the analysis and categorization engine 200, generates both the category name 313a and the category description 313b. In the example, the system generates category name 313a and category description 313b as follows.

System generated category name: Golf, woods, irons, U.S., British, Australian, Shots.

System generated category description: Golf, woods, irons, U.S., British, Australian, Shots, game, putt, open, TPC, tour, player, handicap, par, lead.

The category building procedure 320 for generating the category name and category description from the uploaded objects is described in greater detail hereinafter. It is noted that the examples are illustrative only, and that a variety of methodologies could be utilized to build categories for use in sorting or analyzing objects. For example, a category may simply consist of a list of words or phrases, it need not have a 'name' or 'description' as utilized in the example.

The generated category name will generally be a subset of category description. The creation of category description was described in the previous section. We choose the top $N_k$ (for example choose $N_k$=5, but any other selected number may be chosen) highest key concepts from the category description as the category name and the selection of concepts for the name and description. Creating a category name is based on number of objects for object name and description creation. Generally, the more the number of objects in the training set, the better the generated concept name and description. The user can group a set of objects and instruct the analysis and classification engine to create category description and category name.

Figure 5:
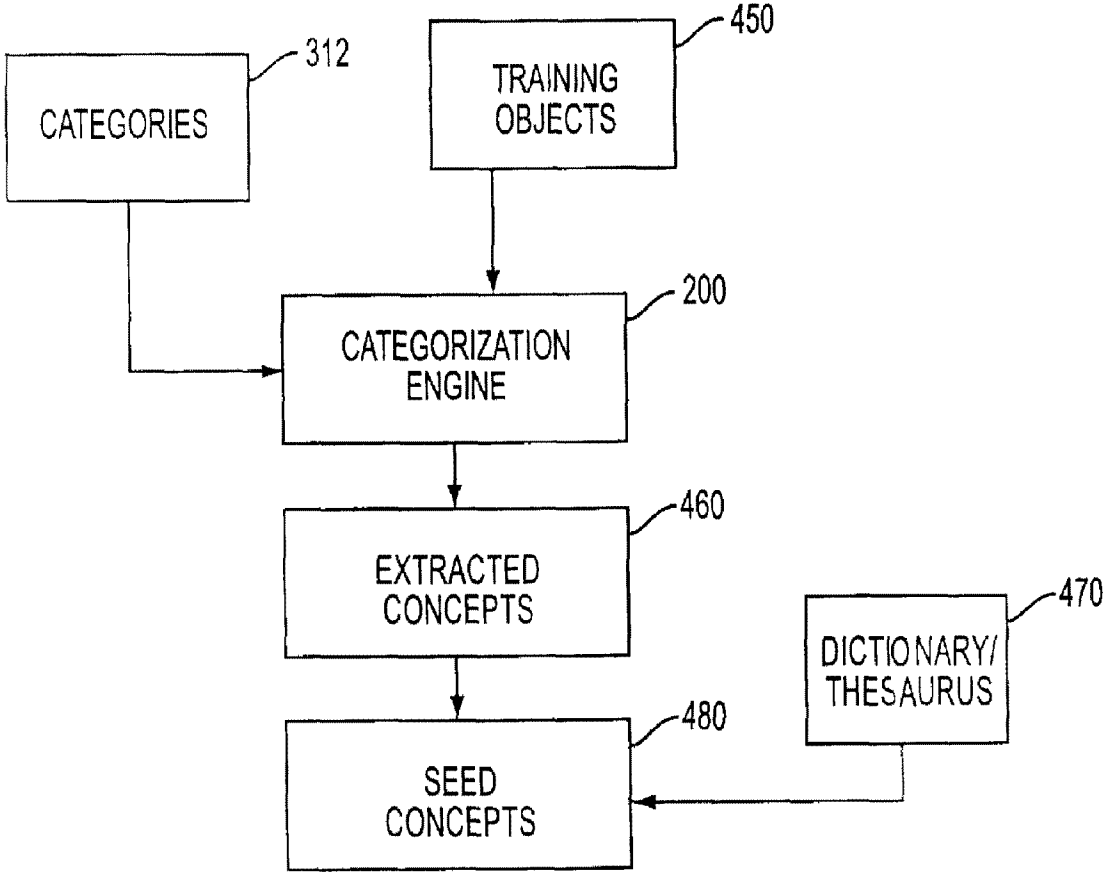
FIG. 5 is an outline of the procedure to generate seed concepts, according to an embodiment of the present invention.

With further reference to the embodiment in FIG. 3, once the categories 312 have been established (note that they may be modified or updated as desired to reflect further intelligence, knowledge, understanding, or data), the analysis and categorization engine 200 captures (step 330) a set of concepts. This capturing process is further depicted in FIG. 5. A concept is usually at least one word and can be a phrase comprising several words. The concepts are preferably given a global concept ID number 42. This number is generated generally by the database engine and is stored as an unique identifier and is preferably between −2,147,483,648 and 2,147,483,647 for reasons of computational and addressing efficiency though there are no procedurally based limits. Other numbering or naming schemes may be utilized to generate global concept IDs. Global concept ID numbers 42 and concept text 44 along with an optional but advantageously provided date/time indicator, such as a timestamp 46, are stored in a concept relational database table as exemplified by Table 2 below. An expiration or inactivation date and time 48 may also optionally be provided. These dates and times assist in assessing relevance and currency of the information which may change over time. All concepts may be stored in such table or tables.

It is noted that in one embodiment, the analysis and categorization engine captures or identifies concepts from category names and descriptions during classification, but in one embodiment, the relationships between different words and phrases are created during the thesaurus look-up and are continuously maintained and refined by user interaction.

TABLE 2

| concept id (42) | concept text (44) | Created date (46) | Inactivated date (48) |
|---|---|---|---|
| 25 | Innovation | Dec. 15, 1996 | |
| 26 | Discovery | Dec. 16, 1996 | |

A seed concept is a concept that will serve as a basis for a concept grouping and is a sub-type of concept. As described, this is either generated by the system when words get extracted (refer word extraction step) or when user provides category name and description. Thus the seed concept id is assigned from the same pool of concept identifiers. Three examples of capturing or generating seed concepts are given below.

In one embodiment, the analysis and categorization engine 200 accepts a set of training objects 450 that define a category. The engine extracts seed concepts based on Category description. In this case, the category description is parsed to get individual words by removing the stop and noise words. The resulting set of words become seed concepts.

In another embodiment, the analysis and categorization engine 200 scans all available documents (such as those stored in a defined directory or a list) and extracts a list of the most frequent keywords and their related words. The analysis and categorization engine 200 utilizes categories 312 and training objects 450 to extract a list of concepts 460.

Seed concepts 480 are refined by a dictionary and thesaurus look-up 470, or according to any other procedure for generating seed concepts. The thesaurus can be augmented by use of additional thesaurus as well. For example, in addition to the English thesaurus, for legal industry we can include a legal thesaurus that will be first accessed for the look-up. This word extraction or generation procedure may, for example, utilize semantic analysis rules or policies and take into account word or phrase occurrence frequency, synonymy, and/or polysemy, grammatical part of speech as well as other optional attributes and/or rules. In some instances, the rules may vary depending upon the number and size of documents or other information items available. An electronic dictionary and thesaurus 470 in the form of a database stored in a memory or storage device are used to generate additional words and/or phrases. Based on the set of extracted words, seed concepts are generated.

The procedure for extraction uses a variation of Latent Semantic Indexing, a well known information retrieval technique. The idea is to extract best possible words out of every document and build a superset of words or phrases and their relationships that would then be able to describe the object collection. The first step in this process is extracting most frequently occurring words from every document. Documents can be sampled in arithmetic or geometric progression and the sampling selection can be based on several criteria such as time, size, author, and the like. The type and frequency of sampling can be modified by the user. The number of words to be extracted from a document is limited by a constant that can be set by the user. Also in order for smaller documents to contribute at the same proportion as the bigger documents, the word extraction process has to be normalized. According to one embodiment, the steps for extracting words from an individual object is as follows:

An assumption is made that every kilobyte of text has approximately W words (in one implementation, W is set to be 150 but a different number may be selected). Then the number of words ($n_w$) that can be extracted from a document is given by the formula $n_w=D_s/W$ where $D_s$ is the document size. The user can control the upper limit of $n_w$ by using upper limits. In the first step, the system and method will extract up to $n_w$*10 frequently occurring words from the document. In the next step, for every word extracted, part of speech will be determined based on grammar look-up. In one embodiment, a proper noun will be given the highest weightage $W(word_i)$, a verb will be given lowest weightage, and a polysemy word will be given medium weightage. (Other weightage rules or policies may alternatively be implemented.) Now the overall weightage by word for every selected word is $W(word_i)*f(word_i)$ where $f(word_i)$ is the number of occurrences of the words. Now choose $n_w$ in the descending order of $W(word_i)*f(word_i)$. If word collection $n_w$ from object $O_1$ is called $n_{wo1}$ then the superset, $\{n_{wo1}, n_{wo2}, \ldots n_{wom}\}$ becomes a collection of seed concepts for m objects where $\{O_1 \ldots O_m)\}$ is a collection of individual objects.

In yet another embodiment, a list of words and phrases is generated from a user provided description for a category. For at least some applications, this is a preferred way of generating seed concepts as user-specific information is directly input to the system and algorithm or method. The user can input one or more phrases each within double quotes (or other identifiers) and the engine will capture and store each of them as a multi-word concept. In one embodiment, multi-word concepts are given as much weight or weightage as a proper noun for part-of-speech.

Figure 6:
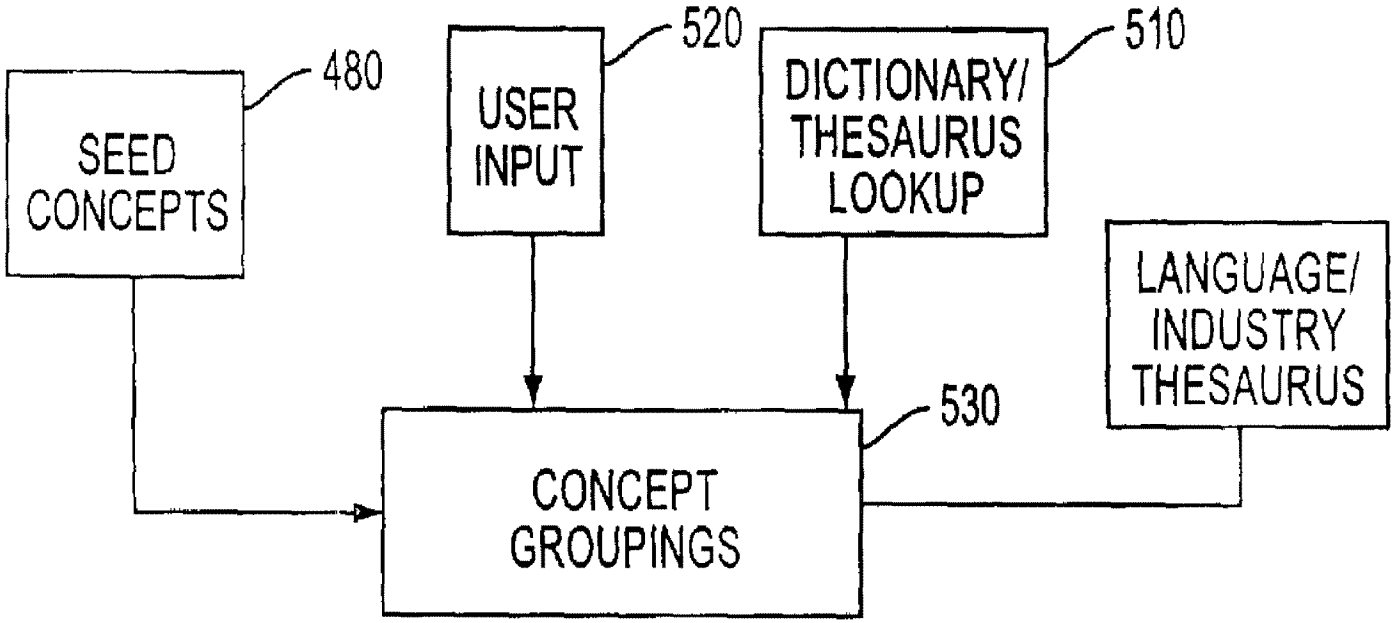
FIG. 6 is an outline of the procedure to generate concept groupings, according to an embodiment of the present invention.

Once seed concepts 480 have been generated (see FIG. 5), they are extrapolated using a seed concept extrapolation procedure into concept groupings 530 as depicted in FIG. 6. Seed concepts 480 are augmented utilizing one or both of a dictionary/thesaurus look-up 510 and user-entered words 520 to form concept groupings 530 which are a set of related concepts. The concepts in the concept groupings are related in predetermined, structured ways and are stored together, for example, in a relational database table that demonstrates their relatedness. The analysis and categorization engine advantageously extracts not only words from the dictionary or thesaurus, but the relationship between the words and the seed concept and optionally but advantageously the part of speech as well.

Figure 7:
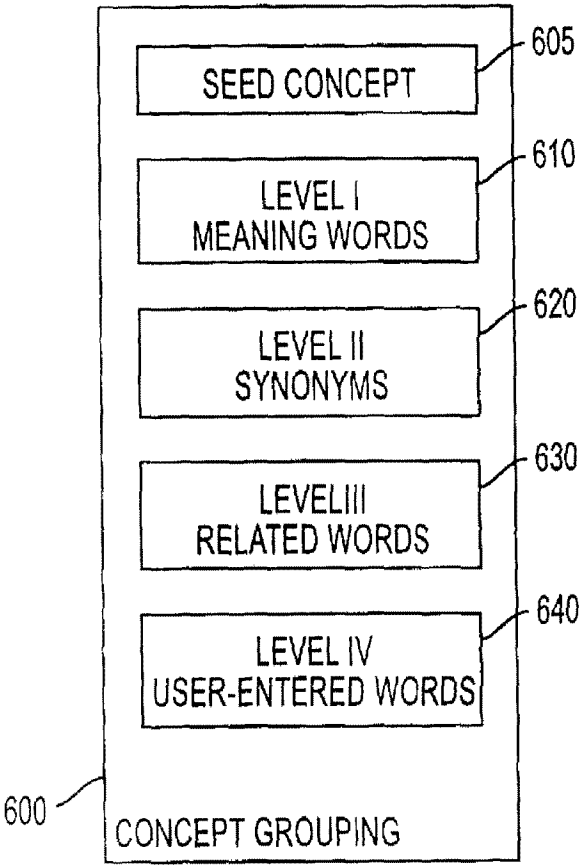
FIG. 7 is an example of a concept grouping, according to an embodiment of the present invention.

FIG. 7 illustrates an exemplary embodiment of a concept grouping 600 that employs four levels where each level denotes a conceptual manner by which the concepts are related—meaning words 610, synonyms 620, related words 630, and user-entered words 640, although more than or fewer than four levels could be used. In the FIG. 7 embodiment, the seed concept is 'young', and meaning words (Level I) 610 determined through a dictionary look-up, reference to other meaning sources, or the like include 'youthful', 'new', and 'offspring'. Synonyms (Level II) 620 determined through a thesaurus lookup or other sources, include 'adolescence', 'immature', and 'childish'. Related words (Level III) 630 determined in a thesaurus lookup or reference to other sources include 'youth.' Finally, the user has entered the phrase '18 to 24 years old' as a user-entered word or phrase (Level IV) 640. By incorporating user-entered words and phrases into the concept groupings, the analysis and categorization engine 200 advantageously goes beyond thesaurus and dictionary terms to capture meaning specific to a user or an industry—for example, the term 'delinquent' may refer to unlawful activity in typical English language usage while it refers to overdue accounts in the consumer credit industry. The concept groupings allow this specialized meaning to be captured. A user can deactivate any of the words or phrases included in the concept grouping as well as elect not to use any of the available levels.

Concept groupings 600 are advantageously stored in a seed relationship relational database table as exemplified by Table 3. Since concept groupings are generally user-specific, the user ID 56 is stored along with a global seed concept ID 42, a related concept id 50, and the type of relationship 52. A status flag or indicator 54 also may be stored, allowing the user to activate or deactivate specific relationships. Providing this relational database table advantageously allows the system to utilize these concept groupings for multiple users while maintaining the ability of individual users to modify and customize the groupings.

It should be noted that the seed concepts themselves can be interrelated. For example, there may be two seed concepts "bug" and "insect" and they have the same meaning. The engine scans the database looking for relationships among individual seed concepts. This is done by taking an individual seed concept and looking for the existence of related concepts in Table 2. The relationship is established again using thesaurus look-up. For example, in this case, bug has meaning of insect and when insect appears in Table 2, a concept grouping entry will be created by linking "bug" at level 1 with "insect" in Table 3. Thus concepts having similar meanings, synonyms, inflections and related words would be linked.

TABLE 3

| User ID or User number (56) | Global concept id (42) | Related Global concept id (50) | Type of relationship (52) | Status (54) |
|---|---|---|---|---|
| 15 | 25 | 26 | Related word | Active |
| 16 | 25 | 26 | User-defined | Active |
| . . . | . . . | . . . | . . . | . . . |

Figure 8:
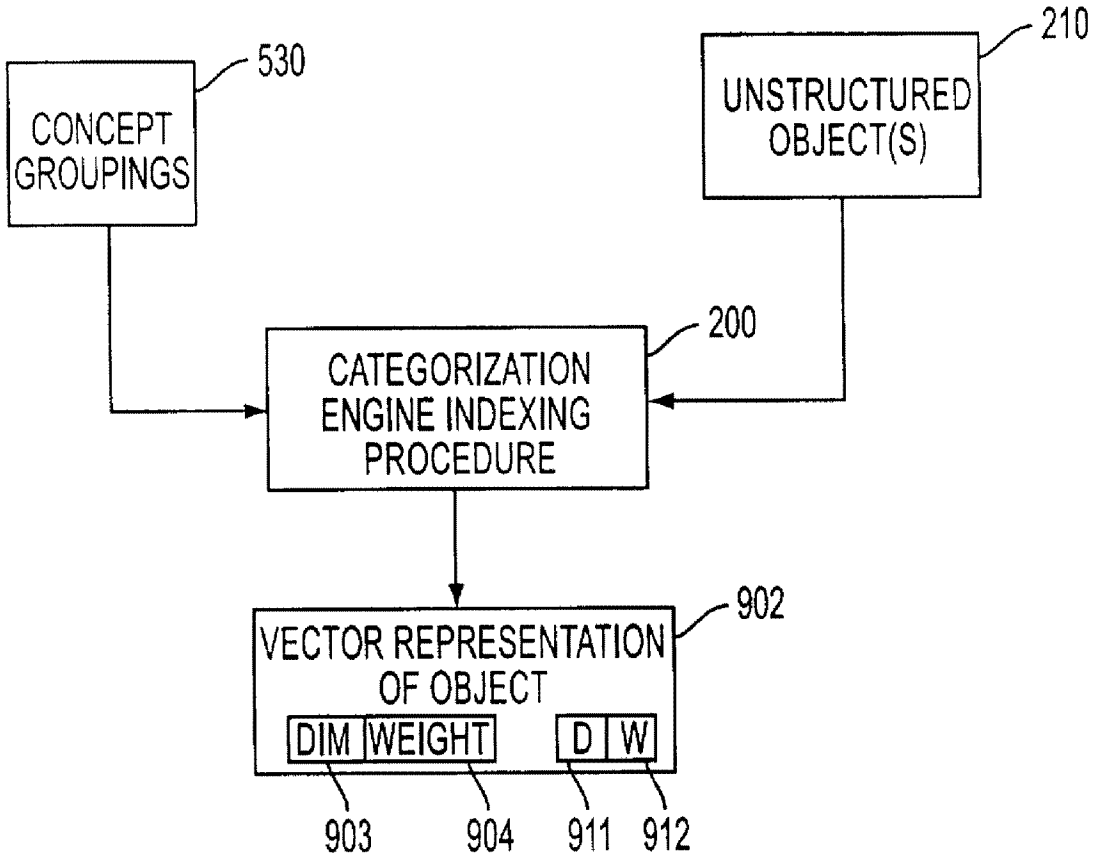
FIG. 8 illustrates an example of a vector representation of an object according to an embodiment of the present invention.

In the embodiment illustrated in FIG. 8, the analysis and categorization engine 200 utilizes the concept groupings 530 to generate a vector representation 902 of each unstructured object 210. Generating vector representations of objects is well known in the art. In conventional systems and methods, a vector representation is used in which objects are represented as vectors of the descriptors that are employed for information retrieval (see, for example, Salton G, McGill M J 1983: Introduction to Modern Information Retrieval, McGraw-Hill New York incorporated herein by reference). The vector representation 902 comprises a number of dimensions such as 903, 911 each with a corresponding weight 904, 912. In the present invention, the descriptors utilized as vector dimensions are seed concepts and could be as many as the number of words in the body of the text. In contrast to conventional systems, the present invention utilizes the concept groupings—which optionally contain user-entered phrases—to reduce the dimensionality of the vector representation. By combining the user input before building the vectored representation, the inventive technique embodies the knowledge of user interaction directly into the vectored representation. This helps enhance the accuracy of vectored representation of an object from the user view point. It should also be noted that the engine allows the flexibility for multiple users and views to build their own vectored representation of the objects available for that user and/or view. This results in continuous to an object in the way that particular user or view is looking for. Generating this vector representation corresponds to the indexing procedure 390 of FIG. 3.

Figure 9:
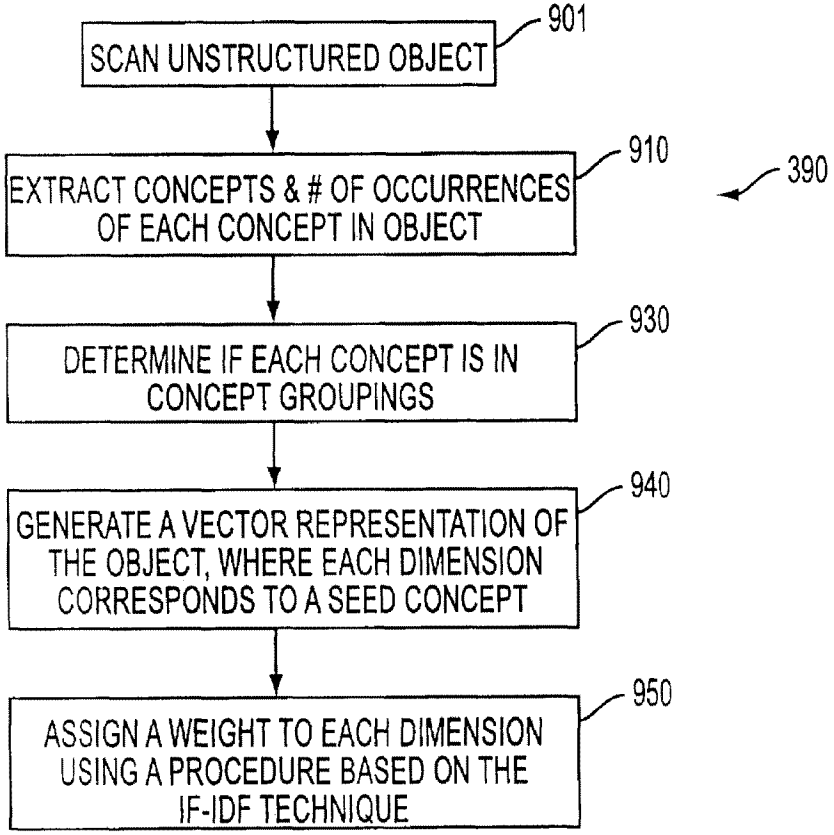
FIG. 9 is an outline of the procedure to index an unstructured object, according an embodiment of the present invention.

The indexing procedure 390 is described further in FIG. 9. The analysis and categorization engine 200 scans an unstructured object (step 901) and extracts concepts and the number of occurrences, or hits, of each concept within the object (step 910). The engine 200 desirably neglects or ignores stop and noise words. The words such as "a", "the", and "and" are examples of common noise words that are ignored in search strategies. Stop words are words that need not be processed and are not important for the user or the view. The user has the flexibility to set any word to be a stop word and allow the engine to skip processing. The analysis and categorization engine 200 advantageously determines if each extracted concept is in the known concept groupings (step 930) and generates a vector representation of the object where each dimension corresponds to a seed concept (step 940). The known concept groupings utilized may be different for different users or groups for the same unstructured object. Advantageously but optionally, the analysis and categorization engine 200 assigns a weight to each vector dimension so that more important concepts may be given greater consideration (step 950). For example, weight may be assigned based on the frequency of occurrence of that concept in the object. A variation of the Tf-Idf technique may be applied for this weighting. Techniques other than Tf-Idf may instead be used, but a Tf-Idf based approach has been found to perform well with the system and method described here.

The total number of occurrences of a concept within an object or some measure or metric derived from such total is stored in a cross-reference relational database table exemplified by Table 4 below. This table preferably includes the global object ID 56 (as indexing is desirably independent of user), the concept ID 50, number of hits 58, and location of the concept 60 within the object. Additionally, an index start time 62 and cross-reference time 64 are included to keep a block of cross-references for an object together and to enable later search capabilities. Advantageously, a cross-reference entry is made for each concept.

TABLE 4

| Object id (56) | Concept id (50) | Cross reference time stamp (64) | Cross reference type (60) | Index start time (62) | Total # of hits (58) |
|---|---|---|---|---|---|
| 500 | 26 | Mar. 5, 2001 2:00 PM | Title | Mar. 5, 2001 1:59 PM | 6 |
| 500 | 25 | Mar. 5, 2001 2:01 PM | Body | Mar. 5, 2001 1:59 PM | 3 |
| . . . | . . . | . . . | . . . | . . . | . . . |

The Term-Frequency Inverse Document Frequency or Tf-Idf technique is well-known in the art, and is a technique which represents an object as a vector of weighted terms. TF denotes term-frequency and IDF denotes inverse-document-frequency. Terms that appear frequently in one document, but rarely in other documents are more likely to be relevant to the topic of the document. Therefore, the TF-IDF weight of a term in one document is the product of its term-frequency (TF) and the inverse of its document frequency (IDF). In addition the weighted term vectors are used and are normalized to unit length to prevent lengthier documents from having a better chance of retrieval due only or primarily to their length. A standard information retrieval weighting mechanism is:

$$w=Hc*Tf*idfk$$

where w is a weight of a word or phrase in a document, Hc is a header constant, Tf is a frequency of the word or phrase in the current document and idfk is defined as:

$$idfk=\log (N/dfk)$$

where N is the total number of documents already retrieved by the system, and dfk is the document frequency of any given term, for example, the k-th term. The header constant is utilized in the present invention differently from its standard usage in that the invention system and method use the term to reflect the position of the concept in the object and its part of speech.

In addition, the inventive system and method differs from the standard Tf-Idf technique in that it looks beyond synonyms, related words, and definition words by using the concept groupings that have already been built and which are described in greater detail elsewhere in this description. The concept groupings advantageously have four levels, spanning synonyms (Level I), related words (Level II), meaning words (Level II), and user specific input (Level IV) that are utilized to reduce the dimensionality of the vector representation. Embodiments of the system and method may provide for only a subset of these levels or may provide additional levels. Reduction of the vector dimensionality is an advantage of the invention for several reasons, including but not limited to providing a more accurate and user-specific representation of the object.

Once the object has been converted into a relevant reduced dimensionality vector, where the primary dimensions of the vector space are seed concepts occurring in that document, the analysis and categorization engine 200 selects a set of these dimensions, or seed concepts, that are or correspond to key concepts that are most representative of the object (FIG. 3, step 410). All the components of the reduced dimensionality vector itself are advantageously stored in a single table or data structure, such as in Table 4. In order to deduce dimensions of the stored vector, for every concept id 42 for a given object 56, look up for the corresponding global concept id 42 in Table 3 by setting related concept id 50 to concept id 50 in Table 3. Now combine all of the concept ids 42 occurring under the global concept id and sum up the corresponding total number of hits 58. The ordinal of global concept ids 42 gives the dimension and the sum of total number of hits 58 by global concept id gives the weightage for that global concept id 42.

Assuming the number of words/phrases in a given object as a large integer on an average, according to the central limit theorem, the total number of occurrences of concepts derived from the object can be approximated to standard normal distribution.

Figure 10:
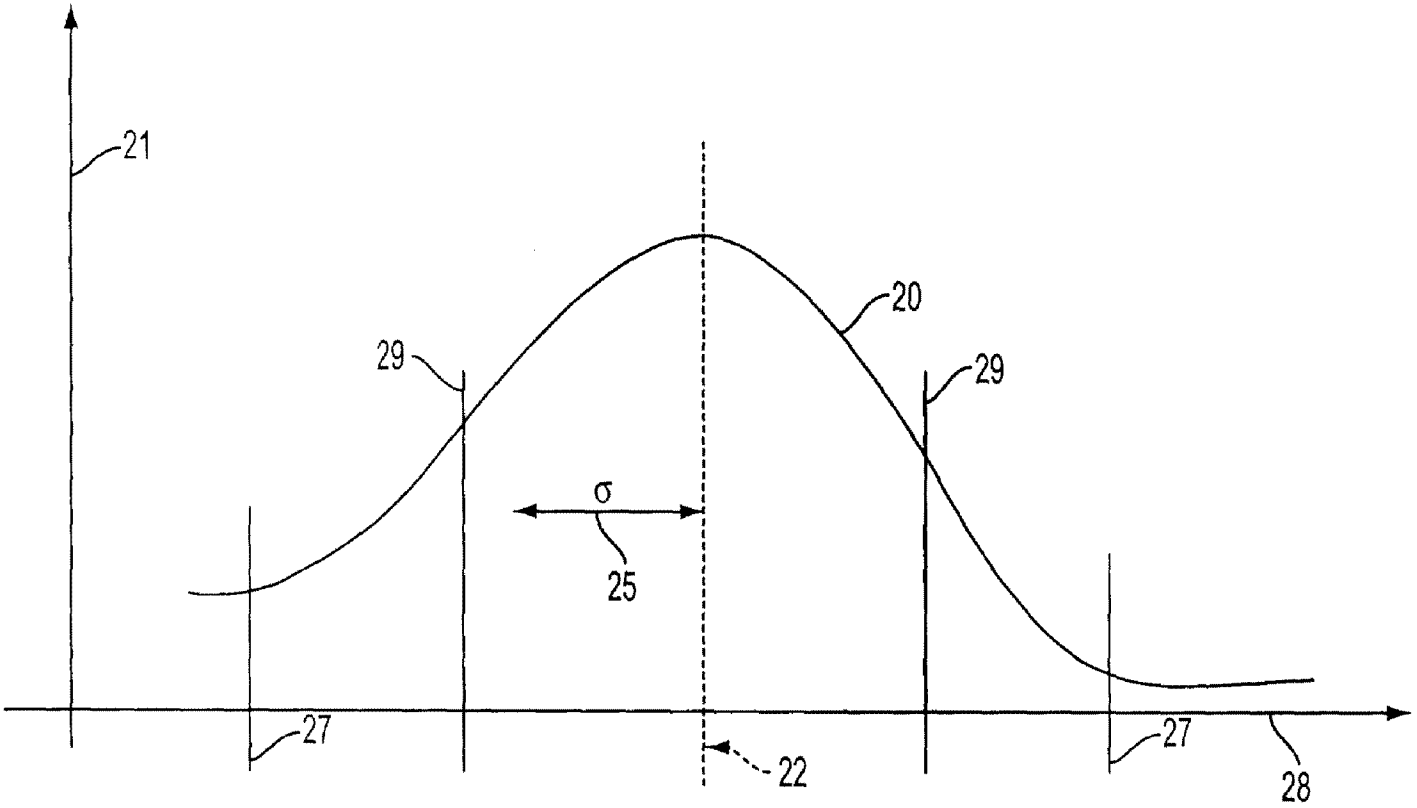
FIG. 10 is a Gaussian distribution curve and decision boundaries created for an unstructured object, according to an embodiment of the present invention.

As shown in FIG. 10, a standard normal (Gaussian) distribution curve 20 is specified for each object. Curves or functions other than the Gaussian curve or function may be used but the standard normal Gaussian distribution curve is preferred. The Gaussian or normal distribution is characterized by two parameters: the mean ($\mu$) 22, and the standard deviation ($\sigma$) 25. Thus, a specific curve for each object is specified by determining a mean weight and a standard deviation of weights, and the Gaussian curve built according to the expression $Z=(X-\mu)/\sigma$ where Z is the probability along axis 21 and X is the weight, along axis 28. A probability Z can be assigned to each concept, based on the weight X of that concept. Those workers have ordinary skill in the art in light of the description provided here will appreciate that other statistical functions or characterization could alternately be employed. It is observed that normal distribution can be positively or negatively skewed and can be leptokurtic or platykurtic.

Key concepts are seed concepts that are selected to represent the object. In a symmetrical normal distribution, Key concepts have a weight closer to the mean 22 than some distribution lower limit (or low-bound) 27, and further from the mean 22 than some upper limit (or high-bound) 29. A concept whose weight falls further from the mean than low-bound is deemed to make an insignificant contribution to the concept of an object. A concept whose weight falls closer to the mean than high-bound occurs very frequently and thus contributes little to inherent meaning of the object. These criteria are broadly based on Claude Shannon's information theory, which states in general terms that the more frequently an information pattern occurs, the less its intrinsic value. Low- and high-limits can be modified by the user, and are advantageously expressed as some multiple of the standard deviation.

Key concepts are advantageously stored as structured information in an open architecture format, such as a relational database table. As the same object can be used by multiple users in different ways, in order to provide a way for object to be classified in a user specific way, objects are given a user object ID 66 or identification. This ensures that the same object can be categorized in multiple ways without duplicating the object and its contents every time it needs to be categorized for a user and for a view (a view may be defined by the user or the system, but may typically be a logical grouping of objects as specified by the user). User object IDs 66 are preferably a number between 0 and 2,147,483,647 but may be in different ranges. Utilizing a user object ID 66, as opposed to a global object ID 30 in this captured concept relational database table allows different users to store different vector representations of the same object. The key concept ID 42 for each key concept identified for the object is stored. The probability 68 associated with each key concept id 42, as determined from the Gaussian distribution, is stored. The probability 68 is preferably stored as a floating point number between 0 and 1 but may be scaled to other number-ranges, formats, or representations, such as an integer representation between 0 and 9,999,999,999 or any other convenient range providing sufficient resolution or precision for the task or query. The rank 70 of each key concept is stored. A rank of one preferably indicates that key concept had the highest probability of representing that object, while a rank of 3, for example, indicates the key concept had a lower priority than two other concepts, and so on. An exemplary embodiment of such a captured concepts relational database table is shown as Table 5.

TABLE 5

| User object id (66) | Key concept id (42) | Score (68) Probability | rank (70) |
|---|---|---|---|
| 15 | 25 | 0.66 | 2 |
| 15 | 26 | 0.95 | 1 |

In one embodiment, a conditional probabilistic method is advantageously used for classification to determine whether an object belongs to a given category. Referring back to FIG. 3, a score for each category is computed for (step 420) each object by processing the probabilities of all concepts in the object for that category. Even though low-bound 27 and high-bound can be any real number from 0 to 1 (or any other defined range), by setting the low-bound 27 to $[\mu-2*\sigma]$ (where $\mu$ is the mean and $\sigma$ the standard deviation) and high-bound 29 to $[\mu+2*\mu]$, we can capture many representative concepts for an object. This may be necessary or desirable for objects whose contents span several areas such as magazine articles. Normal distribution thus helps us remove certain high occurrence and low occurrence concepts from consideration. In such cases, the precision of classification can decrease dramatically if we have the same concept or phrase defining multiple categories. As an example, if the word "Woods" occurs in "Tiger Woods the Golfer", "Woods Hole Oceanarium" and "Bretton Woods Ski Resort", then the word "Woods" itself does not mean as much as the context under which it occurs. Thus the importance given to Woods should be reduced in the context of surrounding concepts and description. On the other hand, if there was a document about Tiger Woods where Woods occurs frequently with minimal mention of Golf, it should still be classified as "Tiger Woods the Golfer". Otherwise recall will decrease. Thus in this case importance given to Woods should be increased despite the fact that Woods occurs in other categories as well. In order to address both of these situations, we define two ratios namely:

1. Inverted category ratio ($R_i$): As the number of categories in which the concept occurs (say for example, $N_{ci}$) increases, the importance of the concept contribution to the overall classification decreases. If there are $N_c$ distinct categories, then we define inverted category ratio as: exp ($-N_{ci}/N_c$) where exp stands for exponentiation. The ratio is exponential as weightage is not zero when the concept occurs in all the categories. It should be noted that this ratio will be the largest when $N_{ci} \ll N_c$ (approaches 1) and will be the smallest when $N_{ci}=N_c$ (exp (−1)) that is when the given concept occurs in all the categories. This ratio will always be greater than or equal to 0.37 approximately and less than or equal to one.
2. Concept presence ratio ($R_c$): This is the ratio of number of times a concept occurs in an object ($n_c$) over the total of all the concepts that occur in an object ($n_{tc}$). This ratio provides the relative importance of a concept in an object. This is directly proportional to the concept occurrence in an object. This ratio will always be greater than or equal to zero and less than or equal to one.

The combined ratio $R=R_i*R_c$ is multiplied with object scores (the probability of key concept) 68 for final classification to categories. As individual component of the multiple is less than or equal to one, the combined score will always be greater than or equal to zero and less than or equal to one. In one embodiment, the processing of probabilities is an average. For each category, the combined score R of all key concepts appearing in the category and the object are summed and the total is divided by the total number of key concepts appearing in the object ($R_s$). In order to give equal weightage to categories with less descriptive concepts vis-à-vis more descriptive concepts, we define category normalization ratio ($R_n$). This category normalization ratio is defined as the ratio between the total number of concepts that occur in both the category and the object over the total number of concepts in the category. The final object score 74 is then $R_s*R_n$. Note that the object score according to usage here will always be greater than or equal to zero and less than or equal to one. Thus it can be represented as a percentage for convenience. Other mathematical objects or processes may be used to assign a score to the categories, particularly modification to a straight averaging.

The use of standard normal distribution to capture central theme or idea helps in the manner described as follows:

1. It allows us to capture the central theme or idea of the document as opposed to capturing all the concepts which can be a very large number and may not concisely represent object concept or theme. By controlling the low-bound 27 and/or upper-bound 29, a user can influence the accuracy of capturing concepts. Thus repeated occurrence of certain concepts can be eliminated for object concept or theme consideration by setting the upper-bound 29 to a number less than 1, say 0.995. Similarly a concept that does not seem to represent the object with a low score, can be eliminated for consideration of object concept or theme by setting the low-bound 27 to a number greater than zero, say 0.16.
2. It allows for more accurate analysis and categorization. We define two more terms generally known in information retrieval techniques namely "precision" and "recall". Recall measures the percentage of relevant texts that were correctly classified as relevant by the algorithm. Precision measures the percentage of texts classified as relevant that actually are relevant. By only choosing to match the central theme or idea of the document with the targeted categories, it can improve precision and recall. Precision is improved as objects classified under a certain category will be relevant to the category. On the other hand, only those objects that are considered to be match for the concepts defining the category will be chosen thereby improving recall.

Objects are assigned to categories having a score greater than a threshold value of 25% (step 430). The threshold value is a percentage and can have a value between 0 and 100. It is determined or set by the user based on several characteristics of the corpus of objects. These characteristics include features such as whether the corpus has objects with similar contents, whether a single object can have multiple themes (for example, as in a news feed), and the like characteristics. In general, it is observed that for object with multiple themes, lower threshold value such as 25% (or equivalent fraction) would be needed as opposed to object with single theme for which threshold can be higher such as 40%. As more objects are input to the engine, the more accurate the engine becomes and thus large volumes of objects input implies a lower threshold value as well. For example, threshold value in the range of 25% to 35% may typically be encountered, but are not limited to this range. More particularly, the threshold value range may have any upper and lower bound and be any range. It is noted that each user may have different categories, concepts, and/or concept groupings, as is true also for groups or organizations. Thus, the category to which an object is assigned may be different for different users (or groups or organizations).

Output from the analysis and categorization engine is advantageously stored in a user object relational database table, such as, for example, a relational database table illustrated in Table 6. Table 6 includes the user ID 56, user object ID 66, and global object ID 30 as well as user object hierarchy pointer 72. The user object hierarchy pointers 72 indicate the parent, or category, ID to which the object belongs and the relative location of the object pointer which indicates an ordering of objects as provided to the analysis and categorization engine. The score 74 for the object under that category is also stored. A status 76 is also provided to enable the display of the objects in a manner desirable to a user, for example, the categories may appear in a user interface as a folder and these folders may appear open or shut. Status 76 may also indicate that the object has been deleted or is active. One object can belong to more than one category, and thus can have more than one entry in this table.

TABLE 6

| User id/ Group id (56) | User object id (66) | Object_id (30) | User object hierarchy pointers (level, parent id, relative location of the object pointer) (72) | Object status (active, deleted, how to display—shut or open) (76) | Object score (74) |
|---|---|---|---|---|---|
| 15 | 200 | 500 | (3, 490, 150) | Active | −76.5 |
| 16 | 201 | 501 | (4, 20, 200) | Deleted | 26.2 |

The above remarks have focused on the analysis and categorization engine 200 provided by the present invention to deduce the theme, or meaning of unstructured information and store output as structured information 230 in an open architecture format, we now turn to aspects of the present invention that further provide interface tools for viewing and analyzing unstructured information based on the categorization data collected and stored via the analysis and categorization engine. These tools enable intelligent views of unstructured information, the ability to view trends in a group of unstructured objects, and the ability to execute object concept based searches.

Figure 11:
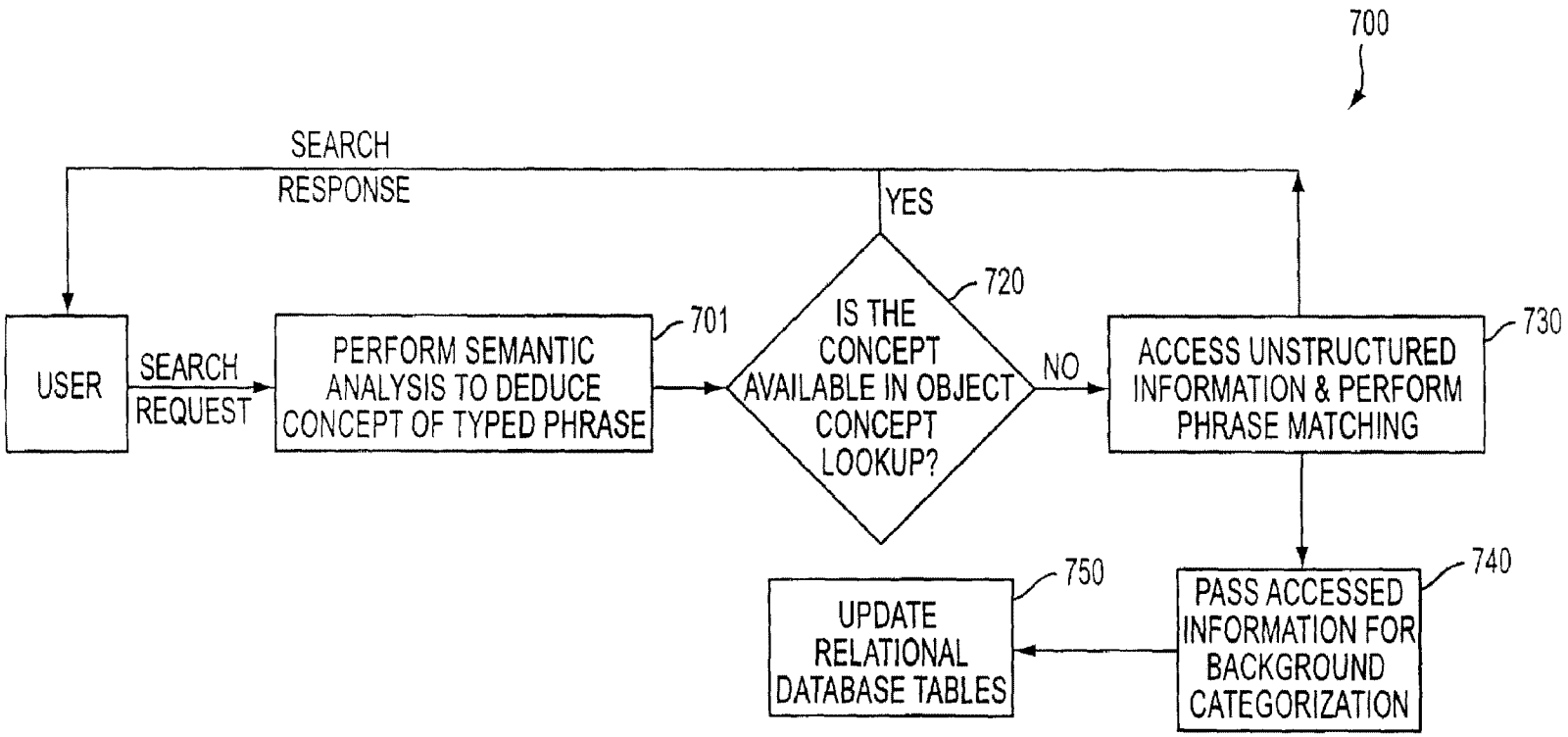
FIG. 11 is an outline of the procedure performed by the object concept based search engine, according to an embodiment of the present invention.

The inventive system and method advantageously provide and utilize an object concept based search utilizing the structured information 230 generated by the analysis and categorization engine 200. An embodiment of this object concept based search process 700 is outlined in FIG. 11. First, the search engine parses the user-entered search text to capture a seed concept or seed concepts of the entered text (step 701). The search engine then determines whether at least one of the captured concepts are available as a key concepts associated with an object in the relational database tables (step 720). The process is repeated for all seed concepts entered. Then, within the resulting list of objects, the search engine then determines if all the seed concepts and their user customizations exist, even the ones that have not been picked up as key concepts. The resulting object list gets narrowed down to accommodate the existence of all entered seed concepts with their special user customizations. Objects whose concepts match will then be returned to the user.

The objects returned as results for the object concept based search are then scored according to the following algorithm. The scores for the individual key concepts that contributed to the search are averaged for each object returned. If the search was performed by using a combination of key concepts and seed concepts, the number of hits for the seed concepts are then divided by the total number of hits picked up for all seed concepts in the document to determine how much the seed concept actually contributed to the concept of the document. This figure is then added and averaged with the average score for the key concepts to arrive at a relevancy score for the object as pertains to this particular search.

If the captured concept is not contained in the relational database tables, the search engine optionally performs a keyword search and phrase matching, directly accessing the unstructured information (step 730). In addition, the search text is passed to the analysis and categorization engine (step 740). The engine can re-capture the object concepts and update the relational database tables (step 750).

The process then comprises capturing search text 220, and parsing the search text as individual words and phrases. The words within double quotes are considered as phrases, even though this definition of phrase can vary. It then uses the seed concepts extrapolation procedure to produce concept groupings 530 as depicted in FIG. 6. Based on the additional concepts, the engine will now refine the already generated and stored components of the reduced dimensionality vectors in Table 4. If the additional concept exists in an object, it will be added as a new entry in the data structure represented here as Table 4. The objects whose reduced dimensionality vectors have been modified in Table 4 will now go through steps 400, 410. Table 5 would be modified because of the newly added seed concepts and/or concepts. Specifically, Key Concept id 42 would be modified to reflect newly added information.

As any user search continuously refines Table 4 and Table 5, the captured object concepts continue to get more accurate and thus can anticipate user search needs. Thus over time, the system can meet the user concept search needs with accuracy in step 720. The next time a user enters a similar phrase, the concepts look-up would contain the relevant information.

A graphical user interface advantageously provided by the inventive system provides a dynamic matrix view of concepts and their occurrence within unstructured objects. Concepts (42) are advantageously displayed versus object description 34 in a matrix, or spreadsheet, format. This assists a user in quickly determining an object or objects of interest. A user can choose concepts 42 to add or remove from this view and can compare concepts within the view. The provided view is personalized, that is, the view provided for a first user viewing a first set of unstructured objects may be different that the view provided for a second user viewing the first set of unstructured objects. Additionally, the provided view is integrated, that is unstructured and structured objects may be advantageously displayed together in the same format. The user interface may advantageously display categories as graphical folders that can be displayed as open or shut, as dictated by their status 76 to reveal or hide the unstructured objects assigned to the category.

In another aspect of the inventive system, analysis tools are advantageously provided that present concepts captured by the analysis and categorization engine in a variety of ways: based on number of hits 58, score 74, alphabetical order, strength or weakness of concept scores 68 or other ways based on the structured information generated by the analysis and categorization engine. Additionally, the presence of concepts in objects over time is advantageously tracked, analyzed, and optionally displayed in table or graph formats. This tracking is facilitated by the cross-reference time stamp 64 and index start time 62. As the analysis and categorization engine updates the structured information, changing scores 74 of concepts in a category, for example, can be advantageously displayed.

The system advantageously provides for object sharing between two or more users, allowing multiple users to view or analyze a set of shared objects. This functionality is advantageously provided by an automatic share agent that is configured to publish information to one or more users. In order for the sharing to occur, there needs to be multiple "views" of the same information. A view is a logical grouping of objects tailored to fit a user's specific access needs. Every view has a user id and can have all the functionalities associated for the user. Each of the multiple views accessing the same object have their user object identifiers that link an object id to a specific user/view. Thus it is possible in this embodiment or design for multiple user or views to have access to the same object. As captured and refined concepts and categories can vary by user and/or view, it is possible for the same user object to be categorized and analyzed differently in every view.

The user/view has to specify through an interface what categories need to be shared with other users/views. This has to be done for all the categories that need to be shared once. Now, as soon as an object is classified under an user or view, the category under which the object is classified is examined to see if this would be shared and the targeted user or view for sharing, Then the user object will be reclassified for the targeted user or view. If the object (pointed to by the user object id) already exists under a category, then the object will not be classified again. If the category (or categories) under which a user object gets classified for a targeted user or view is shared, then the object will be shared based on the targeted user or view sharing setup. This process thus creates a dynamic flow of objects in the network of users or views without duplication of objects as only user object ids that point to the object id get created every time.

The use of views are advantageously more than just sharing. Views facilitate multidimensional analysis of unstructured information. For example, we can share a view on Golf (View I) to another view created on Tiger Woods (View II). Now the contents of View II, will have Golf and Tiger Woods. We can take that information and share it with another view (View III) on Vijay Singh. Then that view will have information only on Golf, Tiger Woods, and Vijay Singh. We can share the contents of View III and share with View IV on Chip Shots. Then the contents of View IV would be Golf, Tiger Woods, Vijay Singh and Chip Shots. This way we can drill down on unstructured data along multiple dimensions. Once the views are setup, the information will continue to flow and be updated.

In addition to this, the analysis and classification engine allows the users to analyze concepts in objects, track trends and exceptions. Analysis of concepts is useful when we

- Have no idea what the corpus of unstructured data given to you is about and you would rather not spend time reading and analyzing it (For example, an attorney having to familiarize themselves when starting work on a case or gathering large amounts of evidence or a Network/email monitor who needs to track illegal or harassment cases within the company)
- Have too many results from your search that you find it impossible to find the right object or the nugget of information that you are looking for
- Have to hone in on one object out of multiple objects (without opening and closing) that seem to have the same description and varied contents
- Have unclear or complex search criteria (that is difficult to represent) to hone in a document in a given set of documents
- Look to discover trends in unstructured information We have collected Innovation magazine articles in text format from 1996. The subscription is weekly and we are browsing through articles in 1996 looking for articles of interest. As we are not sure of what we are looking for, it is very difficult to represent a condition like this in a text box for search or through a complex set of user specifications captured from an user interface.

Some prior art currently used to solve these problems today would be:

(1) Keyword and concept based searches are currently used to partially solve the problem. These technologies work best when the user knows exactly what words to try to find. These technologies are not very helpful if the user does not know the subject matter well and is unable to ask the right questions or search for the right information.

(2) A Boolean search phrased correctly might solve the problem, if the user knows exactly what they are looking for. However, the disadvantages of this method are that it is very difficult to do Boolean concept based search, where we would be looking for concepts and not just keywords.

(3) A hierarchical classification of objects would be another solution such as a taxonomy hierarchy. But in this approach once we choose a particular hierarchical path, we preclude choosing other hierarchical paths. This is because of the inherently implied "one-to-many" structure in hierarchical approach. This might result in us not getting at the right information. On the other hand, a relational approach will allow not only "one-to-many" but also "many-to-many" relationships to be resolved and seen as well. We can liken this to the difference between the hierarchical and relational database technologies.

The real solution to these above problems lies in analysis of unstructured data which takes off from where search and classification leaves off. This analysis based approach mimics and improves upon the ability of cognitive processes to analyze multiple viewpoints simultaneously. What if we are able to extract key ideas and concepts automatically and bubble them up a magazine's table of contents in an analytical format to help the user see at a glance what the topics covered are? Much like that, analysis and categorization engine is able to provide an extract of concepts representing a collection of unstructured data. Without any pre-specified condition or criteria the user is able to understand the contents and narrow down on articles that have a combination of ideas/concepts. The system also uses prior learning (extracted and user defined concepts) in identifying ideas/concepts. Thus the extracted concepts are user/view specific.

In FIG. 13, the subscription articles of innovation magazine are displayed along the row and the concepts as the column (FIG. 13—concepts selection window not shown). The scores at the intersection of document and concepts are normalized to unit length. For example, /Innovation/1996/Innovation 111196.txt, has a score of 14 for business concept, score of 10 for education concept and so on. This can be similarized to a cross reference of objects versus concepts. By browsing through this table like layout, the user can narrow down on articles of interest without having to read each of the articles.

Let's say we are looking for an article of interest and are not sure about the exact nature of the article. It may have something to do with high-tech and education but if these don't appear it can be something to do with laser and/or surgery. Such kind of requests are complex to represent in a search engine. Sometimes it is equally important to know when concept(s) or idea is not there, than to know if the concept(s) or idea is there. There is value to analyzing large volumes of data as shown in FIG. 13 where a concept is all zeros (example: while doing research on the use of "military electronics" in various countries, it is very important to know that the concept of military electronics is associated with China, Iraq, India but not in Somalia and Sudan). Even if the user uses advanced search techniques and is sophisticated in using different search features it is difficult to represent such complex search criteria. Whereas, using analysis view, a user can browse the output in FIG. 13 and narrow down to INNOVATION December 1996.txt, INNOVATION Aug. 12, 1996.txt, INNOVATION October 7.txt, 1 Apr. 1996.txt, and INNOVATION Jun. 10, 1996.txt. This will be much easier to do than trying to develop complex search criteria to get at what we are looking for.

Whereas the search technologies are hypothesis driven, i.e., fetch result objects based on certain input criteria, the technology here is data driven i.e., letting the data provide its content back in an analytical relational format and without a pre-imposed hierarchy.

Figure 12:
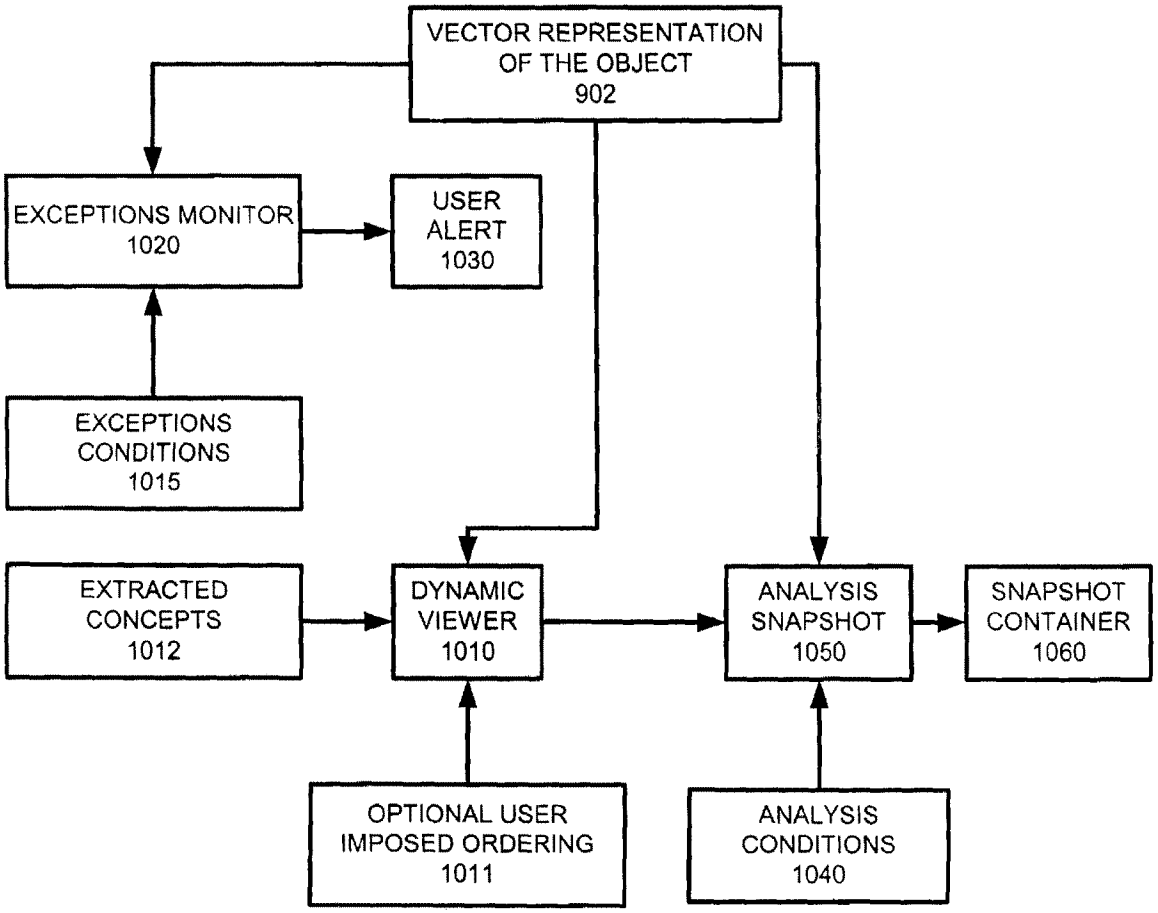
FIG. 12 illustrates an embodiment of the analysis and classification engine and procedure associated therewith.
Figure 14:
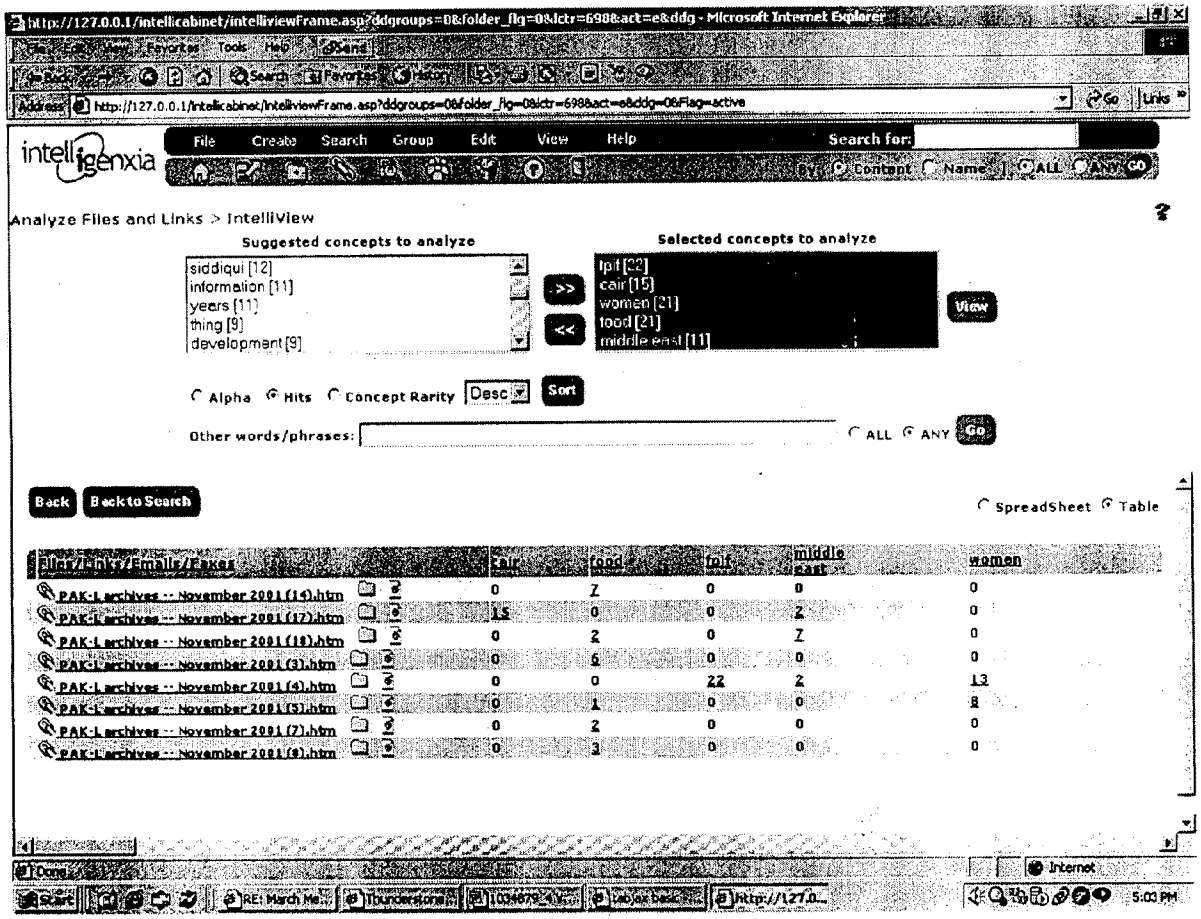
FIG. 14 illustrates an embodiment of a view screen displaying a combination of concepts with optional identification of these concepts to unstructured objects.

The analysis and classification engine generates a cross reference of objects and the embedded concepts automatically. Access, modification and tracking of this cross reference is possible through analysis system components and procedures or function (FIG. 12). The analysis function comprises of three primary components namely the dynamic viewer 1010, exceptions monitor 1020 and analysis snapshot process 1050. Through the dynamic viewer 1010, the user can pick and choose the concepts/objects to view the distribution interactively. The exceptions monitor 1020 tracks exceptions to concepts in objects and/or category as a function of time or concept. The analysis snapshot process 1050 captures a static snapshot of concepts and objects cross reference as set by dynamic viewer 1010 over specified time intervals In the above referenced patent application U.S. patent application Ser. No. 10/087,053 entitled Concept-Based Method and System For Dynamically Analyzing Unstructured Information, there were described various ways of extracting concepts from objects based on user access and profile. The extracted concepts from the objects are available by view and/or user through dynamic viewer 1010. Whenever the user needs to review the distribution of concepts in the selected objects in different orders of preference, they can. In one embodiment, the concepts can be displayed in alphabetical order, number of hits or strength of concepts. The order can be descending or ascending. In this embodiment, the user can choose and view a combination of concepts that have been identified to represent the collection of unstructured objects. Screen shot in FIG. 14 is such an example. Browsing through the list of generated concepts can be done in multiple ways. As an example, the user might be interested in browsing through concepts with certain exceptions or changes over time.

Another important aspect of representing unstructured information in a relational format is capturing trends and discovering new patterns and alerting exceptions that are not apparent. The exceptions monitor 1020 can monitor the changes to concepts based on exception conditions. Through a user interface 1015, the user can set thresholds to capture exceptions. Concepts that exceed a pre-specified threshold within a category will be marked for exception reporting. The threshold can for example be:

- A percentage. For example the concept of "Putting Green" can exceed the set x % threshold. That is the number of normalized occurrences (say n) of "Putting Green" exceeded n±n*(x/100) from the previous observation. This sets an exception flag for the concept (Table 7).
- A positive integer greater than zero. For example the concept of "Putting Green" can exceed the set x number of normalized occurrences from the previous observation. That is the number of occurrences (say n) of "Putting Green" exceeded n±x from the previous observation n. This sets as exception flag for the concept (Table 7).

Advantageously, in one embodiment, a relational table has been defined to capture the exceptions settings. The Table (Table 7) includes the User id 56, whether the exception being tracked 75 is a percentage or count, a real number to quantify the exception (76) and a status flag (77) to specify whether the request is active or inactive.

TABLE 7

| User id (56) | Exception type (75) | Exception number (76) | Status flag (77) |
|---|---|---|---|
| 5 | Percentage | 30 | Inactive |
| 12 | Count | 45 | Active |
| . . . | . . . | . . . | . . . |

For exceptions and history tracking to occur, the analysis and categorization engine must retain the history of indexing changes. We discussed earlier about the vector representation of the object 902, having a number of dimensions where each dimension representing a concept has a weight. When indexing the target object (step 390), the process monitors to see if dimensions have been added or deleted or if their weights have changed. The original dimensions and weights of the vector before changes are saved in a relational database history table Table 8. The structure of Table 8 is as given below:

TABLE 8

| Object id (30) | Concept id (50) | Cross reference time stamp (64) | Cross reference type (60) | History time (62) | Total # of hits (58) |
|---|---|---|---|---|---|
| 500 | 26 | Mar. 5, 2001 2:00 PM | Title | Mar. 5, 2001 1:59 PM | 6 |
| 500 | 25 | Mar. 5, 2001 2:01 PM | Body | Mar. 5, 2001 1:59 PM | 3 |
| . . . | . . . | . . . | . . . | . . . | . . . |

The exceptions monitor 1020 (FIG. 12) compares the current vector representation of an object with a prior version based on user defined exception conditions 1010 and alerts the user 1030. The analysis snapshot process 1050 captures cross reference of objects and concepts based on pre-specified analysis conditions 1040, and populates a snapshot container 1060 for multidimensional analysis. Details of an embodiment of this process are given below:

At a pre-specified frequency set by the user, the exceptions monitor 1020 goes through every entry in TABLE 7 and determines if there are corresponding concepts in TABLE 8 for that user that exceed the threshold set by the user. If so, those concepts will be marked as exceptions by the monitor 1020. The details of the comparison process is as follows:

By joining Table 8 with Table 6 based on user id 56 and object id 30, we can get a cross reference of object concept combinations that have changed. For every entry that has changed in the cross reference set, we will lookup the corresponding entry in Table 4. To consider changes to a concept id in its entirety, we need to consider the concept and all it's active concept groupings 600 as in Table 3. This can be done by setting the object id 30, concept id 50 and it's groupings in Table 3 and cross reference type 60 to every entry in the retrieved cross reference set. If the difference between total of the hits for all the concepts in Table 4 and corresponding hits for all the concepts in Table 8 is greater than the threshold exception number 76, then the corresponding concept is flagged as an exception for the user. This is captured in Table 9. Table 9 has User id 56, concept id 50, exception time stamp 78 indicating the time the exception was spotted.

TABLE 9

| User Id (56) | Concept id (50) | Exception timestamp (78) |
|---|---|---|
| 15 | 290 | Feb. 8, 2001 2:22 AM |
| 16 | 5 | Jan. 30, 2001 4:12 AM |
| . . . | . . . | . . . |

In one embodiment, the User Alert function 1030 highlights the categories in which the exception concepts occur in red color. This visual will help the user to analyze the contents of the category looking for exceptions. The user can sort the concepts available in the category by exceptions. This would allow them to act on exceptions first.

This historical data collection can be viewed through one of the available analysis view screens such as that depicted in FIG. 13. It can also be exported to other databases for comprehensive analysis. Details of this functionality are as explained below.

In one embodiment, first the user analyzes a category by viewing the concepts through an user interface as in FIG. 13. The user can interactively choose or change, the concepts to be presented for all the objects within the category. Once the user is comfortable with the concepts they are viewing, they can setup observation criteria through analysis conditions 1040 interface. This approach is called WYSIWYG ("What You See is What You Get") as the user can repeatedly get snapshot of information on exactly what was viewed. The interface will capture in Table 10 the user id 56, tracking id 79, concept ids 80 viewed by the user, the category user object id 66, the frequency of requested observation (daily, weekly, monthly, yearly etc.), whether the request has been activated 82, the last time the concepts were tracked 83 and whether it was successful 84.

TABLE 10

| User id (56) | Tracking id (79) | Concept ids (80) | User object id (66) | Frequency (81) | Active/ Inactive (82) | Last run time (83) | Last run status (84) |
|---|---|---|---|---|---|---|---|
| 15 | 290 | 129,55,9009,50 | 302 | Daily | Active | Feb. 8, 2001 2:22 AM | Successful |
| 16 | 5 | 1515,6988,9009,55 | 204 | Monthly | Inactive | Jan. 30, 2001 4:12 AM | Failed |
| . . . | . . . | . . . | . . . | . . . | . . . | . . . | . . . |

At the intervals specified by analyst conditions 1040 tracking ids that satisfy timing criteria. For every entry that satisfy the criteria as of time $t_i$, the process would determine the distribution of concept $c_i$ as hit count $h_i$. The sum of all concepts $c_i$ within a category (note that a category is a special user object that is a parent of a collection of objects) as indicated by the user object id $o_i$ is $h_{oi}$=Sum($h_i$) for all $c_i$; under $o_i$. This is the 3-tuple $<t_i, o_i, h_{oi}>$ that can vary for every observation $t_i$ and is stored in snapshot container 1060. In one embodiment, the snapshot container 1060 is implemented in tabular format as in Table 11. For every tracking id, user id combination, the concept id that exists in the user objects that belong to the category (user object id 66), and total number of hits (58), time stamp (85) to indicate the time of access would be stored. For the category (66) itself, concept id (50) would be set to zero and hit count (58) would be $h_{oi}$.

Table 11 will also contain summary information for the participating concepts within the category. This would be the sum of all hit counts (58) of all user objects that have one or more participating concepts within that category.

TABLE 11

| User id (56) | Tracking id (79) | Concept id (50) | User object id (66) | Hit count (58) | Timestamp (85) |
|---|---|---|---|---|---|
| 15 | 290 | 129 | 302 | 50 | Feb. 8, 2001 2:22 AM |
| 16 | 5 | 55 | 204 | 6 | Feb. 8, 2001 2:22 AM |
| . . . | . . . | . . . | . . . | . . . | . . . |

For illustration, we once again look at subscription to Innovation magazine. We are looking for trends and exceptions from electronically gathered articles of the magazine for the past five years. Among many concepts that have been extracted from objects automatically and are available to track, we choose education, laser, high-tech, search engines and surgery. Thus we decide to track them in categories 1996, 1997, 1998, 1999, and 2000. The concept education is comprised of variations of school, teaching, learning, university etc., High-tech is comprised of hi-tech, technology, know-how, etc., Laser and Surgery are by themselves. We now look at the analysis view for these concepts by year (see the chart below). In this case the years are 1996, 1997, 1998, 1999, 2000. In order to account for varying of number of articles by year, we further normalize the sum of normalized scores. This is done by dividing total normalized score by total number of documents and multiplying in a large number (in this case 100) to get an integer. The material in FIG. 15 serves as a vehicle for walking through and describing the process. As an example in FIG. 15, there were 32 documents for 1996, and education scored 42. The normalized score for education in year 1996 was 42*100/32=131.

Figure 16:
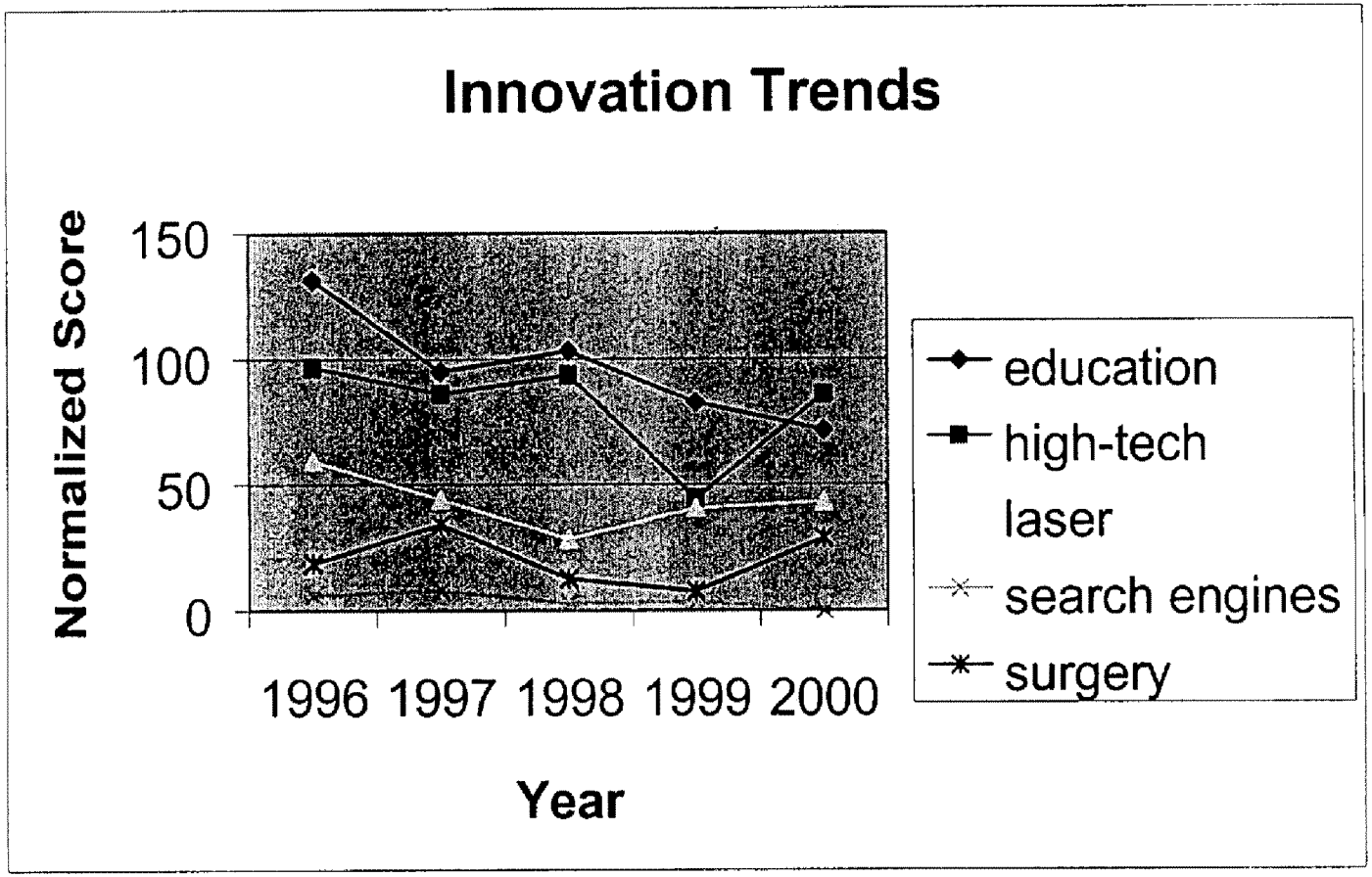
FIG. 16 illustrates an embodiment of a display showing trend information as a total normalized score for concepts plotted in a graphical format.

If we take total normalized score for concepts and plot them in a graphical format, then we get the trend information as in the chart (FIG. 16). We observe that innovation articles on education and search engines concept were highest in 1996 and interest on them have been steadily falling through 2000. Interest on high-tech, surgery swung dramatically but overall average seems to be steady. Interest on laser has been steady. It should be noted that the same type discovery analysis can be performed on categories as well.

As presented by Susan M Grotevant, in the paper The Power of Multidimensional Analysis (OLAP) in Higher Education Enterprise Reporting Strategies at the College and University Information Services Conference in 1999, for a system supporting multidimensional analysis (Online Analytical Processing—OLAP) satisfies the following three requirements:

- Drill down: Users can explore a dimension hierarchically—moving from summary-level information to the details and back—to gain fast answers to critical business questions.
- Slice and dice: Decision-makers can interactively explore corporate data in any combination of dimensions, from every conceivable angle, or perspective as more commonly used for angle in the literature, such as in the Susan M Grotevant reference incorporated by reference herein.
- Graphical analysis: Users can choose from a variety of graphical displays—crosstabs, pie charts and a variety of bar charts—to visualize the key factors that are driving the business.

Analysis and categorization engine extracts data and makes them available in such a way that the above three requirements can be met. Through Table 11, the user has access to profile of concepts in targeted categories over time. The details of concept distribution within individual objects have been kept as well. Thus, we provide structured access to concepts data at the object level. Also as explained before using views and classification techniques by view, the same information can be accessed in multiple ways. Together all these three features offer the drill-down capability that is important for an OLAP system.

The user/view can track concepts and their distributions in objects over time or as exceptions occur. Using categories that can be nested within each other, the user can refine the level information access. With concept id and object id the user can get to the available details of concepts and objects in a structured format. These three features give us the ability to slice and dice the captured information based on object and concept characteristics.

The output data is in a structured format that can be easily imported to commercially available graphical tools in the market place. As explained earlier, the dynamic viewer 1010 provides additional ability to analyze multiple concepts simultaneously and helps the user identify combination of ideas in unique ways. Thus we facilitate graphical and visual analysis. In summary, the analysis and categorization engine can provide sufficient information for multidimensional (OLAP) analysis of unstructured objects.

Workers skilled in the art will appreciate that, in light of the description, a variety of interfaces can be provided for a user to view, and understand the meaning of, unstructured objects based on the structured information generated by the analysis and categorization engine.

Having now described a variety of structures and techniques from a theoretical and user interface perspective, attention is now directed to some of the underlying methods, procedures, algorithms, and structural aspects of the inventive features. While the invention has aspects too numerous to repeat again here, the following paragraphs focus attention of a specific set of inventive embodiments and features that have particular utility and advantage. Merely for the purpose of organization and the readers convenience of reference, the following sections contain headings that identify the general subject matter of the paragraphs that fall under that section but such headers are not and should not be intended to limit the applicability of the description to any particular inventive feature as many aspects of many inventive features are described throughout these sections and though out the specification generally. It is also noted in this context that various features that are described in the context of one feature, such as a procedural step in an overall method, may also or alternatively be used with a different method or independently. In addition, not all combinations of features are described though it is clear that many of the features and other aspects of the methods, procedures, objects, and other structures may be used in other permutations and combinations.

Embodiments of a Method for the Analytical Processing of an Unstructured Object

It will therefore be apparent that the invention provides a method for the analytical processing of at least one unstructured object in a dimensioned space such as a unidimensional or multi-dimensional space. In one embodiment the method comprises selecting a dimension and exploring or querying the unstructured object or information item, such as a document including unstructured information (such as unstructured text fields) at least one level of detail or abstraction, but more typically at multiple levels of detail, granularity, or abstraction, to determine a result for that query. Then, selecting at least one concept in the form of a view or angle, or as the term is more generally used in the context of conventional OLAP, a perspective, among a set of concepts at a predefined level of detail or granularity. The unstructured object or objects are then explored or processed analytically using the selected combination of dimension or dimensions and at least one angle or perspective to determine a second query result. This second query result may generally be different from the first query result, and identifies where the corpus has changed to reflect the chosen angle or perspective, given that the angle or perspective is a set of concepts and granular detail.

Another embodiment of this method for analytical processing of at least one unstructured object in multi-dimensional space, includes: for at least a selected dimension of the multi-dimensional space, hierarchically exploring and querying the unstructured object at a plurality of levels of detail or abstraction to determine a first query result; selecting a combination of at least two dimensions of the multi-dimensional analytical processing space; selecting at least one particular concept in the form of a view or perspective among a determined set of concepts at a predefined level of granular detail; and analytically exploring and processing the unstructured objects using the selected combination of dimensions and at least one angle or perspective to determine a second query result different from the first query result that identifies where the corpus has changed to reflect the angle or perspective, wherein the angle or perspective is a set of concepts and optionally one or more relationships with each other, and granular detail.

In another embodiment, this multi-dimensional space may be a one dimensional space or include a plurality of dimensions. That is to say that the dimension of the multi-dimensional space may have a dimension n, where n is an integer in the range $\{1, 2, 3, \ldots N-1, N\}$.

It will be appreciated that the unstructured object may take many different forms, and may for example be a document, created, generated, retrieved, stored, or displayed on any display media, and that further the document may contain text or other character or symbolic information. Such text, character, or other symbolic information is commonly used for communicating thoughts and ideas and is therefore a particularly prevalent form of unstructured object. Even when such text or symbolic information is stored in a database or other data structure, such text, symbolic, or characters may be stored in fields or records within the database or data structure in an unstructured form. The unstructured object may also or alternatively be a document stored or displayed on any media containing text other than numbers and without structural codes.

This method for analytical processing of at least one unstructured object in a multi-dimensional space may be applied to a broad category of unstructured or partially unstructured objects, including but not limited to situations where the unstructured objects exist within a structured, partially-structured, or non-structured body of information, but wherein the structure or partial-structure of the body of information does not provide the structural relationship between and among at least a selected one of the plurality of the elements comprising of the body of information to satisfy an information acquisition task.

It will be appreciated that the unstructured object may comprise a text field within a database, wherein the database may be a flat database or a relational database, or a combination of flat, relational, or other database or data structure types. More particularly, the unstructured object may comprises a text, character, or symbolic field or record within a relational database, within an Oracle™ relational database, within a Microsoft™ Access relational database, or within any other database. In some embodiments the text or symbols with be letter characters in any language (or there equivalents in Japanese, Chinese, and other non-character representations) forming words, phrases, sentences or otherwise expressing facts, opinions, thoughts, concepts, and the like.

In embodiments there may be some or first structured data or object within an otherwise structured database that is an unstructured object because the first structured data does not provide the necessary complexity of relationships to second structured data or unstructured data in the same structured database or in a different structured database or non-structured database to satisfy the information acquisition task. It will therefore be appreciated that the inventive method is applicable to situations and objects where the unstructured object comprises an object within a structured or partially structured data or object.

The are no limits to what the unstructured object may be and by way of example, but not limitation, the unstructured object may comprise or consist of text, character, or symbolic elements organized (or unorganized) in any manner such as in a computer readable field or record, printed on paper, accessible from the Internet, or in any other manner. The unstructured object may also or alternatively comprise of a sound recording in analog, digital, or printed form; faxes, e-mails, voice converted to text; a graphical depiction of a printed document in printed or in electronic form; a radio frequency signal; a telemetry signal; a land-line, optical, cellular, mobile, or satellite telephone signal at any frequency or an audio, computer display, printed, digitized, or other representation of such telephone signal; a content of an Internet web site or the Universal Record Locator (URL) of a website; as well as other items that do not necessarily share a common organization. It will also be appreciated that the unstructured object or objects may comprise a combination of structured objects and unstructured objects. It should also be appreciated that where the unstructured object is an indirect reference to a location storing or otherwise identifying information, data, or information objects, such as a reference to an Internet or world-wide-web URL, the contents of the unstructured object (here the URL) may change over time so that comparisons made over time to the unstructured object will or may change even though the unstructured object (perhaps represented in whole or part by a vector) does not change. For this it follows that where the unstructured object is the Internet, the content of the Internet and its various web sites, links to other web sites, postings, articles, pictures, graphics and all other manner of content changes over time.

In at least one embodiment, what may by some be characterized as structured objects may in fact include objects or data in a flat database or in a relational database that include unstructured object or data fields that do not provide a required level of relationship information objects to other structured objects or data to satisfy a determined information acquisition need or query. These are as a whole unstructured objects. In other embodiments, the unstructured objects may include objects or data in structured or partially structured databases that do not include at least one structural relationship desired or required to satisfy in information acquisition task or query. These are also as a whole unstructured objects and for which the inventive method and procedures provide advantages for query results, discovery, and exploration.

Having described what unstructured object may be in general terms, we now provide a list of some examples of information items, data, facts, opinions, predications, or other items that by way of illustration but not limitation give some sense of the broad spectrum and great variety of things that may be or constitute unstructured objects. The include unstructured objects are selected from the set of information objects consisting of: scientific, agricultural, epidemiological, medical, genetic, chemical, biological, pharmaceutical, corporate, athletic, archeological, bioinformatic, proteomics, geological, physical, intelligence, military, meteorological, oceanographic, genealogical, photographic, fingerprints, electronic signal, astronomical, bibliographical, racial, religious, national origin, political, geo-political, ethnicity, energy generation or consumption, Internet, world wide web, tomographic, photo-reconnaissance, satellite data, geographic information systems (GIS), environmental, economic, currency market, stock market, futures market, international currency market, bond market, any other data or information appropriate for making intelligence, terrorist, national or domestic security or military decisions, and combinations thereof. The inventive method and system clearly have applicability for analyzing vast amounts of unstructured information or unstructured objects that are generated, published, communicated, or that are in any other way identifiable so that they may be analyzed to assess any international, national, domestic, or local security or terrorist threats. More particularly the inventive system and method may be of use to such organizations as the Department of Defense, the Central Intelligence Agency, the Federal Bureau of Investigation, the Department of Homeland Security, and state and local law enforcement organizations for threat assessment applications. It also has applicability for technology, financial, corporate and business intelligence gathering and analysis.

At least some embodiments of the invention provide for a display either for interaction by the analysis with the system and method and for displaying intermediate results and final results or output. Where display or display media is a component of the inventive system or method, the display or display media may includes at least one graphical display type capable of displaying at least two dimensional representations of information objects. In other embodiments, the display media may include at least one graphical display type capable of displaying at least three dimensional representations of information objects. The three dimensional display may be accomplished using an inherently two-dimensional display, such as a printer, CRT display screen, or LCD display screen that simulates a three-dimensional representation using shading or some distance perspective rendering technique. Alternatively or in addition, stereographic techniques with some form of left-right vision or eye selection may be used to provide an actual three-dimensional stereo display. Such display may be interactive. Holographic and heads up type display may also or alternatively be used by a user or analyst interacting with the inventive system or using the inventive method or computer program or computer program product implementing the inventive methods or its component procedures.

In at least one of the embodiments of the method for analytical processing of at least one unstructured object in a multi-dimensional space, the determined set of concepts may be predetermined; or may be determined or established by a rule, policy, or algorithm; or may dynamically determined.

The at least one view, angle or perspective may be at a predefined, dynamically defined, or user defined, level of granular detail. The at least one angle or perspective, at a predefined or user defined level of granular detail, may be automatically chosen based on the most frequent collocation occurrences of all the concepts or on the appearance of new concepts for exception tracking in the multidimensional space defined by a set of concepts and their granular detail. Alternatively or in addition, a level of granular detail may be determined by at least one of timestamp indexed, number of hits, cross reference type, object type, and combinations thereof.

A higher level of detail may generally be a superset of all the lower levels and may include normalized summarizations; and a lower level of detail may generally provide a more specific definition in either meaning, or a more narrowed delineation in size, time, physical distance on a document or objects that is not provided in a higher level of detail. Furthermore, in some embodiments, the summarizations are selected from the set of sums and counts comprising: sum of number of objects a concept occurs, sum of number of times a concept occurs, count of number of times a concept occurs, count of total number of objects, and sum of size of all the objects; and wherein these sums and summarizations are used in varied combinations that is not included in a lower level of detail.

An unstructured object may include an attribute or variable and the attribute or variable is selected from the set consisting of a size, time, physical distance or combination thereof in an unstructured object.

In some embodiments, the levels of granular details may be abstracted from a corpus using an abstraction procedure to generate a concept or concepts. The abstraction procedure may include but is not limited to utilizing any one or combination of: a single language dictionary, a language translation dictionary, a thesaurus or a plurality of thesauri, codes, documents, letters, books, and combinations thereof in any printed, digital, facsimile, computer, or electronic form, or the like, or combinations thereof.

In at least one embodiment, the abstraction procedure may utilize an initial concept seed or seeds to generate the concept.

The method for analytical processing of at least one unstructured object in a multi-dimensional space represents a different level of granular detail from a high level or granular detail to a low level of granular detail or from a general level of granular detail to a specific level of granular detail and a particular point of view or perspective or multiple points of view or multiple perspectives or multiple angles at different levels of granular detail for each dimension.

Embodiments of the inventive system and method for analytical processing of at least one unstructured object in a multi-dimensional space may provide, that each dimension represents a different level of granular detail from a high level or granular detail to a low level of granular detail or from a general level of granular detail to a specific level of granular detail and a particular point of view or perspective. Alternatively, it may provide that the multi-dimensions are selected as a plurality of dimensions selected from the set of dimensions comprising multiple points of view or multiple perspectives or multiple angles at different levels of granular detail for each dimension.

The inventive method supports and is operable in an automated mode, batch processing mode, unsupervised mode, or the like largely non-interactive mode for processing and analysis. However, the system and method support user interaction and yield benefits from an interactive mode. In particular the user or analyst may apply their own intelligence and knowledge to interactively select a perspective and to alter parameters of the query such as the dimension, number of dimensions, see concepts, or any of the other inputs, variables, vector or vector portions described herein, to interactively refine the interactive session to achieve a satisfactory search result, such as identifying a trend or exception. In some instances, the search or query result will be to verify that there is no significant trend or exception condition occurring.

In this aspect, the method may provide for user or analysis interactive selection of one or more of the selecting a combination of concepts and objects, selecting at least one timestamp, and exploring its associated concepts and objects cross-reference. In other embodiments, the user interaction includes the user selecting a plurality of the selecting a combination of concepts. The combination may be automatically or user interactively identified on the basis of an identification criteria. Such identification criteria may be selected from the set of identification criteria consisting of: at least one trend in concepts over time, at least one exception to absolute occurrence or a percentage differential from previous occurrence, a plurality of trends, a plurality of exceptions within a concept or a collection of concepts, and combinations thereof.

Either user or analyst interactive processing or automatic processing may result in the display or printing of query results or results derived from the query results, such as trends, exceptions, or the like. The query results or derived results generated by processing the query results may for example, be displayed on at least one display having a display type, and the at least one graphical display type may be selected from the set of graphical display types consisting of cross tabs, pie charts, bar charts, column, row, line, x-y scatter, x-y-z scatter, multi-dimensional scatter, distance metric, area, volume, Venn-diagrams, animations, doughnut, radar, surface, bubble, stock, cylinder, cone, pyramid, and combinations thereof. The media on which the graphical display is presented to a user or used for further user or automated processing may be any display media or device as is known in the art.

Embodiments of a Method for Trend Tracking and Exception Tracking and Monitoring The inventive system and method provide a method for analytical processing of at least one unstructured object and the results of such processing may be to generate one or more valuable query result. Advantageously, other aspects of the inventive system and method take these query results, or facts, data, or results generated by other systems and methods, to generate and track trends and exception. Alarms or other indications may be generated in a variety of ways and forms and communicated to interested parties as programmed into or otherwise provided by the system, method, and computer program.

Some embodiments of the inventive system or method may provide only for trend result generation and tracking of such trend results, other embodiments may provide only for exceptions result generation and exception monitoring and tracking, however, other embodiments of the invention advantageously provide for both or a combination of trend and exception tracking.

The trend results (and/or exception results) and the trends that are tracked or exceptions that are identified, may be or comprise trends in temporal (time), spatial (location or geographic), events occurring or not occurring, and activities that occur or do not occur, and combinations thereof. The temporal trends (or exceptions) or trends in time may for example, be measured or tracked or monitored in elements of seconds, minutes, hours, days, weeks, months, years, decades, or any other duration or increment of time where time or time duration is measured or quantified in either absolute time or relative time units. The spatial trends (or exceptions) may be tracked or monitored in elements of physical location, cities, states, country, continents, physical or spatial coordinates or proximity or distance to such coordinates, global position coordinates or proximity or distance to such coordinates. The trends or exceptions may be tracked for example, in elements of changes in the number of concepts in total or at a given level of granularity, changes in the types of concepts in total or at a given level of granularity, changes in the number and types of concepts, changes in the temporal distribution of concepts, changes in the spatial distribution of concepts, and combinations thereof.

Trend and/or exception tracking and monitoring procedures may advantageously be used for the trend and exception tracking. Advantageously, either a single common procedure may be used that can be modified by appropriate selection of parameters to suit the tracking or exception monitoring task, or dedicated procedures may be utilized for each or a set of trend tracking or exception monitoring tasks. Advantageously the system and method learn and can be tuned or adapted over time and the parameters and techniques stored for later retrieval (without additional tuning or modification) and reused or applied to similar situations and problems.

By way of example, but not limitations, tracking procedure may be selected from a set of tracking procedures consisting of: creating a history of the number of hits or categories that are defined by collection of concepts, generating statistical information pertaining to the history of the number of hits of concepts or a collection of concepts, creating a history of number of occurrences of concepts, and combinations thereof.

In one particular embodiment of a method for tracking trends (which may be used with or separate from the afore described method for analytical processing of an unstructured object), the trends tracking procedure includes: selecting a vector having a vector dimension, identifying a change in the vector, and storing the change as a trend result, which trend result may itself be a trend but is more typically an intermediate result where a more definite trend is established, identified, or characterized by repeating the selecting, identifying, and storing to identify the trend, or alternatively where the vector is to remain fixed, to repeat only the identification and storing to produce a plurality of trend results to establish a trend. The storage of the trend result may only be transitory and need not be permanent.

In another embodiment of the method or procedure for tracking trends, the method comprises selecting at least one vector in a predetermined vector dimension that includes at least one concept variable having a value (unless the vector has been previously selected or identified to the tracking problem and need not be selected); identifying a change in a predetermined concept variable from a first value of the predetermined concept variable to a second value of the predetermined concept variable for at least one selected concept over a selected dimension; and storing as a trend result, the identified change in the predetermined concept variable. As earlier described for another embodiment, the trend may be more readily identified or characterized by repeating the identification and storage for a plurality of the same or different concept variables to generate a plurality of trend results, so as to establish a trend or possibly to show that no particular trend exists.

It will be noted that in some embodiments, the at least one concept variable value having a value that may be the null value. It will also be noted that the selected vector dimension may be a dimension selected from the set of dimensions consisting or time, concept, and combinations thereof. Alternatively, the selected dimension is a dimension defined based upon any word, concept, idea, event, symbol, set of symbols, and combinations thereof. Furthermore for any of these embodiments, the vector may be multi-dimensional vector having dimensionality between 1, . . . , N; and that it clearly may therefore be a one-dimensional vector or scalar. The selected dimension may be a dimension selected from the set of dimensions consisting of: a time dimension, another concept, and combinations thereof, though in reality permitting the dimension to be a concept and a multi-dimensional to be characterized by a plurality of concepts effectively means that the possible dimensions are practically unlimited.

It will be appreciated in light of the description and details provided elsewhere herein that embodiments may provide that the at least one vector, or any of a plurality of vectors, comprises an unstructured object. Furthermore, the at least one vector comprises a document containing unstructured text. The at least one vector, or any of a plurality of vectors, may include a document containing at least some unstructured text or a combination of structured text and partially structured or unstructured text. The selecting at least one vector (or any one of a plurality of vectors) comprises creating the at least one vector (or any one of the plurality of vectors) in the predetermined vector dimension (or plurality of dimensions) having the at least one concept variable (or variables) and concept variable value (or values).

Therefore described embodiments of the trend tracking procedure may be utilized in a situation when the at least one vector comprises at least a document containing at least some unstructured text or a combination of structured text and partially structured or unstructured text. In this situation, the selecting and identification refer to components of the document.

The inventive tracking trends procedure may be utilized with a variety of different vectors and unstructured or partially unstructured objects. The comparisons, selections, and identifications may bee made within the same vector or vector portion or a cross between different vectors or vector portions. These variations are now described.

In one embodiment of the method for tracking trends, the selecting at least one vector comprises selecting a plurality of vectors including a first vector and a second vector; and the identifying a change in a predetermined concept variable from a first value of the predetermined concept variable to a second value of the predetermined concept variable for at least one selected concept over a selected dimension, comprises identifying a change in a in a predetermined concept variable from a first value of the predetermined concept variable in the first vector, to a second value of the predetermined concept variable from the second vector.

In another embodiment of the method for tracking trends, the selecting at least one vector comprises selecting a first portion of the at least one vector and a selecting a second portion of the at least one vector; and identifying a change in a predetermined concept variable from a first value of the predetermined concept variable to a second value of the predetermined concept variable for at least one selected concept over a selected dimension, comprises identifying a change in a predetermined concept variable from a first value of the predetermined concept variable in the first portion or the first vector, to a second value of the predetermined concept variable from the second portion of the first vector.

In another embodiment of the method for tracking trends, the selecting at least one vector comprises selecting a plurality of vectors including a first vector created at a first time and the first vector at a second time, wherein there may be change or no change in the vector between the first time and the second time; and the identifying a change in a predetermined concept variable from a first value of the predetermined concept variable to a second value of the predetermined concept variable for at least one selected concept over a selected dimension, comprises identifying a change in a predetermined concept variable from a first value of the predetermined concept variable in the first vector at the first time, to a second value of the predetermined concept variable from the first vector at the second time.

In any of the afore described methods for tracking trends, the selecting, identifying, and storing the change for at least two (or any plurality) of the vectors comprises identifying a trend. Of course it will be appreciated that the trend may be established when the same vectors or unstructured objects, such as documents, are compared over different time intervals.

In another embodiment of the invention, the method for tracking trends may be modified or altered to provide for exception tracking. In this embodiment, the selecting at least one vector comprises selecting a plurality of vectors including a first vector and a second vector, wherein the second vector comprises a reference vector for use in generating an exception; and the identifying a change in a predetermined concept variable from a first value of the predetermined concept variable to a second value of the predetermined concept variable for at least one selected concept over a selected dimension, comprises identifying a change in a predetermined concept variable from a first value of the predetermined concept variable in the first vector, to a reference value of the predetermined concept variable from the second vector; and the method further comprising generating an exception when the first value is within a predetermined magnitude relationship of the reference value. When this occurs a exception condition has been identified and may be accompanied by the issuance of an alarm, email, telephone message, or other communication or action.

There are various different magnitude relationships that may be implemented in connection with this procedure and it will be understood that mathematical ad/or Boolean logic or other operations may be performed to manipulate such magnitude relations or reference value yet till provide the desired performance. Such magnitude relationship may therefore include greater than, less than, equal to, less than or equal to, greater than or equal to, the negation of any of these, and well as any Boolean logic operations that may be applied to these relationships, and combinations thereof. Of particular utility is to make the comparison based on a predetermined magnitude relationship of the reference value (or threshold value) as being greater than or equal to the reference value, or simply greater than the reference value. Of course the reference value may be adjusted to reflect a change in the mathematical nature of the comparison. Any of these trend or exception tracking or monitoring procedures may provide that the at least one vector includes a least one concept and an associated concept variable, and the concept variable is susceptible to change over time.

In yet another alternative trends tracking procedure, the procedure comprises: comparing first and second portions of at least one vector, wherein the first and second portions pertain to the same concept; and identifying a change result in the concept if there is a difference between the first and second portions; and optionally repeating the comparing and identifying over a dimension to generate a plurality of change results and using the plurality of change results to represent a trend. Frequently, the selected dimension is time as there is great utility in establishing trends over time so that predictions and forecasts, or other decisions on action may be made respective of the future.

This trends tracking procedure or any of the other described tracking or exception monitoring procedures may more specifically be implemented by choosing as the vector a multidimensional vector comprising a date, and the first list of dimensional information objects or other properties comprises at least one of: second, minute, hour, day, month, season, quarter, year, time-zone (with respect to Greenwich mean time or other reference). The dimensional information may be relative to any calendar or calendar system.

Within the trends tracking and procedure, the date or date vector may occur a plurality of times, for example it may occur each time there is a shift or change in concepts or groupings of and their combinations; optionally, the occurrence of a date vector for each shift or change number of occurrences of hit count may be used for trending analysis.

In some embodiments, the multidimensional vector contains: an global object identification data (such as a user independent index of the unstructured object), a concept identification data, a reference time stamp, cross reference type (such as to locate concept within the object such as an indication that the concept is in the title or body of a document), history time (such as the time when the object was indexed), and a concept hit occurrence data.

The method may provide that the multidimensional vector includes a vector identifier, which may itself optionally include a vector sequence identifier called an object identifier.

Referring back to the embodiment of the inventive method for trends tracking comprising selecting at least one vector in a predetermined vector dimension that includes at least one concept variable having a value; identifying a change in a predetermined concept variable from a first value of the predetermined concept variable to a second value of the predetermined concept variable for at least one selected concept over a selected dimension; and storing as a trend result, the identified change in the predetermined concept variable; where the at least one vector comprises a document containing at least some unstructured text or a combination of structured text and partially structured or unstructured text; as well as to other embodiments of the invention, it will be appreciated that the first vector data may be selected from the set of first vector data consisting of: a date data, a temporal data, a spatial data, a location data, a number of hits, a cross reference with object data, and combinations thereof.

When a vector consists of vector elements, such elements may be selected from the set of vector elements consisting of object identifier, concept identifier, cross reference time stamp, other dimensional information, cross reference type, history time, total number of hits, and combinations thereof. Alternatively, when a vector consists of vector elements such elements may be selected from the set of vector elements consisting of object identifier, concept identifier, a timestamp, cross reference time stamp, other dimensional information, cross reference type, history time, total number of hits, and combinations thereof; and wherein when the timestamp occurs it may occur a single time, two times, or any plurality of times.

In this alternative trends tracking procedure as well as in the other variants of the trends tracking procedure and exception monitoring procedure, the identifying a change may include a comparison and the comparison is a vector to vector comparison; or the identifying a change includes a comparison and the comparison is a comparison made between two portions within the same vector; or the identifying a change includes a comparison and the comparison is made between any plurality of vectors or portions of vectors is made by performing such comparison on a pair-by-pair basis.

These trends tracking exceptions monitoring procedures may be implemented or executed such that the identifying a change in a concept variable from at least a first date to at least a second date for at least one selected concept, comprises identifying history of change over time for a plurality of times and optionally for a plurality of concept variables for the selected concept. The concept variable is optionally selected from the set of concept variables consisting of key concepts, seed concepts, and combinations thereof.

Clearly, the trends tracking procedure may also include some pattern recognition features and procedural steps so that particular patterns, signatures, or the like may automatically be recognized, or recognized interactively through the user or analysis with a set of analysis tools. For example, the identifying a change may comprises identifying a predefined or dynamically determined pattern. Such a patterns may be any pattern that can be defined, and may by way of example but not of limitation, be selected from the set of patterns consisting of: a pattern for the number of hits of high-low-high-low-high, a pattern for high-low-high, a pattern for low-high-low, a pattern for an increase, a pattern for a decrease, a rare event pattern, a pattern for gradually increasing—peaking—then gradual declining, a pattern for any sequence of increasing or decreasing, a pattern for any peaking, and combinations thereof; wherein the pattern may serve to identify a trend of interest for any number of more complex concepts and their combinations.

In one alternative embodiment of the trends tracking procedure, the identifying a change comprises selecting a first portion of at least one first vector storing data for the selected concept at the first date with a second portion of at least one second vector storing data for the selected concept at the second date, and comparing the selected first and second vector portions for a change in at least one concept variable for the selected concept. Optionally, the first vector and the second vector are the same vector; or the first vector and the second vector may be different vectors. At least one concept variable for the selected concept may optionally be the same concept variable for the comparison, or the at least one concept variable for the selected concept is a different concept variable for the comparison. In some embodiments, the vector comprises a subsection of the entire vector.

As described herein elsewhere relative to other embodiments, the comparison may be a comparison between the first date and the second date a hit count change, a cross reference type change, and combinations thereof. The comparison is not limited to two vectors, and may comprise a comparison among three or more vectors. In some instances such multi-way comparisons are conveniently performed on a pair-wise comparison basis.

When trends results (whether initial, intermediate or final) are generated, they may be stored in whatever form is convenient, such as locally on an analyst computer hard disk drive, or on local or remote data base storage. The results may be the trend comparisons, the tracked trends differences, graphical depictions of such trends, and documents describing the results in the form of reports, power-point presentations, annotated maps, or in any other form. In some instances, it may be convenient to store the tracked trends in a database as a column, a row, as a parsable free-text ordered appropriately. In other instances it may be convenient to store the tracked trends in a relational structured or partially structured database or other data structure.

Having described the manner in which query results and trends tracking data and result may be stored it should be appreciated that any or all of the input or output, including the inputs and outputs or query results from the afore described method for analytical processing may be stored in a data structure. For example, and of the concept or concept identifier and a number of occurrences in the unstructured objects may be so stored.

The unstructured object may comprise at least one document having unstructured or partially structured content.

In some instances the data structure is stored in a display device storage buffer, in other instances it may be stored in some a random access memory, and in other instances it may be stored in a non-volatile storage medium, such as a storage system having one or a plurality of rotating magnetic hard disk drives, optical drives, or other forms of non-volatile storage as are known in the art. Encryption or other security measures may be applied to safeguard the information.

After such information has been stored, it may be retrieved by the same user or analyst or by a different user or analyst, or used by automated processors for any other purpose. In one embodiment, the stored information includes stored concept or concept identifier information, and the method includes accessing the stored concept or concept identifier and displaying the concept or concept identifier and a number of occurrences in the object or document for each of the concepts or concept identifiers.

In another alternative embodiment, the method for analytical processing of at least one unstructured object in a multi-dimensional space further includes monitoring or tracking exceptions. In a particular embodiment, the monitoring or tracking of exceptions are applied to changes in hits, concept type, and number. In another embodiment, the exceptions are selected from the set of exceptions consisting of hit count, normalized hit count, new concepts, absent or deleted concepts, and combinations thereof.

While embodiments for tracking trends have been described, it will be appreciated that there are multiple variations for achieving such tracking over unstructured objects. In another alternative embodiment, the method for tracking a trend in an unstructured object over a predetermined dimension or variable comprises: selecting first and second vectors or vector portions, each having at least one vector element; comparing the first and second vector or vector portions along relevant elements within the vectors or vector portions to determine a difference or non-difference; and optionally storing the resulting difference or non-difference for trending analysis. The selecting first and second vectors or vector portions may also be optional where the selection has previously been made. Also, in some cases it may be necessary to generate the desired first and second vectors according to the needs and required results from the analysis.

Each vector or vector portion, or selected vectors or vector portions, may optionally have one or a plurality of vector elements selected from the set consisting of: object id, concept id, cross reference time stamp, other dimensional information, cross reference type, history time, and total number of hits or occurrences.

It will be appreciated that for any of the numbers, parameters, results, or the like, either the raw number of some scaled or normalize version may be stored or used. Such normalization may promote comparisons over some variable such as time and make comparisons more meaningful. In one embodiment, for example, the methods further comprise normalizing captured concepts scores and/or hits or occurrences in the unstructured objects. In analogous manner summaries or statistical metrics may be generated from raw results or even from processed results.

In connection with the trends tracking and exceptions monitoring and tracking, as well as for the method for analytical processing of an unstructured object, the inventive system and method permit interactive or dynamic browsing of concepts and other variable or parameters, as well as historical results. In at least one embodiment, the inventive system and method permit and facilitate a user to dynamically or interactively browse concepts for changes in one or more unstructured objects, over predetermined set of concepts or dimensions, and combinations thereof. For example, the dimension or dimensions over which a user may browse may comprise a time or calendar dimension selected from the set of dimensions consisting of: time, second, minute, hour, day, month, year, time-zone, and combinations thereof.

Embodiment of Alternative Method for Analytical Processing of An Unstructured Object Recalling the afore described embodiments of the method for analytical processing of at least one unstructured object in multi-dimensional space, that includes: for at least a selected dimension of the multi-dimensional space, hierarchically exploring and querying the unstructured object at a plurality of levels of detail or abstraction to determine a first query result; selecting a combination of at least two dimensions of the multi-dimensional analytical processing space; selecting at least one particular concept in the form of a view or perspective among a determined set of concepts at a predefined level of granular detail; and analytically exploring and processing the unstructured objects using the selected combination of dimensions and at least one angle or perspective to determine a second query result different from the first query result that identifies where the corpus has changed to reflect the angle or perspective, wherein the angle or perspective is a set of concepts and optionally one or more relationships with each other, and granular detail.

This method (or other of the alternative methods for analytical processing of a unstructured object may further include tracking trends, monitoring or tracking exceptions, or both. In one particular embodiment, it provides for tracking trends by a tracking procedure or method that includes comparing first and second portions of at least one vector, wherein the first and second portions pertain to the same concept; and identifying a change result in the concept if there is a difference between the first and second portions; and optionally repeating the comparing and identifying over a dimension to generate a plurality of change results and using the plurality of change results to represent a trend. This procedure may itself further include generating summarizations at a categories level, and optionally that the generating summarizations at a categories level comprises generating pre-defined summarizations or pre-built summarizations.

The trends tracking procedure may further include monitoring a corpus at an individual user level or individual view or perspective level to detect a change in concepts, categories that are defined by groupings of concepts by count or number of hits or occurrences as absolute number or as a percentage from the previous occurrence.

In one embodiment, the monitored corpus may comprise a collection of objects where the inherent content of these objects can be translated to a common set of symbols.

The inventive tracking procedure may further include determining a change without user intervention or action, and the change detected can be any detectable change or a change satisfying predetermined or dynamically determined detection or change parameters, rules, or policies. For example, the change can be a predetermined or dynamically determined degree, type, or threshold of change. The determining a change without user intervention may also or alternatively be performed according to some predetermined or dynamically determined schedule whether periodic or aperiodic. For example, initiating a sequence of events for looking or determining a change may be done in response to some action or event that occurs or fails to occur. Furthermore, the identification of one or more trends may initiate determination of changes for other concepts or the like actions. Any of these may occur either automatically or under user or analyst control or direction. The determining a change without user intervention being performed in response to the occurrence or non-occurrence of a predetermined or dynamically determined event or the failure of an event to occur.

This or other embodiments of the trends tracking procedure may further include automatically altering a user analytical format without a pre-imposed hierarchy in response to user defined changes in concepts, or number of hits or occurrences of a given subset of concepts. This or other embodiments of the trends tracking procedure may also optionally but advantageously include: generating summarizations at a categories level; monitoring a corpus at an individual user level or individual view or perspective level; and determining a change without user intervention based on the monitoring.

Embodiment of Method for Providing Dynamic Matrix-Based Graphical Interface

The invention further provides a method for providing a graphical interface having a dynamic matrix tabular form view of concepts and their occurrence within unstructured objects as well as the structure of the view produced by the method. The method includes: displaying concepts versus object descriptions in a matrix format view to assist a user in quickly determining an object or objects of interest; providing a view tool to permit the user to choose concepts to add or remove from this view for comparing concepts within the view; the view tool permitting view personalization so that the view provided for a first user viewing a first set of unstructured objects may be different from the view provided for a second user viewing the first set of unstructured objects; and the view being an integrated view such that both unstructured and structured objects may be advantageously displayed together in the same format.

The view tool may provide display categories as graphical folders that can be displayed as open or shut, as dictated by their status to reveal or hide the unstructured objects assigned to the category.

Advantageously, the method for generating the matrix format tabular data structure may comprise drilling-down to an arbitrarily specified level of detail and optionally popping up to an arbitrary higher level of detail. The drill-down may be performed at the command of a user on a command basis or interactively. The drilling-down may be performed automatically under algorithmic control to support the higher level of summarization which can be sum of number of hits or occurrences of a concept or count of number of objects with the presence or absence of a concept and can be normalized by sum of size of individual objects or an arbitrary number or a combination thereof. The drill-down may also or alternatively be performed under automatic algorithmic control with user interaction and override.

Alternative Embodiments of Method for Tracking and Monitoring Exceptions

Methods and system for tracking or monitoring an exception to a change have been described herein elsewhere, but as with tracking trends, more than one alternative procedure may be used either alone or in conjunction with the method for analytical processing of an unstructured and/or method or procedure for tracking trends. The method is particularly advantageous for tracking exceptions to one or more changes over a dimension that is hidden or not plainly identified.

In one embodiment of a method for tracking an exception to a change in the state of the corpus over a dimension that is hidden or not plainly identified in a corpus, the method includes: identifying and recording all (or selected) concepts and their number of hits or occurrences; selecting or constructing at least two vectors or at least two portions of a single vector; comparing these vectors over all defined dimensions; and, if data or object cannot be explained by current dimensions, then generating a new dimension using the exception as a basis or prompt the user to suggest a new basis; and otherwise reporting the exception and whether a new basis was generated.

In at least one embodiment of the exceptions monitoring or tracking procedure, the vector has the form of a vector having at least one and generally a plurality of vector elements selected from the set of elements consisting of object id, concept id, cross reference time stamp, other dimensional information, cross reference type, history time, and total number of hits. Frequently, the dimension includes a temporal (time) dimension.

The method tracking an exception includes some exceptions trigger such as a threshold that is used as a reference for comparison as described. The procedure includes setting at least one threshold for at least one of a computed value of number of hits of a concept or other exceptions condition where tracking or monitoring is desired. In one particular embodiment, the setting of at least one threshold is for at least one of: (i) a computed value of number of hits of a concept, and (ii) an addition or deletion of a concept over a given dimension comprises setting a plurality of thresholds for a plurality of concepts or categories. Optionally, the threshold comprises a predetermined or dynamically determined percentage change of the numeric sum of occurrence of concepts in a corpus, or the threshold comprises a predetermined or dynamically determined change from an absolute value from a previous observation of a concept in a corpus.

The threshold may alternatively be set as a percentage change from a previously recorded number of occurrences of a particular symbol within an unstructured object or plurality of unstructured objects, or the threshold may be set as a numerical count change from previously recorded number of occurrences of a particular symbol within an unstructured object or a plurality of unstructured objects.

The exception tracking method may use at least one threshold and further but alternatively include: monitoring a corpus at an individual user level or individual view perspective angle level to detect changes in an absolute, relative, or percentage number of occurrences or hits or concept or categories; determining a change without user intervention; and automatically alerting the user in response to changes in concepts, or number of occurrences or hits of a given subset of concepts. In this embodiment of the method, the change may be any detectable change; a changed of a predetermined magnitude or polarity; or a predetermined or dynamically determined degree, type, or threshold of change or any predetermined pattern of change along a given dimension of any combination above.

The base method for exception tracking, or the method with any of the optional components may provide that the determining of a change without user intervention may be performed according so some predetermined or dynamically determined schedule; determining a change without user intervention being performed periodically; or the determining a change without user intervention being performed in response to the occurrence or non-occurrence or a fixed pattern of occurrence and non-occurrence of a predetermined or dynamically determined event or the failure of an event to occur, or any combination of these or according to other criteria.

The method for tracking an exception my also provide that the corpus comprises a collection of objects, and optionally where the inherent content of these objects can be translated to a common set of symbols.

Optionally but advantageously, the method for tracking an exception may further include browsing or permitting browsing or other examination of a corpus for exceptions to changes in concepts, or number of hits or occurrences of a given subset of concepts, or for other conditions. This browsing may advantageously be interactive and with a graphical, tabular, textual, or with a combination of graphical, tabular, or textual interface.

Any of the various alternative embodiments of the exception monitoring and tracking procedure may further include alerting a user, system administrator, management, or other identified person, organization, or other entity upon detecting the occurrence of predetermined exception condition. In at least one embodiment, the exception condition comprises the occurrence of a predetermined number of exceptions or events. In another embodiment, the predetermined number of exceptions is a single exception or event. Email alerts send from client machine's or user/analysts computer using an email system such as Microsoft Outlook to the same Microsoft Outlook or to any other email system using standard or secure email protocols may be used in order to notify the user of predefined changes. Printed reports may alternatively or additionally be generated.

In embodiments of the invention where a visual display in whatever form is utilized to display results, such as to present exception alerts or portions of alerts, color coding may advantageously be used in the visualization display to distinguish among various alert types as can be defined by the user. The use of text or symbolic font coding to identify particular changes may also or alternatively be used. The font coding may include font coding selected from the set of font codings consisting of font size, bold, italics, shading, color, underline, double-underline, blinking, complementary color, strike-through, and combinations thereof. The font coding may optionally include font coding in a separate report.

The afore described method for tracking an exception (or a plurality of exceptions) to a change in the state of the corpus may further include or be directed specifically to tracking exceptions as a function of a time dimension, tracking exceptions as a function of a concept dimension, tracking exceptions as a function of a predetermined or dynamically determined dimension, tracking exceptions as a function of a predetermined or dynamically determined plurality of dimensions, or a combination of these. The method may also optionally include setting an exception reporting threshold that defines the number of exceptions that must occur before an exception report is generated. In other embodiments, the threshold is set as a percentage change from a previously recorded number of occurrences of a particular symbol within an unstructured object or plurality of unstructured objects, or is set as a numerical count change from previously recorded number of occurrences of a particular symbol within an unstructured object or a plurality of unstructured objects.

The view tool may provide display categories as graphical folders that can be displayed as open or shut, as dictated by their status to reveal or hide the unstructured objects assigned to the category.

Alternative Embodiments of a Method for an Object Concept Based Search

In another aspect, the invention provides a method for object concept based search, the method comprising in one embodiment, parsing a user-entered search text to capture at least one seed concept from the entered text; determining whether at least one of the captured concepts are available as a key concept associated with an object in a relational database table; repeating the parsing and the determining for all seed concepts entered; generating a resulting list of objects; determining if the seed concepts and their user customizations exist, optionally including ones that have not been picked up as key concepts; narrowing the resulting object list to accommodate the existence of all entered seed concepts with their special user customizations; identifying objects as results whose concepts match; and scoring objects identified as matching according to an object scoring algorithm. In one embodiment, this scoring algorithm includes averaging scores for the individual key concepts that contributed to the search for each object returned using a tf-idf and a Gaussian distribution to remove child concepts that do not significantly contribute to the meaning of the parent concept with respect to the corpus. In another embodiment, the search is performed using a combination of key concepts and seed concepts, and the number of hits for the seed concepts are then divided by the total number of hits picked up for all seed concepts in a document being analyzed to determine how much the seed concept actually contributed to the concept of the document; adding this result; and averaging this result with the average score for the key concepts to arrive at a relevancy score for the object as pertains to a particular search.

In some embodiments, the method further includes reading elements of the data structure and displaying the read elements in at least a two-dimensional row and column format on a display device. In another embodiment, the method further includes reading elements of the data structure and displaying the read elements in a three-dimensional volumetric format on a display device. In yet another embodiment, the count change comprises a positive integer greater than zero.

Embodiments of Computer Programs and Computer Program Products

Having described numerous methods it may be appreciated that the methods may advantageously be implemented as computer programs for execution within a general purpose computer or a network of general or special purpose computers. Such computers include a processor or CPU and a memory coupled with the processor for storing commands or instructions and data in whatever form. In general such computer programs also have a corresponding computer program product comprising a computer readable storage medium and a computer program mechanism embedded therein, the computer program mechanism, comprising a program module that directs the computer system, to function in a specified manner according to the method and the intended inputs and outputs and including instructions for accomplishing the intended processing.

Embodiments of a System for Analytical Processing of An Unstructured Object

The invention also provides a system for analytical processing of at least one unstructured object in a multi-dimensional space, the system comprising: at least one computer having a processor and a memory coupled with the processor and input/output devices and interface to permit an external user to interact with the computer; a storage for at least one unstructured object coupled or intermittently coupled with the computer; a hierarchical query tool operating in conjunction with the memory and the processor for hierarchically exploring at least a selected dimension of a multi-dimensional space the unstructured object at a plurality of levels of detail or abstraction to determine a first result; and a dimension selection tool operating in conjunction with the memory and the processor for selecting a combination of at least two dimensions of the multi-dimensional analytical processing space.

The system may optionally be provide such that the at least one computer comprises a plurality of networked or intermittently networked computer coupled or coupleable by a communication link. Optionally, the communication link comprises a secure or encrypted communication link. The system may provide storage where the storage comprises at least one or a local data storage, a remote database, the content of a portion of the internet, the Internet, and combinations thereof. In a further embodiment, the system includes a plurality of program modules, the program modules including instructions for: analytical processing of at least one unstructured object in a multi-dimensional space; tracking a trend in the unstructured object over a predetermined dimension or variable; tracking an exception to a change in the state of the corpus over a dimension that is hidden or not plainly identified in a corpus; and generating a tabular data structure having any arbitrary concepts and their number of hits of occurrences or normalized occurrences.

Embodiments of Business and Operating Models

The invention also provides several embodiments of operating models or business models. In one embodiment, the invention provides an operating model for concept-based dynamic analysis of unstructured information objects, the operating model comprising: providing access to a computational server and at least one source of unstructured objects for performing concept-based dynamic analysis of unstructured information objects; and collecting remuneration of value by an operator for the access on a pay-per-usage, pay-per-information item, pay-per-time basis, pay-per-database basis, pay-per-query result basis, or other result or time or quantity of access basis, and combinations thereof. The access may be provided on an application service provider basis. The access is optionally provided over the Internet or on any other plurality of networked computers or information appliances. The remuneration of value may be in the form of or include a monetary payment.

Additional Embodiments

Although several embodiments of the invention have been described, it should be understood that the invention is not intended to be limited to the specifics of these embodiments. For example, specific information extracted by the analysis and categorization engine could be stored at different stages in relational database tables having a slightly different organization. Further, other data storing mechanisms could be utilized for making available the output of the analysis and categorization engine's analysis.

It will be appreciated that the algorithms, procedures, and methods described herein may be implemented as computer program software and/or firmware to be executed on a general of special purpose computer or information appliance having a processor for executing instructions and memory associated with the processor for storing data and instructions. The computer program may be stored on a tangible media such as a magnetic storage device, optical storage device, or other tangible media customarily used to store data and/or computer programs. It will also be appreciated that the computer program product may be stored at one location and transmitted electronically, such as over the Internet or other network of connected computers, for receipt and storage at another location.

The inventive system and method further provide a data structure, such as a data structure defined in electronic memory of a computer or stored in other tangible media. Embodiments of the data structures have been described with reference to the tables herein above.

The inventive system and method also provide a business or operating model or method for concept-based dynamic analysis of unstructured information. Such operating model or method may for example provide access to a server that implements the inventive techniques on a pay-per-usage, pay-per-information item, pay-per-time, or other quantity or time basis. The inventive method may also or alternatively be provided in an application service provider context.

Workers skilled in the art will appreciate that, in light of the description, a variety of interfaces can be provided for a user to view, and understand the meaning of, unstructured objects based on the structured information generated by the analysis and categorization engine.

We claim:

1. A computer-based method to allow a user to analyze unstructured objects, comprising:

allowing a user to select a plurality of unstructured objects, at least a portion organized into categories, as a corpus;

allowing the user to select at least one concept to form a concept set; and displaying a first dimension including at least one of the categories, wherein for each concept in the concept set, a presence or absence of the concept is indicated for each category in the first dimension.

2. The method of claim 1, further comprising:

allowing the user to select a first category from the first dimension; and displaying, in response to the selection of the first category, a second dimension, wherein each unstructured object and/or category of the second dimension is associated with the first category of the first dimension.

3. The method of claim 1, further comprising:

allowing the user to select a first concept from the concept set; and displaying, in response to the selection of the first concept, a second dimension, wherein a presence or absence of the first concept is indicated for each unstructured object and/or category in the second dimension.

4. The method of claim 3, wherein the step of displaying a second dimension comprises:

allowing the user to combine additional concepts with the first concept to form a second concept set; and displaying the second dimension, wherein for each concept in the second concept set, a presence or absence of the concept is indicated for each unstructured object and/or category in the second dimension.

5. The method of claim 1, further comprising:

allowing the user to select an indication of the presence or absence of a first concept in a first category of the first dimension; and displaying, a second dimension, wherein each unstructured object and/or category of the second dimension is associated with the first category of the first dimension, and wherein a presence or absence of the first concept is indicated for each unstructured object and/or category in the second dimension.

6. The method of claim 5, wherein the step of displaying a second dimension comprises:

allowing the user to combine additional concepts with the first concept to form a second concept set; and displaying the second dimension, wherein for each concept in the second concept set, a presence or absence of the concept is indicated for each unstructured object and/or category in the second dimension.

7. The method of claim 1, wherein the displaying step comprises:

displaying a category as a folder.

8. The method of claim 1, wherein the displaying step comprises:

displaying the presence or absence indications in a matrix, wherein one axis of the matrix lists at least one unstructured object and/or at least one category, the other axis of the matrix lists concepts, and an entry in the matrix indicates the presence or absence of a concept in an unstructured object and/or category.

9. The method of claim 8, wherein the entry is a numeric value with zero indicating absence and a value greater than zero indicating a degree of presence.

10. The method of claim 1, wherein the displaying step comprises:

displaying the presence or absence indications as a graph chart, wherein for each concept in the concept set, a graph is displayed indicating the presence or absence of the concept among the at least one category of the first dimension.

11. A computer-based method to allow a user to analyze unstructured objects, comprising:

allowing a user to select a plurality of unstructured objects as a corpus;

allowing the user to select at least one concept to form a concept set;

allowing the user to select a first dimension, wherein a dimension includes at least one unstructured object from the corpus and/or at least one category;

displaying the first dimension, wherein for each concept in the concept set, a presence or absence of the concept is indicated for each unstructured object and/or category in the first dimension; and further comprising the following steps which support online analytical processing (OLAP) requirements of drill down, slice and dice, and graphical analysis:

allowing the user to display a second dimension as a result of selecting a first category from the first dimension, a first concept from the concept set, or a first indication of a presence or absence of a concept from the concept set in an unstructured object or category of the first dimension, thereby supporting drill down;

allowing the user to modify the first dimension, the second dimension or the concept set, thereby supporting slice and dice;

allowing the user to specify a second category for sharing with a second corpus, thereby further supporting slice and dice; and allowing the user to graphically display information provided in the first dimension or the second dimension, thereby supporting graphical analysis.

12. The method of claim 1, further comprising:

adding an additional unstructured object to the corpus; and categorizing the additional unstructured object to be associated with a category.

13. A computer-based method to allow a user to analyze unstructured objects, comprising:

allowing a user to select a plurality of unstructured objects as a corpus;

allowing the user to select at least one concept to form a concept set;

allowing the user to select a first dimension, wherein a dimension includes at least one unstructured object from the corpus and/or at least one category;

displaying the first dimension, wherein for each concept in the concept set, a presence or absence of the concept is indicated for each unstructured object and/or category in the first dimension;

adding an additional unstructured object to the corpus; and categorizing the additional unstructured object to be associated with a category, wherein the categorizing step comprises:

calculating an inverted category ratio and a concept ratio for each concept associated with the additional unstructured object;

calculating a category normalization ratio; and associating the additional unstructured object with a category based on the inverted category ratio, the concept ratio, and the category normalization ratio.

14. The method of claim 1, further comprising:

allowing the user to specify a category for sharing with a second corpus; and identifying, to the second corpus, an unstructured object associated with the shared category.

15. The method of claim 14, further comprising:

adding the identified unstructured object to the second corpus if the identified unstructured object is not already included in the second corpus.

16. The method of claim 14, further comprising:

adding a reference to the identified unstructured object in the second corpus without duplicating the contents of the identified unstructured object in the second corpus.

17. The method of claim 14, further comprising:

categorizing the identified unstructured object to be associated with at least one category associated with the second corpus.

18. The method of claim 14, wherein the second corpus is associated with a second user.

19. A system to allow a user to analyze unstructured objects, comprising:

a processor; and a memory in communication with the processor, wherein the memory stores a plurality of processing instructions for directing the processor to:

allow a user to select a plurality of unstructured objects, at least a portion organized into categories, as a corpus;

allow the user to select at least one concept to form a concept set; and display a first dimension including at least one of the categories, wherein for each concept in the concept set, a presence or absence of the concept is indicated for each category in the first dimension.

20. The system of claim 19, wherein the plurality of processing instructions further includes instructions for directing the processor to:

allow the user to select a first category from the first dimension; and display, in response to the selection of the first category, a second dimension, wherein each unstructured object and/or category of the second dimension is associated with the first category of the first dimension.

21. The system of claim 19, wherein the plurality of processing instructions further includes instructions for directing the processor to:

allow the user to select a first concept from the concept set; and display, in response to the selection of the first concept, a second dimension, wherein a presence or absence of the first concept is indicated for each unstructured object and/or category in the second dimension.

22. The system of claim 21, wherein the processing instructions for directing the processor to display a second dimension include instructions for directing the processor to:

allow the user to combine additional concepts with the first concept to form a second concept set; and display the second dimension, wherein for each concept in the second concept set, a presence or absence of the concept is indicated for each unstructured object and/or category in the second dimension.

23. The system of claim 19, wherein the plurality of processing instructions further includes instructions for directing the processor to:

allow the user to select an indication of the presence or absence of a first concept in a first category of the first dimension; and display a second dimension, wherein each unstructured object and/or category of the second dimension is associated with the first category of the first dimension, and wherein a presence or absence of the first concept is indicated for each unstructured object and/or category in the second dimension.

24. The system of claim 23, wherein the processing instructions for directing the processor to display a second dimension include instructions for directing the processor to:

allow the user to combine additional concepts with the first concept to form a second concept set; and display the second dimension, wherein for each concept in the second concept set, a presence or absence of the concept is indicated for each unstructured object and/or category in the second dimension.

25. The system of claim 19, wherein the processing instructions for directing the processor to display a first dimension include instructions for directing the processor to:

display a category as a folder.

26. The system of claim 19, wherein the processing instructions for directing the processor to display a first dimension include instructions for directing the processor to:

display the presence or absence indications in a matrix, wherein one axis of the matrix lists at least one unstructured object and/or at least one category, the other axis of the matrix lists concepts, and an entry in the matrix indicates the presence or absence of a concept in an unstructured object and/or category.

27. The system of claim 26, wherein the entry is a numeric value with zero indicating absence and a value greater than zero indicating a degree of presence.

28. The system of claim 19, wherein the processing instructions for directing the processor to display a first dimension include instructions for directing the processor to:

display the presence or absence indications as a graph chart, wherein for each concept in the concept set, a graph is displayed indicating the presence or absence of the concept among the at least one category of the first dimension.

29. A system to allow a user to analyze unstructured objects, comprising:

a processor; and a memory in communication with the processor, wherein the memory stores a plurality of processing instructions for directing the processor to:

allow a user to select a plurality of unstructured objects as a corpus;

allow the user to select at least one concept to form a concept set;

allow the user to select a first dimension, wherein a dimension includes at least one unstructured object from the corpus and/or at least one category; and display the first dimension, wherein for each concept in the concept set, a presence or absence of the concept is indicated for each unstructured object and/or category in the first dimension, wherein the plurality of processing instructions supports online analytical processing (OLAP) requirements of drill down, slice and dice and graphical analysis by further including instructions for directing the processor to:

allow the user to display a second dimension as a result of selecting a first category from the first dimension, a first concept from the concept set, or a first indication of a presence or absence of a concept from the concept set in an unstructured object or category of the first dimension, thereby supporting drill down;

allow the user to modify the first dimension, the second dimension or the concept set, thereby supporting slice and dice;

allow the user to specify a second category for sharing with a second corpus, thereby further supporting slice and dice; and allow the user to graphically display information provided in the first dimension or the second dimension, thereby supporting graphical analysis.

30. The system of claim 19, wherein the plurality of processing instructions further includes instructions for directing the processor to:

add an additional unstructured object to the corpus; and categorize the additional unstructured object to be associated with a category.

31. A system to allow a user to analyze unstructured objects, comprising:

a processor; and a memory in communication with the processor, wherein the memory stores a plurality of processing instructions for directing the processor to:

allow a user to select a plurality of unstructured objects as a corpus;

allow the user to select at least one concept to form a concept set;

allow the user to select a first dimension, wherein a dimension includes at least one unstructured object from the corpus and/or at least one category;

display the first dimension, wherein for each concept in the concept set, a presence or absence of the concept is indicated for each unstructured object and/or category in the first dimension;

add an additional unstructured object to the corpus; and categorize the additional unstructured object to be associated with a category, wherein the processing instructions for directing the processor to categorize the additional unstructured object include instructions for directing the processor to:

calculate an inverted category ratio and a concept ratio for each concept associated with the additional unstructured object;

calculate a category normalization ratio; and associate the additional unstructured object with a category based on the inverted category ratio, the concept ratio, and the category normalization ratio.

32. The system of claim 19, wherein the plurality of processing instructions further includes instructions for directing the processor to:

allow the user to specify a category for sharing with a second corpus; and identify, to the second corpus, an unstructured object associated with the shared category.

33. The system of claim 32, wherein the plurality of processing instructions further includes instructions for directing the processor to:

add the identified unstructured object to the second corpus if the identified unstructured object is not already included in the second corpus.

34. The system of claim 32, wherein the plurality of processing instructions further includes instructions for directing the processor to:

add a reference to the identified unstructured object in the second corpus without duplicating the contents of the identified unstructured object in the second corpus.

35. The system of claim 32, wherein the plurality of processing instructions further includes instructions for directing the processor to:

categorize the identified unstructured object to be associated with at least one category associated with the second corpus.

36. The system of claim 32, wherein the second corpus is associated with a second user.

37. A computer program product comprising a computer usable medium having control logic stored therein for causing a computer to allow a user to analyze unstructured objects, said control logic comprising:

first computer readable program code means for causing the computer to allow a user to select a plurality of unstructured objects, at least a portion organized into categories, as a corpus;

second computer readable program code means for causing the computer to allow the user to select at least one concept to form a concept set; and third computer readable program code means for causing the computer to display a first dimension including at least one of the categories, wherein for each concept in the concept set, a presence or absence of the concept is indicated for each category in the first dimension.

38. The computer program product of claim 37, further comprising:

fourth computer readable program code means for causing the computer to allow the user to select a first category from the first dimension; and sixth fifth computer readable program code means for causing the computer to display, in response to the selection of the first category, a second dimension, wherein each unstructured object and/or category of the second dimension is associated with the first category of the first dimension.

39. The computer program product of claim 37, further comprising:

fourth computer readable program code means for causing the computer to allow the user to select a first concept from the concept set; and fifth computer readable program code means for causing the computer to display, in response to the selection of the first concept, a second dimension, wherein a presence or absence of the first concept is indicated for each unstructured object and/or category in the second dimension.

40. The computer program product of claim 39, wherein the fifth computer readable program code means includes:

sixth computer readable program code means for causing the computer to allow the user to combine additional concepts with the first concept to form a second concept set; and seventh computer readable program code means for causing the computer to display the second dimension, wherein for each concept in the second concept set, a presence or absence of the concept is indicated for each unstructured object and/or category in the second dimension.

41. The computer program product of claim 37, further comprising:

fourth computer readable program code means for causing the computer to allow the user to select an indication of the presence or absence of a first concept in a first category of the first dimension; and fifth computer readable program code means for causing the computer to display a second dimension, wherein each unstructured object and/or category of the second dimension is associated with the first category of the first dimension, and wherein a presence or absence of the first concept is indicated for each unstructured object and/or category in the second dimension.

42. The computer program product of claim 41, wherein the fifth computer program product means includes:

sixth computer readable program code means for causing the computer to allow the user to combine additional concepts with the first concept to form a second concept set; and seventh computer readable program code means for causing the computer to display the second dimension, wherein for each concept in the second concept set, a presence or absence of the concept is indicated for each unstructured object and/or category in the second dimension.

43. The computer program product of claim 37, wherein the third computer readable program code means includes:

fourth computer readable program code means for causing the computer to display a category as a folder.

44. The computer program product of claim 37, wherein the third computer readable program code means includes:

fourth computer readable program code means for causing the computer to display the presence or absence indications in a matrix, wherein one axis of the matrix lists at least one unstructured object and/or at least one category, the other axis of the matrix lists concepts, and an entry in the matrix indicates the presence or absence of a concept in an unstructured object and/or category.

45. The computer program product of claim 44, wherein the entry is a numeric value with zero indicating absence and a value greater than zero indicating a degree of presence.

46. The computer program product of claim 37, wherein the third computer readable program code means includes:

fourth computer readable program code means for causing the computer to display the presence or absence indications as a graph chart, wherein for each concept in the concept set, a graph is displayed indicating the presence or absence of the concept among the at least one category of the first dimension.

47. A computer program product comprising a computer usable medium having control logic stored therein for causing a computer to allow a user to analyze unstructured objects, said control logic comprising:

first computer readable program code means for causing the computer to allow a user to select a plurality of unstructured objects as a corpus;

second computer readable program code means for causing the computer to allow the user to select at least one concept to form a concept set;

third computer readable program code means for causing the computer to allow the user to select a first dimension, wherein a dimension includes at least one unstructured object from the corpus and/or at least one category;

fourth computer readable program code means for causing the computer to display the first dimension, wherein for each concept in the concept set a presence or absence of the concept is indicated for each unstructured object and/or category in the first dimension; and fifth computer readable program code means supporting online analytical processing (OLAP) requirements of drill down, slice and dice and graphical analysis, the fifth computer readable program code means comprising:

sixth computer readable program code means for causing the computer to allow the user to display a second dimension as a result of selecting a first category from the first dimension, a first concept from the concept set, or a first indication of a presence or absence of a concept from the concept set in an unstructured object or category of the first dimension, thereby supporting drill down;

seventh computer readable program code means for causing the computer to allow the user to modify the first dimension, the second dimension or the concept set, thereby supporting slice and dice;

eighth computer readable program code means for causing the computer to allow the user to specify a second category for sharing with a second corpus, thereby further supporting slice and dice; and ninth computer readable program code means for causing the computer to allow the user to graphically display information provided in the first dimension or the second dimension, thereby supporting graphical analysis.

48. The computer program product of claim 37, further comprising:

fourth computer readable program code means for causing the computer to add an additional unstructured object to the corpus; and fifth computer readable program code means for causing the computer to categorize the additional unstructured object to be associated with a category.

49. A computer program product comprising a computer usable medium having control logic stored therein for causing a computer to allow a user to analyze unstructured objects, said control logic comprising:

first computer readable program code means for causing the computer to allow a user to select a plurality of unstructured objects as a corpus;

second computer readable program code means for causing the computer to allow the user to select at least one concept to form a concept set;

third computer readable program code means for causing the computer to allow the user to select a first dimension, wherein a dimension includes at least one unstructured object from the corpus and/or at least one category;

fourth computer readable program code means for causing the computer to display the first dimension, wherein for each concept in the concept set, a presence or absence of the concept is indicated for each unstructured object and/or category in the first dimension;

fifth computer readable program code means for causing the computer to add an additional unstructured object to the corpus; and sixth computer readable program code means for causing the computer to categorize the additional unstructured object to be associated with a category, wherein the sixth computer readable program code means includes:

seventh computer readable program code means for causing the computer to calculate an inverted category ratio and a concept ratio for each concept associated with the additional unstructured object;

eighth computer readable program code means for causing the computer to calculate a category normalization ratio; and ninth computer readable program code means for causing the computer to associate the additional unstructured object with a category based on the inverted category ratio, the concept ratio, and the category normalization ratio.

50. The computer program product of claim 37, further comprising:

fourth computer readable program code means for causing the computer to allow the user to specify a category for sharing with a second corpus; and fifth computer readable program code means for causing the computer to identify, to the second corpus, an unstructured object associated with the shared category.

51. The computer program product of claim 50, further comprising:

sixth computer readable program code means for causing the computer to add the identified unstructured object to the second corpus if the identified unstructured object is not already included in the second corpus.

52. The computer program product of claim 50, further comprising:

sixth computer readable program code means for causing the computer to add a reference to the identified unstructured object in the second corpus without duplicating the contents of the identified unstructured object in the second corpus.

53. The computer program product of claim 50, further comprising:

sixth computer readable program code means for causing the computer to categorize the identified unstructured object to be associated with at least one category associated with the second corpus.

54. The computer program product of claim 50, wherein the second corpus is associated with a second user.

55. A computer-based method that supports online analytical processing (OLAP) requirements of drill down, slice and dice, and graphical analysis to allow a user to analyze a corpus of unstructured objects, comprising:

allowing the user to select at least one concept to form a concept set;

allowing the user to select a first dimension, wherein a dimension includes at least one unstructured object from the corpus and/or at least one category;

displaying the first dimension, wherein for each concept in the concept set, a presence or absence of the concept is indicated for each unstructured object and/or category in the first dimension;

allowing the user to display a second dimension as a result of selecting a first category from the first dimension, a first concept from the concept set, or a first indication of a presence or absence of a concept from the concept set in an unstructured object or category of the first dimension, thereby supporting drill down;

allowing the user to modify the first dimension, the second dimension or the concept set, thereby supporting slice and dice; and allowing the user to graphically display information provided in the first dimension or the second dimension, thereby supporting graphical analysis.

56. A computer program product that supports online analytical processing (OLAP) to allow a user to analyze a corpus of unstructured objects, the computer program product comprising a computer usable medium having control logic stored therein, said control logic comprising:

first computer readable program code means for causing the computer to display a first dimension including at least one concept, at least one category, and at least one indication of a presence or absence of one of the at least one concept in one of the at least one category, wherein a category includes an unstructured object in the corpus;

second computer readable program code means for causing the computer to allow the user to display a second dimension as a result of the user selecting one of the at least one category, one of the at least one concept, or one of the at least one indication, thereby supporting drill down;

third computer readable program code means for causing the computer to allow the user to modify the at least one concept, thereby supporting slice and dice; and fourth computer readable program code means for causing the computer to allow the user to graphically display information provided in the first dimension or the second dimension, thereby supporting graphical analysis.

* * * * *